(12) United States Patent
Rao et al.

(10) Patent No.: US 9,219,579 B2
(45) Date of Patent: Dec. 22, 2015

(54) SYSTEMS AND METHODS FOR CLIENT-SIDE APPLICATION-AWARE PRIORITIZATION OF NETWORK COMMUNICATIONS

(75) Inventors: Goutham P. Rao, San Jose, CA (US); Robert A. Rodriguez, San Jose, CA (US); Eric R. Brueggemann, Cupertino, CA (US)

(73) Assignee: CITRIX SYSTEMS, INC., Fort Lauderdale, FL (US)

(*) Notice: Subject to any disclaimer, the term of this patent is extended or adjusted under 35 U.S.C. 154(b) by 1908 days.

(21) Appl. No.: 11/187,508

(22) Filed: Jul. 22, 2005

(65) Prior Publication Data

US 2006/0039354 A1  Feb. 23, 2006

Related U.S. Application Data

(60) Provisional application No. 60/590,837, filed on Jul. 23, 2004, provisional application No. 60/601,431, filed on Aug. 13, 2004, provisional application No. 60/607,420, filed on Sep. 3, 2004, provisional application No. 60/608,814, filed on Sep. 10, 2004.

(51) Int. Cl.
*H04L 12/861* (2013.01)
*H04L 12/851* (2013.01)
(Continued)

(52) U.S. Cl.
CPC .......... *H04L 1/1854* (2013.01); *H04L 12/4633* (2013.01); *H04L 12/4641* (2013.01);
(Continued)

(58) Field of Classification Search
CPC .......................... H04L 12/5695; H04L 47/803
USPC .................................. 370/255; 709/223, 224
See application file for complete search history.

(56) References Cited

U.S. PATENT DOCUMENTS

| | | | |
|---|---|---|---|
| 4,479,195 | A | 10/1984 | Herr et al. |
| 4,701,844 | A | 10/1987 | Thompson et al. |

(Continued)

FOREIGN PATENT DOCUMENTS

| | | | |
|---|---|---|---|
| CN | 1394042 | | 1/2003 |
| CN | 1410905 | A | 4/2003 |

(Continued)

OTHER PUBLICATIONS

EP Communication for EP Patent Application No. 07007414.1 dated Jun. 5, 2008. (6 pages).

(Continued)

*Primary Examiner* — Asad Nawaz
*Assistant Examiner* — Jason Harley
(74) *Attorney, Agent, or Firm* — Foley & Lardner LLP; Christopher J. McKenna; Daniel E. Rose

(57) ABSTRACT

The present invention is generally directed towards a remote access architecture for providing peer-to-peer communications and remote access connectivity. In one embodiment, the remote access architecture of the present provides a method for establishing a direct connection between peer computing devices via a third computing device, such as a gateway. Additionally, the present invention provides the following techniques to optimize peer-to-peer communications: 1) false acknowledgement of receipt of network packets allowing communications via a lossless protocol of packets constructed for transmission via a lossy protocol, 2) payload shifting of network packets allowing communications via a lossless protocol of packets constructed for transmission via a lossy protocol, 3) reduction of packet fragmentation by adjusting the maximum transmission unit (MTU) parameter, accounting for overhead due to encryption, 4) application-aware prioritization of client-side network communications, and 5) network disruption shielding for reliable and persistent network connectivity and access.

20 Claims, 15 Drawing Sheets

(51) Int. Cl.

| | | |
|---|---|---|
| H04L 1/18 | (2006.01) | |
| H04L 12/46 | (2006.01) | |
| H04L 12/24 | (2006.01) | |
| H04L 12/26 | (2006.01) | |
| H04L 12/725 | (2013.01) | |
| H04L 12/801 | (2013.01) | |
| H04L 12/853 | (2013.01) | |
| H04L 12/859 | (2013.01) | |
| H04L 12/805 | (2013.01) | |
| H04L 29/06 | (2006.01) | |
| H04L 29/08 | (2006.01) | |

(52) U.S. Cl.
CPC ........ *H04L41/0806* (2013.01); *H04L 43/0817* (2013.01); *H04L 45/30* (2013.01); *H04L 47/10* (2013.01); *H04L 47/2416* (2013.01); *H04L 47/2433* (2013.01); *H04L 47/2475* (2013.01); *H04L 47/36* (2013.01); *H04L 63/029* (2013.01); *H04L 63/0236* (2013.01); *H04L 63/0272* (2013.01); *H04L 63/0428* (2013.01); *H04L 63/061* (2013.01); *H04L 63/062* (2013.01); *H04L 63/126* (2013.01); *H04L 67/14* (2013.01); *H04L 67/141* (2013.01); *H04L 41/0893* (2013.01); *H04L 63/164* (2013.01); *H04L 63/166* (2013.01)

(56) References Cited

U.S. PATENT DOCUMENTS

| | | | |
|---|---|---|---|
| 4,885,680 A | 12/1989 | Anthony et al. | |
| 4,935,870 A | 6/1990 | Burk et al. | |
| 5,301,270 A | 4/1994 | Steinberg et al. | |
| 5,307,413 A | 4/1994 | Denzer | |
| 5,329,619 A | 7/1994 | Page et al. | |
| 5,359,712 A | 10/1994 | Cohen et al. | |
| 5,511,208 A | 4/1996 | Boyles et al. | |
| 5,519,699 A | 5/1996 | Ohsawa | |
| 5,521,940 A | 5/1996 | Lane et al. | |
| 5,561,769 A | 10/1996 | Kumar et al. | |
| 5,623,492 A | 4/1997 | Teraslinna | |
| 5,625,793 A | 4/1997 | Mirza | |
| 5,657,390 A | 8/1997 | Elgamal et al. | |
| 5,671,226 A | 9/1997 | Murakami et al. | |
| 5,708,656 A | 1/1998 | Noneman et al. | |
| 5,742,829 A | 4/1998 | Davis et al. | |
| 5,758,085 A | 5/1998 | Kouoheris et al. | |
| 5,758,110 A | 5/1998 | Boss et al. | |
| 5,761,431 A | 6/1998 | Gross et al. | |
| 5,787,470 A | 7/1998 | DeSimone et al. | |
| 5,812,668 A | 9/1998 | Weber | |
| 5,815,462 A | 9/1998 | Konishi et al. | |
| 5,819,020 A | 10/1998 | Beeler, Jr. | |
| 5,822,524 A | 10/1998 | Chen et al. | |
| 5,828,840 A | 10/1998 | Cowan et al. | |
| 5,835,726 A | 11/1998 | Shwed et al. | |
| 5,838,920 A | 11/1998 | Rosborough | |
| 5,850,446 A | 12/1998 | Berger et al. | |
| 5,852,717 A | 12/1998 | Bhide et al. | |
| 5,859,835 A * | 1/1999 | Varma et al. | 370/229 |
| 5,864,837 A | 1/1999 | Maimone | |
| 5,881,229 A | 3/1999 | Singh et al. | |
| 5,889,863 A | 3/1999 | Weber | |
| 5,893,150 A | 4/1999 | Hagersten et al. | |
| 5,911,051 A * | 6/1999 | Carson et al. | 710/107 |
| 5,918,244 A | 6/1999 | Percival | |
| 5,925,100 A | 7/1999 | Drewry et al. | |
| 5,931,917 A | 8/1999 | Nguyen et al. | |
| 5,931,961 A | 8/1999 | Ranganathan et al. | |
| 5,933,605 A | 8/1999 | Kawano et al. | |
| 5,940,074 A | 8/1999 | Britt et al. | |
| 5,943,424 A | 8/1999 | Berger et al. | |
| 5,956,483 A | 9/1999 | Grate et al. | |
| 5,958,016 A | 9/1999 | Chang et al. | |
| 5,974,465 A * | 10/1999 | Wong | 709/234 |
| 5,978,840 A | 11/1999 | Nguyen et al. | |
| 5,983,208 A | 11/1999 | Haller et al. | |
| 5,987,132 A | 11/1999 | Rowney | |
| 5,987,482 A | 11/1999 | Bates et al. | |
| 5,987,611 A | 11/1999 | Freund | |
| 5,995,999 A | 11/1999 | Bharadhwaj | |
| 5,996,076 A | 11/1999 | Rowney et al. | |
| 5,999,179 A | 12/1999 | Kekic et al. | |
| 5,999,525 A | 12/1999 | Krishnaswamy et al. | |
| 6,002,767 A | 12/1999 | Kramer | |
| 6,021,470 A | 2/2000 | Frank et al. | |
| 6,023,724 A | 2/2000 | Bhatia et al. | |
| 6,026,379 A | 2/2000 | Haller et al. | |
| 6,026,440 A | 2/2000 | Shrader et al. | |
| 6,029,175 A | 2/2000 | Chow et al. | |
| 6,058,250 A | 5/2000 | Harwood et al. | |
| 6,061,715 A | 5/2000 | Hawes | |
| 6,061,769 A | 5/2000 | Kapulka et al. | |
| 6,061,796 A | 5/2000 | Chen et al. | |
| 6,067,569 A | 5/2000 | Khaki et al. | |
| 6,072,870 A | 6/2000 | Nguyen et al. | |
| 6,092,155 A | 7/2000 | Olnowich | |
| 6,101,543 A | 8/2000 | Alden et al. | |
| 6,112,085 A | 8/2000 | Garner et al. | |
| 6,119,105 A | 9/2000 | Williams | |
| 6,119,151 A | 9/2000 | Cantrell et al. | |
| 6,122,403 A | 9/2000 | Rhoads | |
| 6,128,627 A | 10/2000 | Mattis et al. | |
| 6,131,120 A | 10/2000 | Reid | |
| 6,141,686 A * | 10/2000 | Jackowski et al. | 709/224 |
| 6,144,775 A | 11/2000 | Williams et al. | |
| 6,157,955 A * | 12/2000 | Narad et al. | 709/228 |
| 6,161,123 A | 12/2000 | Renouard et al. | |
| 6,163,772 A | 12/2000 | Kramer et al. | |
| 6,170,017 B1 | 1/2001 | Dias et al. | |
| 6,173,325 B1 | 1/2001 | Kukreja | |
| 6,175,869 B1 | 1/2001 | Ahuja et al. | |
| 6,178,409 B1 | 1/2001 | Weber et al. | |
| 6,182,139 B1 | 1/2001 | Brendel | |
| 6,192,408 B1 | 2/2001 | Vahalia et al. | |
| 6,219,669 B1 | 4/2001 | Haff et al. | |
| 6,233,249 B1 | 5/2001 | Katseff et al. | |
| 6,233,606 B1 | 5/2001 | Dujari | |
| 6,233,619 B1 | 5/2001 | Narisi et al. | |
| 6,236,652 B1 | 5/2001 | Preston et al. | |
| 6,252,851 B1 | 6/2001 | Siu et al. | |
| 6,253,027 B1 | 6/2001 | Weber et al. | |
| 6,253,188 B1 | 6/2001 | Witek et al. | |
| 6,253,327 B1 | 6/2001 | Zhang et al. | |
| 6,256,773 B1 | 7/2001 | Bowman-Amuah | |
| 6,272,146 B1 | 8/2001 | Bowater et al. | |
| 6,272,148 B1 | 8/2001 | Takagi et al. | |
| 6,272,556 B1 | 8/2001 | Gish | |
| 6,282,172 B1 | 8/2001 | Robles et al. | |
| 6,289,382 B1 | 9/2001 | Bowman-Amuah | |
| 6,289,450 B1 | 9/2001 | Pensak et al. | |
| 6,301,249 B1 | 10/2001 | Mansfield et al. | |
| 6,304,915 B1 | 10/2001 | Nguyen et al. | |
| 6,308,273 B1 | 10/2001 | Goertzel et al. | |
| 6,321,235 B1 | 11/2001 | Bird | |
| 6,321,337 B1 | 11/2001 | Reshef et al. | |
| 6,324,525 B1 | 11/2001 | Kramer et al. | |
| 6,324,582 B1 | 11/2001 | Sridhar et al. | |
| 6,324,647 B1 | 11/2001 | Bowman-Amuah | |
| 6,324,648 B1 | 11/2001 | Grantges, Jr. | |
| 6,327,242 B1 | 12/2001 | Amicangioli et al. | |
| 6,332,163 B1 | 12/2001 | Bowman-Amuah | |
| 6,333,931 B1 | 12/2001 | LaPier et al. | |
| 6,334,664 B1 | 1/2002 | Silverbrook | |
| 6,339,832 B1 | 1/2002 | Bowman-Amuah | |
| 6,345,239 B1 | 2/2002 | Bowman-Amuah | |
| 6,360,265 B1 | 3/2002 | Falck et al. | |
| 6,363,363 B1 | 3/2002 | Haller et al. | |
| 6,363,478 B1 | 3/2002 | Lambert et al. | |
| 6,370,573 B1 | 4/2002 | Bowman-Amuah | |
| 6,370,599 B1 | 4/2002 | Anand et al. | |
| 6,373,950 B1 | 4/2002 | Rowney | |

(56) References Cited

U.S. PATENT DOCUMENTS

| | | | |
|---|---|---|---|
| 6,383,478 B1 | 5/2002 | Prokop et al. |
| 6,389,462 B1 | 5/2002 | Cohen et al. |
| 6,389,505 B1 | 5/2002 | Emma et al. |
| 6,398,359 B1 | 6/2002 | Silverbrook et al. |
| 6,405,364 B1 | 6/2002 | Bowman-Amuah |
| 6,412,000 B1 | 6/2002 | Riddle et al. |
| 6,415,329 B1 | 7/2002 | Gelman et al. |
| 6,425,057 B1 | 7/2002 | Cherkasova et al. |
| 6,427,132 B1 | 7/2002 | Bowman-Amuah |
| 6,427,187 B2 | 7/2002 | Malcolm |
| 6,431,777 B1 | 8/2002 | Silverbrook |
| 6,434,568 B1 | 8/2002 | Bowman-Amuah |
| 6,434,618 B1 | 8/2002 | Cohen et al. |
| 6,434,628 B1 * | 8/2002 | Bowman-Amuah ............ 714/48 |
| 6,438,127 B1 | 8/2002 | Le Goff et al. |
| 6,438,594 B1 | 8/2002 | Bowman-Amuah |
| 6,442,571 B1 | 8/2002 | Haff et al. |
| 6,442,682 B1 | 8/2002 | Pothapragada et al. |
| 6,442,748 B1 | 8/2002 | Bowman-Amuah |
| 6,447,113 B1 | 9/2002 | Silverbrook et al. |
| 6,449,658 B1 | 9/2002 | Lafe et al. |
| 6,449,695 B1 | 9/2002 | Bereznyi et al. |
| 6,452,915 B1 | 9/2002 | Jorgensen |
| 6,452,923 B1 | 9/2002 | Gerszberg et al. |
| 6,457,103 B1 | 9/2002 | Challenger et al. |
| 6,473,794 B1 | 10/2002 | Guheen et al. |
| 6,473,802 B2 | 10/2002 | Masters |
| 6,477,580 B1 | 11/2002 | Bowman-Amuah |
| 6,477,665 B1 | 11/2002 | Bowman-Amuah |
| 6,484,143 B1 | 11/2002 | Swildens et al. |
| 6,484,206 B2 | 11/2002 | Crump et al. |
| 6,487,641 B1 | 11/2002 | Cusson et al. |
| 6,496,481 B1 | 12/2002 | Wu et al. |
| 6,496,776 B1 | 12/2002 | Blumberg et al. |
| 6,496,850 B1 | 12/2002 | Bowman-Amuah |
| 6,496,935 B1 | 12/2002 | Fink et al. |
| 6,502,102 B1 | 12/2002 | Haswell et al. |
| 6,502,192 B1 | 12/2002 | Nguyen |
| 6,502,213 B1 | 12/2002 | Bowman-Amuah |
| 6,507,891 B1 | 1/2003 | Challenger et al. |
| 6,519,571 B1 | 2/2003 | Guheen et al. |
| 6,523,027 B1 | 2/2003 | Underwood |
| 6,529,909 B1 | 3/2003 | Bowman-Amuah |
| 6,529,948 B1 | 3/2003 | Bowman-Amuah |
| 6,536,037 B1 | 3/2003 | Guheen et al. |
| 6,539,396 B1 | 3/2003 | Bowman-Amuah |
| 6,549,949 B1 | 4/2003 | Bowman-Amuah |
| 6,550,012 B1 | 4/2003 | Villa et al. |
| 6,550,057 B1 | 4/2003 | Bowman-Amuah |
| 6,553,129 B1 | 4/2003 | Rhoads |
| 6,553,377 B1 | 4/2003 | Eschelbeck et al. |
| 6,553,409 B1 | 4/2003 | Zhang et al. |
| 6,567,806 B1 | 5/2003 | Tsuchida et al. |
| 6,571,282 B1 | 5/2003 | Bowman-Amuah |
| 6,574,668 B1 | 6/2003 | Gubbi et al. |
| 6,574,688 B1 | 6/2003 | Dale et al. |
| 6,578,068 B1 | 6/2003 | Bowman-Amuah |
| 6,578,073 B1 | 6/2003 | Starnes et al. |
| 6,584,569 B2 | 6/2003 | Reshef et al. |
| 6,587,806 B2 | 7/2003 | Mangiameli et al. |
| 6,590,588 B2 | 7/2003 | Lincke et al. |
| 6,591,266 B1 | 7/2003 | Li et al. |
| 6,594,690 B2 | 7/2003 | Cantwell |
| 6,598,075 B1 | 7/2003 | Ogdon et al. |
| 6,601,057 B1 | 7/2003 | Underwood et al. |
| 6,601,192 B1 | 7/2003 | Bowman-Amuah |
| 6,601,233 B1 | 7/2003 | Underwood |
| 6,601,234 B1 | 7/2003 | Bowman-Amuah |
| 6,603,738 B1 * | 8/2003 | Kari et al. .................. 370/230.1 |
| 6,606,660 B1 | 8/2003 | Bowman-Amuah |
| 6,606,663 B1 | 8/2003 | Liao et al. |
| 6,606,744 B1 | 8/2003 | Mikurak |
| 6,609,128 B1 | 8/2003 | Underwood |
| 6,611,262 B1 | 8/2003 | Suzuki |
| 6,611,522 B1 | 8/2003 | Zheng et al. |
| 6,611,822 B1 | 8/2003 | Beams et al. |
| 6,611,867 B1 | 8/2003 | Bowman-Amuah |
| 6,614,800 B1 | 9/2003 | Genty et al. |
| 6,615,166 B1 | 9/2003 | Guheen et al. |
| 6,615,199 B1 | 9/2003 | Bowman-Amuah |
| 6,615,253 B1 | 9/2003 | Bowman-Amuah |
| 6,618,359 B1 | 9/2003 | Chen et al. |
| 6,629,081 B1 | 9/2003 | Cornelius et al. |
| 6,631,986 B2 | 10/2003 | Silverbrook |
| 6,633,574 B1 | 10/2003 | Koch et al. |
| 6,633,878 B1 | 10/2003 | Underwood |
| 6,636,242 B2 | 10/2003 | Bowman-Amuah |
| 6,640,238 B1 | 10/2003 | Bowman-Amuah |
| 6,640,240 B1 | 10/2003 | Hoffman et al. |
| 6,640,244 B1 | 10/2003 | Bowman-Amuah |
| 6,640,248 B1 | 10/2003 | Jorgensen |
| 6,640,249 B1 | 10/2003 | Bowman-Amuah |
| 6,647,130 B2 | 11/2003 | Rhoads |
| 6,650,640 B1 | 11/2003 | Muller et al. |
| 6,652,089 B2 | 11/2003 | Silverbrook |
| 6,652,090 B2 | 11/2003 | Silverbrook |
| 6,662,221 B1 | 12/2003 | Gonda et al. |
| 6,662,357 B1 | 12/2003 | Bowman-Amuah |
| 6,664,978 B1 | 12/2003 | Kekic et al. |
| 6,671,818 B1 | 12/2003 | Mikurak |
| 6,678,734 B1 | 1/2004 | Haatainen et al. |
| 6,681,029 B1 | 1/2004 | Rhoads |
| 6,687,732 B1 | 2/2004 | Bector et al. |
| 6,691,227 B1 | 2/2004 | Neves et al. |
| 6,697,824 B1 | 2/2004 | Bowman-Amuah |
| 6,697,844 B1 | 2/2004 | Chan et al. |
| 6,697,849 B1 | 2/2004 | Carlson |
| 6,700,902 B1 | 3/2004 | Meyer |
| 6,701,345 B1 | 3/2004 | Carley et al. |
| 6,701,514 B1 | 3/2004 | Haswell et al. |
| 6,704,873 B1 | 3/2004 | Underwood |
| 6,715,037 B2 | 3/2004 | Malcolm |
| 6,715,145 B1 | 3/2004 | Bowman-Amuah |
| 6,718,535 B1 | 4/2004 | Underwood |
| 6,721,713 B1 | 4/2004 | Guheen et al. |
| 6,728,787 B1 | 4/2004 | Leigh |
| 6,732,237 B1 | 5/2004 | Jacobs et al. |
| 6,732,269 B1 | 5/2004 | Baskey et al. |
| 6,732,314 B1 | 5/2004 | Borella et al. |
| 6,735,601 B1 | 5/2004 | Subrahmanyam |
| 6,735,691 B1 | 5/2004 | Capps et al. |
| 6,742,015 B1 | 5/2004 | Bowman-Amuah |
| 6,744,774 B2 | 6/2004 | Sharma |
| 6,754,699 B2 | 6/2004 | Swildens et al. |
| 6,760,748 B1 | 7/2004 | Hakim |
| 6,766,373 B1 | 7/2004 | Beadle et al. |
| 6,772,203 B1 | 8/2004 | Feiertag et al. |
| 6,775,392 B1 | 8/2004 | Rhoads |
| 6,785,719 B1 | 8/2004 | Jacobson et al. |
| 6,788,315 B1 | 9/2004 | Kekic et al. |
| 6,789,170 B1 | 9/2004 | Jacobs et al. |
| 6,792,615 B1 | 9/2004 | Rowe et al. |
| 6,801,927 B1 | 10/2004 | Smith et al. |
| 6,802,020 B1 | 10/2004 | Smith |
| 6,807,607 B1 | 10/2004 | Lamparter |
| 6,820,125 B1 | 11/2004 | Dias et al. |
| 6,820,133 B1 | 11/2004 | Grove et al. |
| 6,820,974 B2 | 11/2004 | Silverbrook |
| 6,823,374 B2 | 11/2004 | Kausik et al. |
| 6,826,626 B1 | 11/2004 | McManus |
| 6,826,627 B2 | 11/2004 | Sjollema et al. |
| 6,831,898 B1 | 12/2004 | Edsall et al. |
| 6,842,906 B1 | 1/2005 | Bowman-Amuah |
| 6,847,892 B2 | 1/2005 | Zhou et al. |
| 6,850,252 B1 | 2/2005 | Hoffberg |
| 6,870,921 B1 | 3/2005 | Elsey et al. |
| 6,873,988 B2 | 3/2005 | Herrmann et al. |
| 6,880,086 B2 | 4/2005 | Kidder et al. |
| 6,883,068 B2 | 4/2005 | Tsirigotis et al. |
| 6,888,927 B1 | 5/2005 | Cruickshank et al. |
| 6,894,981 B1 | 5/2005 | Coile et al. |
| 6,899,420 B2 | 5/2005 | Silverbrook |
| 6,901,072 B1 | 5/2005 | Wong |
| 6,904,449 B1 | 6/2005 | Quinones |

(56) References Cited

U.S. PATENT DOCUMENTS

| | | |
|---|---|---|
| 6,904,519 B2 | 6/2005 | Anand et al. |
| 6,907,546 B1 | 6/2005 | Haswell et al. |
| 6,910,074 B1 * | 6/2005 | Amin et al. .................. 709/227 |
| 6,912,522 B2 | 6/2005 | Edgar |
| 6,918,113 B2 | 7/2005 | Patel et al. |
| 6,918,665 B2 | 7/2005 | Silverbrook |
| 6,920,502 B2 | 7/2005 | Araujo et al. |
| 6,925,495 B2 | 8/2005 | Hegde et al. |
| 6,934,288 B2 | 8/2005 | Dempo |
| 6,935,736 B2 | 8/2005 | Silverbrook |
| 6,944,279 B2 | 9/2005 | Elsey et al. |
| 6,950,848 B1 | 9/2005 | Yousefi'zadeh |
| 6,954,736 B2 | 10/2005 | Menninger et al. |
| 6,954,877 B2 | 10/2005 | Earl et al. |
| 6,957,186 B1 | 10/2005 | Guheen et al. |
| 6,957,249 B2 | 10/2005 | Salo et al. |
| 6,959,320 B2 | 10/2005 | Shah et al. |
| 6,974,928 B2 | 12/2005 | Bloom |
| 6,976,090 B2 | 12/2005 | Ben-Shaul et al. |
| 6,980,962 B1 | 12/2005 | Arganbright et al. |
| 6,981,029 B1 | 12/2005 | Menditto et al. |
| 6,990,070 B1 | 1/2006 | Aweya et al. |
| 6,990,480 B1 | 1/2006 | Burt |
| 6,993,016 B1 | 1/2006 | Liva et al. |
| 6,996,628 B2 | 2/2006 | Keane et al. |
| 6,996,631 B1 | 2/2006 | Aiken et al. |
| 7,000,012 B2 | 2/2006 | Moore et al. |
| 7,007,092 B2 | 2/2006 | Peiffer |
| 7,007,103 B2 | 2/2006 | Pinkerton et al. |
| 7,010,300 B1 | 3/2006 | Jones et al. |
| 7,013,290 B2 | 3/2006 | Ananian |
| 7,016,055 B2 | 3/2006 | Dodge et al. |
| 7,020,719 B1 | 3/2006 | Grove et al. |
| 7,023,979 B1 | 4/2006 | Wu et al. |
| 7,024,452 B1 | 4/2006 | O'Connell et al. |
| 7,026,954 B2 | 4/2006 | Slemmer et al. |
| 7,027,055 B2 | 4/2006 | Anderson et al. |
| 7,028,083 B2 | 4/2006 | Levine et al. |
| 7,028,333 B2 | 4/2006 | Tuomenoksa et al. |
| 7,028,334 B2 | 4/2006 | Tuomenoksa |
| 7,031,314 B2 | 4/2006 | Craig et al. |
| 7,034,691 B1 | 4/2006 | Rapaport et al. |
| 7,035,427 B2 | 4/2006 | Rhoads |
| 7,036,142 B1 | 4/2006 | Zhang et al. |
| 7,039,606 B2 | 5/2006 | Hoffman et al. |
| 7,039,708 B1 | 5/2006 | Knobl et al. |
| 7,042,879 B2 | 5/2006 | Eschbach et al. |
| 7,043,529 B1 | 5/2006 | Simonoff |
| 7,047,279 B1 | 5/2006 | Beams et al. |
| 7,047,424 B2 | 5/2006 | Bendinelli et al. |
| 7,051,161 B2 | 5/2006 | Dixit et al. |
| 7,051,316 B2 | 5/2006 | Charisius et al. |
| 7,054,837 B2 | 5/2006 | Hoffman et al. |
| 7,054,944 B2 | 5/2006 | Tang et al. |
| 7,055,028 B2 | 5/2006 | Peiffer et al. |
| 7,055,169 B2 | 5/2006 | Delpuch et al. |
| 7,055,947 B2 | 6/2006 | Silverbrook |
| 7,057,759 B2 | 6/2006 | Lapstun et al. |
| 7,069,234 B1 | 6/2006 | Cornelius et al. |
| 7,070,110 B2 | 7/2006 | Lapstun et al. |
| 7,072,665 B1 | 7/2006 | Blumberg et al. |
| 7,072,843 B2 | 7/2006 | Menninger et al. |
| 7,072,965 B2 | 7/2006 | Ryuutou et al. |
| 7,080,041 B2 | 7/2006 | Nagel |
| 7,082,409 B1 | 7/2006 | Cherry |
| 7,085,683 B2 | 8/2006 | Anderson et al. |
| 7,085,834 B2 | 8/2006 | Delany et al. |
| 7,085,854 B2 | 8/2006 | Keane et al. |
| 7,086,728 B2 | 8/2006 | Silverbrook |
| 7,092,370 B2 | 8/2006 | Jiang et al. |
| 7,096,009 B2 | 8/2006 | Mousseau et al. |
| 7,096,418 B1 | 8/2006 | Singhal et al. |
| 7,096,495 B1 | 8/2006 | Warrier et al. |
| 7,097,106 B2 | 8/2006 | Silverbrook et al. |
| 7,100,195 B1 | 8/2006 | Underwood |
| 7,103,068 B1 | 9/2006 | Gardner et al. |
| 7,107,285 B2 | 9/2006 | von Kaenel et al. |
| 7,113,779 B1 | 9/2006 | Fujisaki et al. |
| 7,113,962 B1 | 9/2006 | Kee et al. |
| 7,114,180 B1 | 9/2006 | DeCaprio |
| 7,117,504 B2 | 10/2006 | Smith et al. |
| 7,117,530 B1 | 10/2006 | Lin |
| 7,120,596 B2 | 10/2006 | Hoffman et al. |
| 7,120,666 B2 | 10/2006 | McCanne et al. |
| 7,120,690 B1 | 10/2006 | Krishnan et al. |
| 7,120,852 B2 | 10/2006 | Terry et al. |
| 7,124,101 B1 | 10/2006 | Mikurak |
| 7,124,442 B2 | 10/2006 | Nash-Putnam |
| 7,126,955 B2 | 10/2006 | Nabhan et al. |
| 7,128,265 B2 | 10/2006 | Silverbrook et al. |
| 7,128,270 B2 | 10/2006 | Silverbrook et al. |
| 7,130,792 B2 | 10/2006 | Tokieda et al. |
| 7,130,807 B1 | 10/2006 | Mikurak |
| 7,131,596 B2 | 11/2006 | Lapstun et al. |
| 7,134,131 B1 | 11/2006 | Hendricks et al. |
| 7,135,991 B2 | 11/2006 | Slemmer et al. |
| 7,136,645 B2 | 11/2006 | Hanson et al. |
| 7,137,566 B2 | 11/2006 | Silverbrook et al. |
| 7,139,999 B2 | 11/2006 | Bowman-Amuah |
| 7,140,044 B2 | 11/2006 | Redlich et al. |
| 7,143,153 B1 | 11/2006 | Black et al. |
| 7,144,095 B2 | 12/2006 | Silverbrook |
| 7,146,384 B2 | 12/2006 | Sawafta |
| 7,146,644 B2 | 12/2006 | Redlich et al. |
| 7,149,698 B2 | 12/2006 | Guheen et al. |
| 7,149,897 B2 | 12/2006 | Chincheck et al. |
| 7,149,959 B1 | 12/2006 | Jones et al. |
| 7,150,398 B2 | 12/2006 | Silverbrook et al. |
| 7,152,047 B1 | 12/2006 | Nagel |
| 7,152,092 B2 | 12/2006 | Beams et al. |
| 7,152,207 B1 | 12/2006 | Underwood et al. |
| 7,155,518 B2 | 12/2006 | Forslow |
| 7,155,676 B2 | 12/2006 | Land et al. |
| 7,159,014 B2 | 1/2007 | Kausik et al. |
| 7,159,777 B2 | 1/2007 | Silverbrook et al. |
| 7,162,540 B2 | 1/2007 | Jasen et al. |
| 7,164,680 B2 | 1/2007 | Loguinov |
| 7,165,041 B1 | 1/2007 | Guheen et al. |
| 7,167,844 B1 | 1/2007 | Leong et al. |
| 7,171,379 B2 | 1/2007 | Menninger et al. |
| 7,175,089 B2 | 2/2007 | Silverbrook et al. |
| 7,178,106 B2 | 2/2007 | Lamkin et al. |
| 7,178,719 B2 | 2/2007 | Silverbrook et al. |
| 7,181,766 B2 | 2/2007 | Bendinelli et al. |
| 7,184,445 B2 | 2/2007 | Gupta et al. |
| 7,187,470 B2 | 3/2007 | Lapstun et al. |
| 7,188,273 B2 | 3/2007 | Allen et al. |
| 7,188,769 B2 | 3/2007 | Silverbrook et al. |
| 7,191,252 B2 | 3/2007 | Redlich et al. |
| 7,194,761 B1 | 3/2007 | Champagne |
| 7,197,374 B2 | 3/2007 | Silverbrook et al. |
| 7,197,502 B2 | 3/2007 | Feinsmith |
| 7,197,570 B2 | 3/2007 | Eylon et al. |
| 7,197,602 B2 | 3/2007 | Malcolm |
| 7,197,751 B2 | 3/2007 | Fedotov et al. |
| 7,199,885 B2 | 4/2007 | Dodge |
| 7,200,804 B1 | 4/2007 | Khavari et al. |
| 7,206,811 B2 | 4/2007 | Skurikhin et al. |
| 7,207,483 B2 | 4/2007 | Silverbrook et al. |
| 7,207,485 B2 | 4/2007 | Silverbrook et al. |
| 7,212,296 B2 | 5/2007 | Dodge et al. |
| 7,216,173 B2 | 5/2007 | Clayton et al. |
| 7,219,127 B2 | 5/2007 | Huck et al. |
| 7,221,660 B1 | 5/2007 | Simonson et al. |
| 7,222,152 B1 | 5/2007 | Thompson et al. |
| 7,222,305 B2 | 5/2007 | Teplov et al. |
| 7,225,040 B2 | 5/2007 | Eller et al. |
| 7,225,244 B2 | 5/2007 | Reynolds et al. |
| 7,225,382 B2 | 5/2007 | Ramech et al. |
| 7,228,459 B2 | 6/2007 | Jiang et al. |
| 7,246,233 B2 | 7/2007 | Brabson et al. |
| 7,260,617 B2 | 8/2007 | Bazinet et al. |
| 7,260,840 B2 | 8/2007 | Swander |
| 7,263,071 B2 | 8/2007 | Yim |

(56) References Cited

U.S. PATENT DOCUMENTS

| | | |
|---|---|---|
| 7,272,853 B2 | 9/2007 | Goodman et al. |
| 7,284,044 B2 | 10/2007 | Teraoaka et al. |
| 7,318,100 B2 | 1/2008 | Demmer et al. |
| 7,321,906 B2 | 1/2008 | Green |
| 7,328,267 B1 | 2/2008 | Bashyam et al. |
| 7,340,772 B2 | 3/2008 | Panasyuk et al. |
| 7,353,533 B2 | 4/2008 | Wright et al. |
| 7,363,347 B2 | 4/2008 | Thomas |
| 7,363,378 B2 | 4/2008 | Holmes et al. |
| 7,370,353 B2 | 5/2008 | Yang |
| 7,386,631 B1 | 6/2008 | Sibal et al. |
| 7,389,462 B1 | 6/2008 | Wang et al. |
| 7,392,348 B2 | 6/2008 | Dumont |
| 7,398,320 B1 | 7/2008 | Minakuchi et al. |
| 7,398,552 B2 | 7/2008 | Pardee et al. |
| 7,401,116 B1 | 7/2008 | Chalfin et al. |
| 7,401,158 B2 | 7/2008 | Beauchamp et al. |
| 7,404,003 B1 | 7/2008 | Noble |
| 7,406,533 B2 | 7/2008 | Li et al. |
| 7,409,708 B2 | 8/2008 | Goodman et al. |
| 7,415,723 B2 | 8/2008 | Pandya |
| 7,420,992 B1 | 9/2008 | Fang et al. |
| 7,433,314 B2 | 10/2008 | Sharma et al. |
| 7,441,119 B2 | 10/2008 | Brabson et al. |
| 7,458,095 B2 | 11/2008 | Forsberg |
| 7,464,264 B2 | 12/2008 | Goodman et al. |
| 7,480,312 B2 | 1/2009 | Ossman |
| 7,496,659 B1 | 2/2009 | Coverdill et al. |
| 7,505,455 B1 | 3/2009 | Goodwin et al. |
| 7,512,702 B1 | 3/2009 | Srivastava et al. |
| 7,522,581 B2 | 4/2009 | Acharya et al. |
| 7,533,409 B2 | 5/2009 | Keane et al. |
| 7,536,715 B2 | 5/2009 | Markham |
| 7,577,144 B2 | 8/2009 | Chang et al. |
| 7,606,902 B2 | 10/2009 | Rao et al. |
| 7,609,721 B2 | 10/2009 | Rao et al. |
| 7,644,188 B2 | 1/2010 | Vlodavsky et al. |
| 7,673,048 B1 | 3/2010 | O'Toole et al. |
| 7,676,048 B2 | 3/2010 | Tsutsui |
| 7,757,074 B2 | 7/2010 | Sundarrajan et al. |
| 7,774,499 B1 | 8/2010 | Popek et al. |
| 7,775,074 B1 | 8/2010 | Tobias et al. |
| 7,810,089 B2 | 10/2010 | Sundarrajan et al. |
| 7,849,199 B2 | 12/2010 | Schulz et al. |
| 7,882,247 B2 | 2/2011 | Sturniolo et al. |
| 7,921,184 B2 | 4/2011 | Sundarrajan et al. |
| 7,929,442 B2 | 4/2011 | Connor et al. |
| 7,945,678 B1 | 5/2011 | Skene |
| 7,979,528 B2 | 7/2011 | Eisenberg et al. |
| 7,979,694 B2 | 7/2011 | Touitou et al. |
| 8,005,981 B2 | 8/2011 | Tuck et al. |
| 8,205,000 B2 | 6/2012 | Chang et al. |
| 8,223,647 B2 | 7/2012 | Kakani et al. |
| 8,250,214 B2 | 8/2012 | Susai et al. |
| 8,255,456 B2 | 8/2012 | Sundarrajan et al. |
| 8,261,057 B2 | 9/2012 | Sundarrajan et al. |
| 8,291,119 B2 | 10/2012 | Rao et al. |
| 8,351,327 B1 | 1/2013 | Binns |
| 8,495,305 B2 | 7/2013 | Sundarrajan et al. |
| 8,499,057 B2 | 7/2013 | Sundarrajan et al. |
| 8,559,449 B2 | 10/2013 | Rao et al. |
| 2001/0030970 A1 | 10/2001 | Wiryaman et al. |
| 2001/0037387 A1 | 11/2001 | Gilde et al. |
| 2001/0043600 A1 | 11/2001 | Chatterjee et al. |
| 2001/0046212 A1 | 11/2001 | Nakajima |
| 2001/0047406 A1 | 11/2001 | Araujo et al. |
| 2001/0049717 A1 | 12/2001 | Freeman et al. |
| 2001/0049741 A1 | 12/2001 | Skene et al. |
| 2001/0052016 A1 | 12/2001 | Skene et al. |
| 2001/0052065 A1* | 12/2001 | Alexander, III et al. ...... 712/228 |
| 2002/0004834 A1 | 1/2002 | Guenther et al. |
| 2002/0004902 A1 | 1/2002 | Toh et al. |
| 2002/0007402 A1 | 1/2002 | Thomas Huston et al. |
| 2002/0007404 A1 | 1/2002 | Vange et al. |
| 2002/0016827 A1 | 2/2002 | McCabe et al. |
| 2002/0023210 A1 | 2/2002 | Tuomenoksa et al. |
| 2002/0026478 A1 | 2/2002 | Rodgers et al. |
| 2002/0026531 A1 | 2/2002 | Keane et al. |
| 2002/0029285 A1 | 3/2002 | Collins |
| 2002/0032725 A1 | 3/2002 | Araujo et al. |
| 2002/0032798 A1 | 3/2002 | Xu |
| 2002/0035451 A1 | 3/2002 | Rothermel |
| 2002/0035596 A1 | 3/2002 | Yang et al. |
| 2002/0038339 A1 | 3/2002 | Xu |
| 2002/0042875 A1 | 4/2002 | Shukla |
| 2002/0049608 A1 | 4/2002 | Hartsell et al. |
| 2002/0049841 A1 | 4/2002 | Johnson et al. |
| 2002/0055966 A1 | 5/2002 | Border et al. |
| 2002/0057717 A1* | 5/2002 | Mallory ........................ 370/503 |
| 2002/0059274 A1 | 5/2002 | Hartsell et al. |
| 2002/0059429 A1 | 5/2002 | Carpenter et al. |
| 2002/0059435 A1 | 5/2002 | Border et al. |
| 2002/0065864 A1 | 5/2002 | Hartsell et al. |
| 2002/0065919 A1 | 5/2002 | Taylor et al. |
| 2002/0069278 A1 | 6/2002 | Forslow |
| 2002/0071438 A1 | 6/2002 | Singh |
| 2002/0073061 A1 | 6/2002 | Collins |
| 2002/0073298 A1 | 6/2002 | Geiger et al. |
| 2002/0081971 A1 | 6/2002 | Travostino |
| 2002/0083175 A1 | 6/2002 | Afek et al. |
| 2002/0083183 A1 | 6/2002 | Pujare et al. |
| 2002/0087729 A1 | 7/2002 | Edgar |
| 2002/0091788 A1 | 7/2002 | Chlan et al. |
| 2002/0095400 A1 | 7/2002 | Johnson et al. |
| 2002/0095498 A1* | 7/2002 | Chanda et al. ................ 709/225 |
| 2002/0098840 A1 | 7/2002 | Hanson et al. |
| 2002/0099940 A1 | 7/2002 | Wang |
| 2002/0101848 A1 | 8/2002 | Lee et al. |
| 2002/0101860 A1 | 8/2002 | Thornton et al. |
| 2002/0105972 A1 | 8/2002 | Richter et al. |
| 2002/0107903 A1 | 8/2002 | Richter et al. |
| 2002/0107962 A1 | 8/2002 | Richter et al. |
| 2002/0107971 A1 | 8/2002 | Bailey et al. |
| 2002/0107989 A1 | 8/2002 | Johnson et al. |
| 2002/0107990 A1 | 8/2002 | Johnson et al. |
| 2002/0108059 A1 | 8/2002 | Canion et al. |
| 2002/0116452 A1 | 8/2002 | Johnson et al. |
| 2002/0116582 A1 | 8/2002 | Copeland et al. |
| 2002/0120743 A1 | 8/2002 | Shabtay et al. |
| 2002/0126675 A1 | 9/2002 | Yoshimura et al. |
| 2002/0133593 A1 | 9/2002 | Johnson et al. |
| 2002/0138511 A1 | 9/2002 | Psounis et al. |
| 2002/0138572 A1 | 9/2002 | Delany et al. |
| 2002/0138618 A1 | 9/2002 | Szabo |
| 2002/0138640 A1 | 9/2002 | Raz et al. |
| 2002/0147795 A1 | 10/2002 | Cantwell |
| 2002/0147822 A1 | 10/2002 | Susai et al. |
| 2002/0150064 A1 | 10/2002 | Lucidarme |
| 2002/0152373 A1 | 10/2002 | Sun et al. |
| 2002/0152423 A1 | 10/2002 | McCabe |
| 2002/0156927 A1 | 10/2002 | Boucher et al. |
| 2002/0161908 A1 | 10/2002 | Benitez et al. |
| 2002/0163882 A1 | 11/2002 | Bornstein et al. |
| 2002/0174227 A1 | 11/2002 | Hartsell et al. |
| 2002/0174255 A1 | 11/2002 | Hayter et al. |
| 2002/0176532 A1 | 11/2002 | McClelland et al. |
| 2002/0184224 A1 | 12/2002 | Haff et al. |
| 2002/0194382 A1 | 12/2002 | Kausik et al. |
| 2002/0196279 A1* | 12/2002 | Bloomfield et al. .......... 345/749 |
| 2002/0199007 A1 | 12/2002 | Clayton et al. |
| 2003/0009538 A1 | 1/2003 | Shah et al. |
| 2003/0014623 A1 | 1/2003 | Freed et al. |
| 2003/0014624 A1 | 1/2003 | Maturana et al. |
| 2003/0014625 A1 | 1/2003 | Freed et al. |
| 2003/0014628 A1 | 1/2003 | Freed et al. |
| 2003/0014650 A1 | 1/2003 | Freed et al. |
| 2003/0018891 A1 | 1/2003 | Hall et al. |
| 2003/0023767 A1 | 1/2003 | Brabson et al. |
| 2003/0026241 A1 | 2/2003 | Ono et al. |
| 2003/0033520 A1 | 2/2003 | Peiffer et al. |
| 2003/0037108 A1 | 2/2003 | Peiffer et al. |
| 2003/0039354 A1 | 2/2003 | Kimble et al. |
| 2003/0046586 A1 | 3/2003 | Bheemarasetti et al. |
| 2003/0046587 A1 | 3/2003 | Bheemarasetti et al. |

(56) References Cited

U.S. PATENT DOCUMENTS

| | | |
|---|---|---|
| 2003/0051100 A1 | 3/2003 | Patel |
| 2003/0051102 A1 | 3/2003 | Jacobs et al. |
| 2003/0055883 A1 | 3/2003 | Wiles, Jr. |
| 2003/0055962 A1 | 3/2003 | Freund et al. |
| 2003/0061505 A1 | 3/2003 | Sperry et al. |
| 2003/0065646 A1 | 4/2003 | Joseph et al. |
| 2003/0065763 A1 | 4/2003 | Swildens et al. |
| 2003/0067874 A1 | 4/2003 | See et al. |
| 2003/0069941 A1 | 4/2003 | Peiffer |
| 2003/0079031 A1 | 4/2003 | Nagano |
| 2003/0084162 A1 | 5/2003 | Johnson et al. |
| 2003/0084165 A1 | 5/2003 | Kjellberg et al. |
| 2003/0088698 A1 | 5/2003 | Singh et al. |
| 2003/0088788 A1 | 5/2003 | Yang |
| 2003/0093566 A1 | 5/2003 | Jardin |
| 2003/0105604 A1 | 6/2003 | Ash et al. |
| 2003/0105977 A1 | 6/2003 | Brabson et al. |
| 2003/0110296 A1 | 6/2003 | Kirsch et al. |
| 2003/0110379 A1 | 6/2003 | Ylonen et al. |
| 2003/0112809 A1 | 6/2003 | Bharali et al. |
| 2003/0112823 A1 | 6/2003 | Collins et al. |
| 2003/0115421 A1 | 6/2003 | McHenry et al. |
| 2003/0123394 A1 | 7/2003 | Neale et al. |
| 2003/0123481 A1 | 7/2003 | Neale et al. |
| 2003/0131079 A1 | 7/2003 | Neale et al. |
| 2003/0131263 A1 | 7/2003 | Keane et al. |
| 2003/0135505 A1 | 7/2003 | Hind et al. |
| 2003/0140121 A1 | 7/2003 | Adams |
| 2003/0149899 A1 | 8/2003 | Boden et al. |
| 2003/0152028 A1 | 8/2003 | Raisanen et al. |
| 2003/0152096 A1* | 8/2003 | Chapman ............... 370/412 |
| 2003/0154110 A1 | 8/2003 | Walter et al. |
| 2003/0154239 A1 | 8/2003 | Davis et al. |
| 2003/0165138 A1 | 9/2003 | Swonk et al. |
| 2003/0167403 A1 | 9/2003 | McCurley et al. |
| 2003/0174718 A1 | 9/2003 | Sampath et al. |
| 2003/0177389 A1 | 9/2003 | Albert et al. |
| 2003/0177395 A1 | 9/2003 | Pardee et al. |
| 2003/0182423 A1 | 9/2003 | Shafir et al. |
| 2003/0182431 A1 | 9/2003 | Sturniolo et al. |
| 2003/0182437 A1 | 9/2003 | Kobayashi et al. |
| 2003/0188001 A1 | 10/2003 | Eisenberg et al. |
| 2003/0191799 A1 | 10/2003 | Araujo et al. |
| 2003/0191812 A1 | 10/2003 | Agarwalla et al. |
| 2003/0198189 A1 | 10/2003 | Roberts et al. |
| 2003/0200295 A1 | 10/2003 | Roberts et al. |
| 2003/0200353 A1 | 10/2003 | Dogra et al. |
| 2003/0208602 A1 | 11/2003 | Bhalla et al. |
| 2003/0212760 A1 | 11/2003 | Chen et al. |
| 2003/0212776 A1 | 11/2003 | Roberts et al. |
| 2003/0217105 A1 | 11/2003 | Zircher et al. |
| 2003/0217126 A1 | 11/2003 | Polcha et al. |
| 2003/0217149 A1 | 11/2003 | Crichton et al. |
| 2003/0223361 A1 | 12/2003 | Hussain et al. |
| 2003/0223418 A1 | 12/2003 | Desai et al. |
| 2003/0223433 A1 | 12/2003 | Lee et al. |
| 2003/0226018 A1 | 12/2003 | Tardo et al. |
| 2003/0229718 A1 | 12/2003 | Tock et al. |
| 2003/0229761 A1 | 12/2003 | Basu et al. |
| 2003/0233423 A1 | 12/2003 | Dilley et al. |
| 2003/0236831 A1 | 12/2003 | Ortiz et al. |
| 2003/0236837 A1 | 12/2003 | Johnson et al. |
| 2003/0236861 A1 | 12/2003 | Johnson et al. |
| 2003/0236919 A1 | 12/2003 | Johnson et al. |
| 2004/0003101 A1 | 1/2004 | Roth et al. |
| 2004/0003137 A1 | 1/2004 | Callender et al. |
| 2004/0006708 A1 | 1/2004 | Mukherjee et al. |
| 2004/0008693 A1 | 1/2004 | Grove et al. |
| 2004/0010601 A1 | 1/2004 | Afergan et al. |
| 2004/0010604 A1 | 1/2004 | Tanaka et al. |
| 2004/0010621 A1 | 1/2004 | Afergan et al. |
| 2004/0026971 A1 | 2/2004 | McClellan-Derrickson |
| 2004/0031058 A1 | 2/2004 | Reisman |
| 2004/0034744 A1 | 2/2004 | Karlsson et al. |
| 2004/0034794 A1 | 2/2004 | Mayer et al. |
| 2004/0039827 A1 | 2/2004 | Thomas et al. |
| 2004/0042487 A1 | 3/2004 | Ossman |
| 2004/0044521 A1 | 3/2004 | Chen et al. |
| 2004/0044731 A1 | 3/2004 | Chen et al. |
| 2004/0049515 A1 | 3/2004 | Haff et al. |
| 2004/0073716 A1 | 4/2004 | Boom et al. |
| 2004/0078621 A1 | 4/2004 | Talaugon et al. |
| 2004/0078772 A1 | 4/2004 | Balay et al. |
| 2004/0087304 A1 | 5/2004 | Buddhikot et al. |
| 2004/0098486 A1 | 5/2004 | Gu et al. |
| 2004/0100976 A1 | 5/2004 | Chang et al. |
| 2004/0103150 A1 | 5/2004 | Ogdon et al. |
| 2004/0103225 A1 | 5/2004 | McAlpine et al. |
| 2004/0103438 A1 | 5/2004 | Yan et al. |
| 2004/0107360 A1 | 6/2004 | Herrmann et al. |
| 2004/0111519 A1 | 6/2004 | Fu et al. |
| 2004/0128252 A1 | 7/2004 | Shirai et al. |
| 2004/0128346 A1 | 7/2004 | Melamed et al. |
| 2004/0141525 A1 | 7/2004 | Bhushan et al. |
| 2004/0143655 A1 | 7/2004 | Narad et al. |
| 2004/0143734 A1 | 7/2004 | Buer et al. |
| 2004/0146053 A1 | 7/2004 | Nabhan et al. |
| 2004/0162876 A1 | 8/2004 | Kohavi |
| 2004/0177158 A1 | 9/2004 | Bauch et al. |
| 2004/0177359 A1 | 9/2004 | Bauch et al. |
| 2004/0190092 A1 | 9/2004 | Silverbrook et al. |
| 2004/0202160 A1 | 10/2004 | Westphal |
| 2004/0202171 A1 | 10/2004 | Hama |
| 2004/0203296 A1 | 10/2004 | Moreton et al. |
| 2004/0205439 A1 | 10/2004 | Carmeli et al. |
| 2004/0210320 A1 | 10/2004 | Pandya |
| 2004/0213248 A1 | 10/2004 | Okuda et al. |
| 2004/0215665 A1 | 10/2004 | Edgar et al. |
| 2004/0215746 A1 | 10/2004 | McCanne et al. |
| 2004/0221031 A1 | 11/2004 | Desai |
| 2004/0225898 A1* | 11/2004 | Frost et al. ............... 713/201 |
| 2004/0225911 A1 | 11/2004 | Smith |
| 2004/0246971 A1 | 12/2004 | Banerjee et al. |
| 2004/0249911 A1 | 12/2004 | Alkhatib et al. |
| 2004/0249975 A1 | 12/2004 | Tuck et al. |
| 2004/0258003 A1 | 12/2004 | Kokot et al. |
| 2004/0260922 A1 | 12/2004 | Goodman et al. |
| 2004/0268175 A1 | 12/2004 | Koch et al. |
| 2004/0268357 A1 | 12/2004 | Joy et al. |
| 2004/0268358 A1 | 12/2004 | Darling et al. |
| 2005/0005014 A1 | 1/2005 | Holmes et al. |
| 2005/0005107 A1 | 1/2005 | Touboul |
| 2005/0013280 A1 | 1/2005 | Buddhikot et al. |
| 2005/0021511 A1 | 1/2005 | Zarom |
| 2005/0021761 A1 | 1/2005 | Thomas |
| 2005/0021762 A1 | 1/2005 | Gbadegesin |
| 2005/0022011 A1 | 1/2005 | Swander et al. |
| 2005/0022012 A1 | 1/2005 | Bluestone et al. |
| 2005/0022031 A1 | 1/2005 | Goodman et al. |
| 2005/0025150 A1 | 2/2005 | Helmy et al. |
| 2005/0027788 A1 | 2/2005 | Koopmans et al. |
| 2005/0031058 A1 | 2/2005 | Soong et al. |
| 2005/0033858 A1 | 2/2005 | Swildens et al. |
| 2005/0033926 A1 | 2/2005 | Dumont |
| 2005/0044350 A1 | 2/2005 | White et al. |
| 2005/0050317 A1 | 3/2005 | Kramer et al. |
| 2005/0055690 A1 | 3/2005 | Cornillon et al. |
| 2005/0058112 A1 | 3/2005 | Lahey et al. |
| 2005/0080850 A1 | 4/2005 | Salesky et al. |
| 2005/0080907 A1 | 4/2005 | Panasyuk et al. |
| 2005/0094582 A1 | 5/2005 | Forissier et al. |
| 2005/0102529 A1 | 5/2005 | Buddhikot et al. |
| 2005/0108412 A1 | 5/2005 | Sjollema et al. |
| 2005/0108517 A1 | 5/2005 | Dillon et al. |
| 2005/0122980 A1 | 6/2005 | Anand et al. |
| 2005/0125663 A1 | 6/2005 | Funk |
| 2005/0132030 A1 | 6/2005 | Hopen et al. |
| 2005/0132060 A1 | 6/2005 | Mo et al. |
| 2005/0135250 A1 | 6/2005 | Singh et al. |
| 2005/0144186 A1 | 6/2005 | Hesselink et al. |
| 2005/0144481 A1 | 6/2005 | Hopen et al. |
| 2005/0144614 A1 | 6/2005 | Moslander et al. |
| 2005/0147126 A1 | 7/2005 | Qiu et al. |
| 2005/0149481 A1 | 7/2005 | Hesselink et al. |

(56) References Cited

U.S. PATENT DOCUMENTS

| | | |
|---|---|---|
| 2005/0149726 A1 | 7/2005 | Joshi et al. |
| 2005/0165928 A1 | 7/2005 | Shu et al. |
| 2005/0177866 A1 | 8/2005 | Kirsch |
| 2005/0185647 A1 | 8/2005 | Rao et al. |
| 2005/0193075 A1 | 9/2005 | Haff et al. |
| 2005/0195780 A1 | 9/2005 | Haverinen et al. |
| 2005/0198380 A1 | 9/2005 | Panasyuk et al. |
| 2005/0198532 A1 | 9/2005 | Comlekoglu et al. |
| 2005/0210150 A1 | 9/2005 | Bahl |
| 2005/0223084 A1 | 10/2005 | Cheng |
| 2005/0223412 A1 | 10/2005 | Nadalin et al. |
| 2005/0232161 A1 | 10/2005 | Maufer et al. |
| 2005/0232298 A1 | 10/2005 | Beverly et al. |
| 2005/0246346 A1 | 11/2005 | Gerdes et al. |
| 2005/0246445 A1 | 11/2005 | Panasyuk et al. |
| 2005/0256923 A1 | 11/2005 | Adachi |
| 2005/0259634 A1 | 11/2005 | Ross |
| 2005/0262357 A1 | 11/2005 | Araujo et al. |
| 2005/0265315 A1 | 12/2005 | Edgar |
| 2005/0265353 A1 | 12/2005 | Sengupta et al. |
| 2005/0267974 A1 | 12/2005 | Panasyuk et al. |
| 2005/0286466 A1 | 12/2005 | Tagg et al. |
| 2006/0005240 A1 | 1/2006 | Sundarrajan et al. |
| 2006/0015570 A1 | 1/2006 | Khemani et al. |
| 2006/0018332 A1 | 1/2006 | Kakani et al. |
| 2006/0031547 A1 | 2/2006 | Tsui et al. |
| 2006/0034283 A1 | 2/2006 | Ko et al. |
| 2006/0041635 A1 | 2/2006 | Alexander et al. |
| 2006/0053164 A1 | 3/2006 | Ewing et al. |
| 2006/0053253 A1 | 3/2006 | Roth et al. |
| 2006/0059370 A1 | 3/2006 | Asnis et al. |
| 2006/0064500 A1 | 3/2006 | Roth et al. |
| 2006/0067257 A1 | 3/2006 | Bonta |
| 2006/0069719 A1 | 3/2006 | McCanne et al. |
| 2006/0080441 A1 | 4/2006 | Chen et al. |
| 2006/0089996 A1 | 4/2006 | Peiffer |
| 2006/0106943 A1 | 5/2006 | Akisada et al. |
| 2006/0112185 A1 | 5/2006 | Van Bemmel |
| 2006/0123477 A1 | 6/2006 | Raghavan et al. |
| 2006/0129528 A1 | 6/2006 | Miyamoto et al. |
| 2006/0129689 A1 | 6/2006 | Ho et al. |
| 2006/0133405 A1* | 6/2006 | Fee ................... 370/437 |
| 2006/0142878 A1 | 6/2006 | Banik et al. |
| 2006/0146877 A1 | 7/2006 | Srivastava |
| 2006/0156023 A1 | 7/2006 | Luo et al. |
| 2006/0161680 A1 | 7/2006 | Balsevich |
| 2006/0167883 A1 | 7/2006 | Boukobza |
| 2006/0185010 A1 | 8/2006 | Sultan |
| 2006/0190719 A1 | 8/2006 | Rao et al. |
| 2006/0225130 A1 | 10/2006 | Chen et al. |
| 2006/0245414 A1 | 11/2006 | Susai et al. |
| 2006/0271652 A1 | 11/2006 | Stavrakos et al. |
| 2006/0274761 A1 | 12/2006 | Error et al. |
| 2006/0274828 A1 | 12/2006 | Siemens et al. |
| 2007/0008883 A1 | 1/2007 | Kobayashi |
| 2007/0038703 A1 | 2/2007 | Tendjoukian et al. |
| 2007/0061067 A1 | 3/2007 | Zeinstra et al. |
| 2007/0067366 A1 | 3/2007 | Landis |
| 2007/0073703 A1 | 3/2007 | Quin |
| 2007/0110046 A1 | 5/2007 | Farrell et al. |
| 2007/0130324 A1 | 6/2007 | Wang |
| 2007/0130334 A1 | 6/2007 | Carley |
| 2007/0156852 A1 | 7/2007 | Sundarrajan et al. |
| 2007/0169179 A1 | 7/2007 | Narad |
| 2007/0179955 A1 | 8/2007 | Croft et al. |
| 2007/0192827 A1 | 8/2007 | Maxted et al. |
| 2007/0198684 A1 | 8/2007 | Mizushima |
| 2007/0203910 A1 | 8/2007 | Ferguson et al. |
| 2007/0206621 A1 | 9/2007 | Plamondon et al. |
| 2007/0233910 A1 | 10/2007 | Paley et al. |
| 2007/0245409 A1 | 10/2007 | Harris et al. |
| 2007/0271570 A1 | 11/2007 | Brown et al. |
| 2008/0034416 A1 | 2/2008 | Kumar et al. |
| 2008/0046616 A1 | 2/2008 | Verzunov et al. |
| 2008/0049786 A1 | 2/2008 | Ram et al. |
| 2008/0071915 A1 | 3/2008 | Gbadegesin |
| 2008/0104089 A1 | 5/2008 | Pragada et al. |
| 2008/0225720 A1 | 9/2008 | Khemani et al. |
| 2008/0225748 A1 | 9/2008 | Khemani et al. |
| 2008/0225753 A1 | 9/2008 | Khemani et al. |
| 2008/0229381 A1 | 9/2008 | Sikka et al. |
| 2008/0320007 A1 | 12/2008 | Hind et al. |
| 2008/0320151 A1 | 12/2008 | McCanne et al. |
| 2009/0034537 A1 | 2/2009 | Colrain et al. |
| 2009/0133015 A1 | 5/2009 | Nagashima |
| 2009/0234957 A1 | 9/2009 | Li et al. |
| 2009/0271385 A1 | 10/2009 | Krishnamoorthy et al. |
| 2010/0005180 A1 | 1/2010 | Tyukasz et al. |
| 2010/0241846 A1 | 9/2010 | Sundarrajan et al. |
| 2011/0145330 A1 | 6/2011 | Sundarrajan et al. |
| 2011/0258273 A1 | 10/2011 | Crawford |
| 2013/0112823 A1 | 5/2013 | Kreft |

FOREIGN PATENT DOCUMENTS

| | | |
|---|---|---|
| EP | 0 838 930 | 1/1900 |
| EP | 0 436 365 | 7/1991 |
| EP | 0 618 708 A2 | 10/1994 |
| EP | 1 045 553 | 10/2000 |
| EP | 1045553 | 10/2000 |
| EP | 1134942 | 9/2001 |
| EP | 1427133 | 6/2004 |
| EP | 1432209 | 6/2004 |
| JP | 07302237 | 11/1995 |
| JP | 08-006910 A | 1/1996 |
| JP | 10-178450 | 6/1998 |
| JP | 2002-532784 | 2/2002 |
| JP | 2002-084289 | 3/2002 |
| JP | 2004-078783 | 3/2004 |
| WO | WO-99/04343 | 1/1999 |
| WO | WO-00/34885 | 6/2000 |
| WO | WO-01/47185 A2 | 6/2001 |
| WO | WO-02/13037 | 2/2002 |
| WO | WO-02/23362 A1 | 3/2002 |
| WO | WO-0239301 A2 | 5/2002 |
| WO | WO-02069604 A2 | 9/2002 |
| WO | WO-03/019876 | 3/2003 |
| WO | WO-03/026244 | 3/2003 |
| WO | WO-03/048936 A1 | 6/2003 |
| WO | WO-03/083692 | 10/2003 |
| WO | WO-2004/088933 | 10/2004 |
| WO | WO-2004/114529 A2 | 12/2004 |
| WO | WO-2005/013534 | 2/2005 |
| WO | WO-2005/024567 A2 | 3/2005 |
| WO | WO-2005048106 | 5/2005 |
| WO | WO-2005/088476 | 9/2005 |
| WO | WO-2006/005078 | 1/2006 |
| WO | WO-2006/012612 | 2/2006 |
| WO | WO-2006/020823 | 2/2006 |
| WO | WO-2006/074072 A3 | 7/2006 |
| WO | WO-2006/075219 A2 | 7/2006 |
| WO | WO-2008/112691 A2 | 9/2008 |
| WO | WO-2008/112698 A2 | 9/2008 |

OTHER PUBLICATIONS

EP Communication for European Patent Application No. 05776653.7 dated Oct. 5, 2007. (7 pages).

EP Communication from EP Patent Application No. 05 785 297.2, dated May 18, 2007, 2 pages.

European Search Report for European Patent Application No. EP 07007414 dated Jul. 16, 2007. (2 pages).

Final Office Action dated Dec. 9, 2008 pertaining to U.S. Appl. No. 11/187,562. 15 pages.

Final Office Action dated Dec. 23, 2008 pertaining to U.S. Appl. No. 11/188,279. 12 pages.

International Search Report for PCT/US2005/022884, mailed on Jul. 8, 2008.

International Search Report for PCT/US2005/026300, Mailing date: Dec. 16, 2005. 3 pages.

International Search Report for PCT/US2005/028663, Mailing date: Nov. 16, 2005. 3 pages.

(56) References Cited

OTHER PUBLICATIONS

International Search Report to PCT/US04/37918, mailed on Apr. 27, 2008, 1 page.
International Search Report to PCT/US2005/026296, mailed on Jan. 31, 2006, 5 pgs.
Non Final Office Action dated Jan. 24, 2008 pertaining to U.S. Appl. No. 10/988,004. 6 pages.
Non Final Office Action dated Jun. 10, 2008 pertaining to U.S. Appl. No. 11/187,562. 15 pages.
Non Final Office Action dated Jun. 23, 2008 pertaining to U.S. Appl. No. 11/039,946. (14 pages).
Non Final Office Action dated Aug. 5, 2008 pertaining to U.S. Appl. No. 11/161,091. 17 pages.
Non Final Office Action dated Aug. 20, 2008 pertaining to U.S. Appl. No. 11/161,092. (16 pages).
Non Final Office Action dated Oct. 28, 2008 pertaining to U.S. Appl. No. 11/161,656. 21 pages.
Non Final Office Action dated Dec. 11, 2007 pertaining to U.S. Appl. No. 10/683,881. 10 pages.
Non Final Office Action dated Jun. 26, 2008 pertaining to U.S. Appl. No. 11/188,279. 12 pages.
Non Final Office Action dated Aug. 15, 2008 pertaining to U.S. Appl. No. 11/161,090 25 pages.
Notice of Allowance dated Sep. 18, 2008. U.S. Appl. No. 10/988,004 5 pgs.
Office Action dated Sep. 26, 2008 from Chinese Application No. 200480040249.X corresponding to U.S. Appl. No. 10/988,004 22 pgs.
Written Opinion of the International Searching Authority to PCT/US04/37918, mailed on Apr. 27, 2005, 7 pages.
Written Opinion of the International Searching Authority to PCT/US2005/026296, mailed on Jan. 31, 2006.
Written Opinion of the International Searching Authority to PCT/US2005/026300; Mailed on Dec. 16, 2005, 7 pages.
Written Opinion of the International Searching Authority to PCT/US2005/028663; Mailed on Nov. 16, 2005, 7 pages.
Written Opinion of the ISA for PCT/US2005/022884, mailed on Jul. 8, 2008.
Advisory Action for U.S. Appl. No. 11/187,512 dated Mar. 16, 2011.
Advisory Action for U.S. Appl. No. 11/161,093 dated Nov. 16, 2009.
Advisory Action for U.S. Appl. No. 11/161,093 dated Dec. 14, 2009.
Advisory Action for U.S. Appl. No. 11/039,946 dated Mar. 24, 2009.
Advisory Action for U.S. Appl. No. 11/161,091 dated May 6, 2009.
Advisory Action for U.S. Appl. No. 11/161,092 dated Apr. 24, 2009.
Advisory Action for U.S. Appl. No. 11/161,656 dated Jul. 29, 2009.
Biagioni et al., Signature for a network Protocol Stack: A System Application of Standard ML, Jul. 1994.
Canadian Office Action for CA appl. 2545496 dated Feb. 15, 2011.
Chinese Office Action on 200580028535.9 dated Dec. 13, 2011.
Dictionary service [online], [retrieved on Jul. 23, 2009]. Retrieved from the Internet <URL: http://dictionary.reference.com/browse/discard>.
Doug Allen, Layer-7 Load Balancers Pack New Punch, CMP Media LLC Network Magazine, Sep. 2003.
EP Search Report for EP appl. 10184310.0 dated Dec. 9, 2010.
European Communication on 05763688.8 dated Dec. 20, 2011.
European Communication on 05776653.7 dated Jun. 24, 2011.
European Communication on 05855922.0 dated Nov. 24, 2011.
European Exam Report on 07007414.1 dated Aug. 11, 2011.
European Exam Report on 10184310.0 dated Aug. 11, 2011.
European Examination Report on 05774886.5 dated Nov. 24, 2011.
European Examination Report on 05855924.6 dated Nov. 24, 2011.
European Supplemental Search Report on 05763688.8 dated Dec. 1, 2011.
Exam report for EP appl. 05785297.2 dated Jun. 19, 2009.
Exam Report for EP appl. 070074141 dated Nov. 17, 2009.
Exam Report for EP appln 05776653.7 dated Apr. 20, 2009.
Japanese Office Action on 2007-48001 dated Oct. 29, 2010.
Japanese Office Action on 2007-48003 dated Nov. 8, 2010.
Kong, et al; "Pseudo-serving: a user-responsible paradigm for internet access"; Apr. 7-11, 1997; SO Computer Networks and ISDN Systems; vol. 29; pp. 1053-1064.
Korean Office Action for KR appl. 2006-7009144 dated Jan. 14, 2011.
Krishnamurthy B.C. et al., "Key differences between HTTP/1.0 and HTTP/1.1," Computer Networks, Elsevier Science Publishers B.V., vol. 31, No. 11-16, pp. 1737-1751, May 1999.
Lazenka, M. "The Evolution of Software Distribution: Where Did We Come From and Where Are We Heading?", 2005, ACM, p. 179-183.
Ipswitch Inc., WSFTP User's Guide, Chapter 8: Security, Jun. 25, 2003, 8 pages.
Noriaki Kobayashi, "Internet VPN", N+1 Network Guide, vol. 3, No. 9, Oct. 1, 2003, pp. 44-49. (9 pages) (English Abstract).
Notice of Acceptance for AU 2010214746 dated Nov. 2, 2010.
Notice of Acceptance for AU Appl. 2005266943 dated May 28, 2010. (3 pages).
Notice of Acceptance for AU Appl. 2005272779 dated May 26, 2010. (3 pages).
Notice of Allowance for U.S. Appl. No. 11/161,090 dated Mar. 4, 2011.
Notice of Allowance for U.S. Appl. No. 12/336,795 dated Mar. 2, 2011.
Notice of Allowance for U.S. Appl. No. 11/187,512 dated Jun. 23, 2011.
Notice of Allowance for U.S. Appl. No. 11/161,092 dated Jun. 11, 2009.
Notice of Allowance for U.S. Appl. No. 11/161,656 dated Sep. 18, 2009.
Notice of Allowance on U.S. Appl. No. 12/557,497 dated May 6, 2011.
Notice of Allowance on U.S. Appl. No. 12/560,154 dated May 2, 2011.
Office Action for AU appl. 2005266943 dated May 14, 2009.
Office Action for AU appl. 2005272779 dated Apr. 23, 2009.
Office Action for CN Appl. 20050034849X dated Aug. 3, 2010.
Office Action for CN appl. 200580034849.X dated Sep. 25, 2009.
Office Action for CN appln 00480040249.X dated Jun. 19, 2009.
Office Action for CN appln 200580028535 dated Jan. 15, 2010.
Office Action for CN appln 200580034849X dated Apr. 7, 2010.
Office Action for IL Application No. 180402 dated Dec. 15, 2010.
Office Action for IL Application No. 180405 dated Jan. 2, 2011.
Office Action for IL Application No. 180891 dated Jan. 4, 2011.
Office Action for IL application No. 18169 dated Jan. 2, 2011.
Office Action for IN Appl. 1514KOLNP2006 dated Sep. 7, 2010 (3 pages).
Office Action for JP App. No. 2007-48001 dated Apr. 29, 2010.
Office Action for JP appl. 2006-539930 dated Feb. 18, 2010.
Office Action for JP Appl. 2007-048002 dated Nov. 8, 2010. (7 pages) (English Abstract).
Office Action for JP Appl. 2007-519353 dated Jul. 12, 2010. (6 pages) (English Abstract).
Office Action for JP Appl. 2007-522841 dated Sep. 10, 2010. (9 pages) (English Abstract).
Office Action for JP appl. 2007-522843 dated Dec. 1, 2010.
Office Action for JP Appl. 2007-525810 dated Aug. 4, 2010. (9 pages) (English Abstract).
Office Action for U.S. Appl. No. 11/161,091 dated Apr. 5, 2011.
Office Action for U.S. Appl. No. 11/187,512 dated Jun. 22, 2010. (20 pages).
Office Action for U.S. Appl. No. 11/188,274 dated Mar. 29, 2010. (15 pages).
Non-Final Office Action for U.S. Appl. No. 12/871,246 mailed Feb. 24, 2011.
Office Action for U.S. Appl. No. 12/560,154 dated Feb. 4, 2011.
Office Action for U.S. Appl. No. 12/560,154 dated Sep. 1, 2010.
Office Action for U.S. Appl. No. 11/161,093 dated Jan. 2, 2009.
Office Action for U.S. Appl. No. 11/187,512 dated Mar. 3, 2009.
Office Action for U.S. Appl. No. 11/187,512 dated Sep. 15, 2009.
Office Action for U.S. Appl. No. 11/161,093 dated Jun. 19, 2009.
Office Action for U.S. Appl. No. 11/161,091 dated Dec. 7, 2010.
Office Action for U.S. Appl. No. 11/187,512 dated Nov. 30, 2010.
Office Action for U.S. Appl. No. 12/336,795 dated Dec. 16, 2010.

(56) References Cited

OTHER PUBLICATIONS

Office action for U.S. Appl. No. 11/161,090 dated Jun. 10, 2010.
Office Action for U.S. Appl. No. 11/161,093 dated Sep. 2, 2009.
Office Action for U.S. Appl. No. 11/039,946 dated Jan. 23, 2009.
Office Action for U.S. Appl. No. 11/039,946 dated Jun. 23, 2009.
Office action for U.S. Appl. No. 11/161,090 dated Jan. 6, 2010.
Office Action for U.S. Appl. No. 11/161,090 dated May 28, 2009.
Office Action for U.S. Appl. No. 11/161,093 dated Feb. 22, 2010.
Office action for U.S. Appl. No. 11/161,091 dated Feb. 24, 2010.
Office action for U.S. Appl. No. 11/161,091 dated Aug. 3, 2009.
Office Action for U.S. Appl. No. 11/161,656 dated May 13, 2009.
Office Action for U.S. Appl. No. 11/187,512 dated Dec. 23, 2009.
Office Action on U.S. Appl. No. 11/161,091 dated Oct. 5, 2011.
Office Action on U.S. Appl. No. 11/161,093 dated Nov. 3, 2011.
Office Action on U.S. Appl. No. 11/161,093 dated Jun. 28, 2011.
Office Action on U.S. Appl. No. 11/188,274 dated Oct. 18, 2011.
Office Action on U.S. Appl. No. 11/188,274 dated Jun. 27, 2011.
Office Action on U.S. Appl. No. 12/557,497 dated Nov. 18, 2010.
Office Action on U.S. Appl. No. 12/557,497 dated Nov. 19, 2010.
Office Action on U.S. Appl. No. 12/794,446 dated Nov. 23, 2011.
Office Action on U.S. Appl. No. 12/871,246 dated Sep. 27, 2011.
Pedro Hernandez, "Tacit Adds to Softricity's Spark", Nov. 18, 2005. Available online at: www.enterpriseitplant.com/networking/news/article.php/3565401.
R. Briscoe, "The Implications of Pervasive Computing on Network Design," BT Technology Journal, pp. 170-190, Jul. 2004.
Ranzau et al., "Softricity/Tacit, An Innovative Approach to Virtual Computing," http://www.daboc.com/downloadnow.aspx?file=211&is=617, Oct. 20, 2005.
Restriction Requirement for U.S. Appl. No. 11/161,093 dated Jul. 26, 2010.(9 pages).
Search Report for EP appl. 10184310.0 dated Dec. 9, 2010.
Summons to Oral Proceedings for EP appl. 05776653.7 dated Jan. 14, 2011.
Supplementary European Search Report for EP04810901 dated Jul. 20, 2011.
Teruhara Serada, "SSL VPN", N+1 Network LAN, vol. 21, No. 3, Mar. 1, 2003, pp. 25-40. (19 pages) (English Abstract).
Yoshikazu Kobayashi, VPN service introduction, Computer & Network LAN, vol. 21, No. 3, Mar. 1, 2003, pp. 25-40. (19 pages) (English Abstract).
Office Action for CN Appl. 200580030928.3 dated Apr. 23, 2010.(5 pages).
EP Search Report for EP appl. 10184317.5 dated Dec. 7, 2010.
"Cisco Distributed Director," Posted Feb. 21, 1997, 16 pages, [Online] [Retrieved on Dec. 4, 1997] Retrieved from the Internet<URL:http://www.cisco.com/wart/public/751/distdir/dd_wp.htm>.
Dutta D. et al., An Active Proxy Based Architecture for TCP in Heterogeneous Variable Bandwidth Networks, Proceedings of IEEE Globecom 2001, vol. 4, p. 2316-2320, Nov. 2001.
EP Search Report for Application No. 04810901.1 dated Jul. 28, 2011.
AU Examination Report for Application No. 2005266945 dated Jul. 21, 2009.
AU Examination Report for Application No. 2005272779 dated May 14, 2009.
IN Examination Report for Application No. 648/KOLNP/2007 dated May 17, 2013.
IN Examination Report for Application No. 3929/KOLNP/2006 dated Nov. 30, 2012.
Hasegawa et al., "A Mechanism for TCP Performance Enhancement over Asymmetrical Environment," Proceedings 8th IEEE ISCC'03, 1530-1346/03, 2003.
IN Examination Report for Application No. 3959/KOLNP/2006 dated Feb. 5, 2013.
IN Examination Report for Application No. 531/KOLNP/2007 dated Feb. 8, 2013.
J. C. Mogul, "The Case for Persistent-Connection HTTP," 8282 Computer Communication Review 25, Oct. 1995.
IL Notice of Allowance for Application No. 180404 dated Jan. 9, 2011.
JP Notice of Allowance for Application No. 2007-048001 dated Mar. 2, 2011.
US Notice of Allowance for U.S. Appl. No. 11/188,279 dated Jun. 17, 2009.
US Notice of Allowance for U.S. Appl. No. 11/188,279 dated Jun. 29, 2009.
US Notice of Allowance for U.S. Appl. No. 12/336,795 dated Mar. 2, 2011.
US Notice of Allowance for U.S. Appl. No. 11/161,091 dated Sep. 28, 2012.
US Notice of Allowance for U.S. Appl. No. 11/161,093 dated Jun. 18, 2012.
US Notice of Allowance for U.S. Appl. No. 12/794,446 dated May 7, 2012.
US Notice of Allowance for U.S. Appl. No. 12/871,246 dated Sep. 17, 2012.
CA Office Action for Application No. 2545496 dated Feb. 15, 2010.
EP Office action for Application No. 05776653.7 dated Oct. 5, 2007.
IL Office Action for Application No. 181269 dated Jan. 2, 2011.
IL Office Action for Application No. 180403 dated Dec. 15, 2010.
US Office Action for U.S. Appl. No. 11/039,946 dated on Jun. 23, 2008.
US Office Action for U.S. Appl. No. 11/161,090 dated Feb. 4, 2009.
US Office action for U.S. Appl. No. 11/161,091 dated Feb. 18, 2009.
US Office Action for U.S. Appl. No. 11/161,092 dated Feb. 12, 2009.
US Office Action for U.S. Appl. No. 11/161,093 dated Feb. 3, 2011.
US Office Action for U.S. Appl. No. 11/187,508 dated Sep. 15, 2010.
US Office Action for U.S. Appl. No. 11/187,508 dated Jul. 6, 2011.
US Office Action for U.S. Appl. No. 11/187,512 dated Mar. 3, 2009.
US Office Action for U.S. Appl. No. 11/187,512 dated Sep. 15, 2009.
US Office Action for U.S. Appl. No. 11/187,562 dated Apr. 27, 2009.
Office Action for U.S. Appl. No. 11/187,562 dated Dec. 9, 2008.
Office Action for U.S. Appl. No. 11/187,562 dated Jun. 10, 2008.
Office Action for U.S. Appl. No. 11/187,508 dated Dec. 20, 2011.
Office Action for U.S. Appl. No. 12/787,231 dated Apr. 11, 2013.
Office Action for U.S. Appl. No. 12/871,246 dated May 15, 2012.
Office Action for U.S. Appl. No. 13/590,630 dated Apr. 30, 2013.
Office Action for U.S. Appl. No. 13/739,895 dated Mar. 13, 2013.
US Restriction Requirement for U.S. Appl. No. 11/161,093 dated Jun. 28, 2011.
Search Report for EP for Application No. 10184317.5 dated Dec. 7, 2010.
US Notice of Allowance for U.S. Appl. No. 12/787,231 dated Sep. 12, 2013.
US Notice of Allowance for U.S. Appl. No. 13/149,383 dated May 28, 2013.
US Notice of Allowance for U.S. Appl. No. 13/590,630 dated Jan. 2, 2014.
US Office Action for U.S. Appl. No. 13/618,180 dated Feb. 19, 2014.
US Office Action for U.S. Appl. No. 13/149,383 dated Jan. 29, 2013.
US Office Action for U.S. Appl. No. 13/739,895 dated Sep. 5, 2013.
US Office Action for U.S. Appl. No. 11/188,274 dated Nov. 5, 2013.
US Office Action for U.S. Appl. No. 13/590,630 dated Oct. 17, 2013.
Wang et al., Shield: Vulnerability-Driven Network Filters for Preventing Known Vulnerability Exploits, Feb. 2004, Microsoft Research, MSR-TR-2003-81, 14 pages.
US Notice of Allowance for U.S. Appl. No. 11/187,512 dated Jun. 23, 2011.
US Notice of Allowance for U.S. Appl. No. 11/039,946 dated Mar. 5, 2010.
Hu, et al., Adaptive Fast Path Architecture, IBM J. Res & Dev, vol. 45, No. 2; Mar. 1, 2001, pp. 191-206. Retrieved from the internet at: http://gec.di.uminho.pt/discip/minf/ac0203/ICCA03IBM_WebCachArch.pdf, 15 pages.
Extended European Search Report issued May 21, 2014 in European Patent Application No. 13195627.8.
Office Action for U.S. Appl. No. 14/015,078 dated Sep. 8, 2014.
Office Action issued Mar. 13, 2014 in Indian Patent Application No. 648/KOLNP/2007.
US Notice of Allowance for U.S. Appl. No. 14/015,078 dated Dec. 1, 2014.
US Notice of Allowance for U.S. Appl. No. 11/188,274 dated Aug. 14, 2014.

(56) References Cited

OTHER PUBLICATIONS

US Notice of Allowance for U.S. Appl. No. 13/618,180 dated Jul. 21, 2014.
US Notice of Allowance for U.S. Appl. No. 13/739,895 dated Mar. 24, 2014.
US Office Action for U.S. Appl. No. 11/188,274 dated Jun. 2, 2014.

* cited by examiner

SYSTEMS AND METHODS FOR CLIENT-SIDE APPLICATION-AWARE PRIORITIZATION OF NETWORK COMMUNICATIONS

RELATED APPLICATIONS

This present application claims priority to U.S. Provisional Patent Application No. 60/590,837, entitled "Ad Hoc Distributed Networks And Remote Access Architecture", filed Jul. 23, 2004, and U.S. Provisional Patent Application No. 60/601,431, entitled "System And Method For Assuring Redundancy In Remote Access Solution", filed Aug. 13, 2004, and U.S. Provisional Patent Application No. 60/607,420, entitled "Virtual Network Bridging", filed Sep. 3, 2004, and U.S. Provisional Patent Application No. 60/608,814, entitled "System And Method For Assuring Redundancy In Remote Access Solution", filed Sep. 10, 2004, all of which are incorporated herein by reference.

TECHNICAL FIELD

The invention generally relates to optimizing peer-to-peer network communications, and in particular, to techniques for application-aware prioritizations of network communications on a client.

BACKGROUND INFORMATION

Communications over a network between two computers are typically processed in the order generated by the activity of a user and applications of the client and incoming network communications are processed in the order they are received. This is not always desirable, however. For example, in one case, although an application is running in the foreground and currently in active use by the user, a network packet generated or received for an application running in the background may be processed ahead of a network packet generated or received for the application running in the foreground. In another example, the client may be running a VoIP application to provide a telephone call to a remote computing device. One or more other applications on the client may be running that are not related to the real-time data communication of VoIP. The network packets for these applications may be processed ahead of the real-time network packets of the VoIP telephone call thereby increasing the latency and reducing the quality of the voice communication. It is desirable to provide application-aware, client-specific prioritization of packet traffic.

SUMMARY OF THE INVENTION

The present invention is generally directed towards a remote access architecture for providing peer-to-peer communications and remote access connectivity. In one embodiment, the remote access architecture of the present invention provides a method for establishing a direct connection between peer computing devices via a third computing device, such as a gateway. Additionally, the present invention provides various techniques for optimizing peer-to-peer communications, including real-time communications such as voice over internet protocol (VoIP) signaling and media, video, and other real-time data applications such as web collaboration, screen or desktop sharing, and instant messaging. The present invention provides the following peer to peer optimization techniques: 1) false acknowledgement of receipt of network packets allowing communications via a lossless protocol of packets constructed for transmission via a lossy protocol, 2) payload shifting of network packets allowing communications via a lossless protocol of packets constructed for transmission via a lossy protocol, 3) reduction of packet fragmentation by adjusting the maximum transmission unit (MTU) parameter, accounting for overhead due to encryption, 4) application-aware prioritization of client-side network communications, and 5) network disruption shielding for reliable and persistent network connectivity and access, such as for mobile computing.

In one aspect, the present invention relates to a method for establishing a peer-to-peer communication session between a first computing device on a first network and a second computing device on a second network. The first network may be disconnected from and not routable to the second network. The method includes establishing, by the first computing device, a first tunneling session with a third computing device, and establishing, by the second computing device, a second tunneling session with the third computing device. The third computing device may be a gateway, such as an SSL VPN gateway. The first computing device initiates a communication session to the second computing device via the third computing device, such as via a signaling protocol. A server receives a signal to establish the initiated communication session, and the server communicates to the first computing device a first network address comprising a network address of the second computing device associated with the second tunneling session. The first computing device communicates a request to initiate a connection with the second computing device using the first network address. The method further includes intercepting, by the third computing device, the request, and providing the first computing device a second network address for the second computing device. The second network address identifies a public network address associated with the second computing device. The third computing device communicates a request to the second computing device to allow a connection from the first computing device using the second network address, such as via a swimmer session traversing a firewall.

In one embodiment of the present invention, the first tunneling session or the second tunneling session is established using a Secure Socket Layer or a virtual private network The third computing device may be a remote access gateway. In another embodiment, the second computing device is located behind a firewall associated with the second network address.

In another embodiment, the method of the present invention includes providing, by the third computing device, the second network address to the first computing device by communicating an out of band signal to the first computing device via the first tunneling session. In an additional embodiment, the method of includes providing, by the second computing device, a forward hole in a firewall for the first computing device to communicate to the second computing device using the second network address.

In a further embodiment of the present invention, the third computing device communicates a key to the first computing device and the second computing device. The first computing device and the second computing device may exchange keys. Additionally, the first and second computing device may check that the key received from the other computing device matches before transmitting data to the other computing device.

In some embodiments of the present invention, the method associates a first telecommunication device with the first computing device, and associates a second telecommunication device with the second computing device. The first telecommunication device or the second telecommunication device may include a software component or a hardware component, such as a hard or soft VoIP telephone. In one embodiment, the method of the present invention includes establishing a telecommunication session between the first telecommunication device and the second telecommunication device via the connection between the first and second computing devices. The first telecommunication device and the second telecommunication device may communicate over the telecommunication session without traversing the third computing device.

In another embodiment of the present invention, the method communicates a remote display protocol via the connection between the first computing device and the second computing device. The remote desktop protocol may include the Independent Computing Architecture protocol or the Remote Desktop Protocol. In yet a further embodiment, the method may include sharing a screen view or screen data of the first computing device with the second computing device via the connection.

In one aspect, the present invention relates to a method performed in a gateway for establishing a peer-to-peer communication session between a first computing device on a first network and a second computing device on a second network. The first network may be disconnected from and not routable to the second network. The method includes establishing a first tunneling session with the first computing device on a first network, and establishing a second tunneling session with the second computing device on the second network. The gateway receives a request by the first computing device to initiate a communication session with the second computing device. The first computing device provides a first network address for contacting the second computing device. The first network address identifies a network address of the second computing device associated with the second tunneling session. The gateway receives a request by the first computing device to initiate a connection with the second computing device using the first network address, intercepts the request to initiate the connection, and provides the first computing device a second network address for the second computing device. The second network address identifies a public network address associated with the second computing device. The gateway communicates to the second computing device a request to allow the connection from the first computing device to the second computing device using the second network address, such as via a swimmer session traversing a firewall.

In one embodiment, the first tunneling session or the second tunneling session via the gateway includes a Secure Socket Layer or a virtual private network. In another embodiment, the second computing device is located behind a firewall associated with the second network address. In a further embodiment, the method of the present invention provides the second network address to the first computing device by communicating an out of band signal to the first computing device via the first tunneling session. Additionally, the gateway may communicate a key to the first computing device and to the second computing device.

In another aspect, the present invention is related to a system for establishing a peer-to-peer communication session between a first computing device on a first network and a second computing device on a second network via a third computing device. The first network may be disconnected from and not routable to the second network. The system includes a first computing device on the first network, and a second computing device on the second network. A third computing device establishes a first tunneling session with the first computing device and a second tunneling session with the second computing device. The system also includes a server accessible via the third computing device. In operation of the system, the server communicates via the third computing device to the first computing device a first network address identifying a network address of the second computing device associated with the second tunneling session. The first computing device communicates via the third computing device a first request to initiate a connection with the second computing device using the first network address. The third computing device intercepts the first request, and provides the first computing device a second network address for the second computing device. The second network address identifies a public network address associated with the second computing device. The third computing device communicates a second request to the second computing device to allow a connection from the first computing device using the second network address.

In one embodiment of the system, the first tunneling session or the second tunneling session includes a Secure Socket Layer or a virtual private network. Furthermore, the third computing device may be a remote access gateway, such as an SSL VPN gateway. In another embodiment of the system, the second computing device is located behind a firewall associated with the second network address.

In an additional embodiment of the present invention, the third computing device provides the second network address to the first computing device by communicating an out of band signal via the first tunneling session, such as via an out of band TLS session. In one embodiment, the second computing device provides a forward hole in a firewall for the first computing device to communicate to the second computing device using the second network address.

In a further embodiment of the system of the present invention, the third computing device communicates a key to the first computing device and the second computing device. The first computing device and the second computing device may exchange keys. Additionally, the first and second computing device may check that the key received from the other computing device matches before transmitting data.

In some embodiments of the present invention, the system includes a first telecommunication device associated with the first computing device, and a second telecommunication device associated with the second computing device. The first telecommunication device or the second telecommunication device may include a software component or a hardware component, such as a hard or soft VoIP telephone. In one embodiment, the system of the present invention includes establishing a telecommunication session between the first telecommunication device and the second telecommunication device via the connection between the first and second computing devices. The first telecommunication device and the second telecommunication device may communicate over the telecommunication session without traversing the third computing device.

In another embodiment of the present invention, the first computing device and the second computing device communicate a remote display protocol via the connection. The remote desktop protocol may include the Independent Computing Architecture protocol or the Remote Desktop Protocol. In yet a further embodiment, the first computing device may share a screen view or screen data with the second computing device via the connection.

In another aspect, the present invention is related to a method for communicating via a lossless protocol a packet constructed to be transmitted via a lossy protocol. The method may be performed in one or more electronic devices, such as in a system, and by any suitable means and mechanisms. The method includes establishing a connection between a first computing device and a second computing device via a lossless protocol. In some embodiments, the second computing device may be a gateway, such as an SSL VPN gateway. The first computing device detects a lossless protocol packet comprising a payload having one or more packets constructed in accordance with a lossy protocol. The first computing device communicates a false acknowledgement of receipt of the lossless protocol packet to the first computing device and/or the second computing device. The false acknowledgement of receipt of the lossless protocol packet prevents employing the reliability algorithms and mechanisms of the lossless protocol. The first computing device communicates the lossless protocol packet to the second computing device. In some embodiments, the false acknowledgement of receipt of the lossless protocol packet is communicated prior to communicating the lossless protocol packet.

In one embodiment, the method of the present invention includes encrypting, by the first computing device, the one or more packets using a key. In some embodiments, the encryption key may be provided to the first computing device via an out of band transport security layer session between the first computing device and the second computing device. In a further embodiment, the method encrypts the one or more packets on a packet by packet basis.

In another embodiment of the method of the present invention, in response to receiving the false acknowledgement of receipt of the lossless protocol packet by the first computing device and/or the second computing, the first computing device and/or the second computing prevents executing an operation associated with providing a lossless characteristic of the lossless protocol. In one embodiment, the lossless protocol is a transport control protocol. In a further embodiment, the method of the present invention prevents the network stack of the first computing device and/or the second computing device from executing one or more of the following in connection with the lossless protocol: 1) a retransmit, 2) an ordering, 3) a flow control algorithm, 4) a naple's algorithm, and 5) a sliding window algorithm.

In one embodiment, the lossy protocol includes a user datagram protocol. In another embodiment, the method includes communicating, by the first computing device, the lossless protocol packet via a secure socket layer or a transport security layer tunnel to the second computing device.

In another embodiment, the one or more packets of the payload comprises a real-time protocol. In an additional embodiment, the method includes communicating by the first computing device one of real-time voice, audio, or data to the second computing device via the one or more packets.

In one aspect, the present invention relates to a method for transmitting packets from an application using an unreliable transport protocol over a TCP connection. The method includes receiving, at a first device, a first packet to be transmitted using an unreliable transport protocol, and creating a first TCP packet including a first payload of the received first packet and a first TCP header of information associated with a TCP connection established between the first device and a second device. The first device transmits the first TCP packet to the second device. The method further includes receiving, at the first device, a second packet to be transmitted using an unreliable transport protocol, and creating a second TCP packet including a second payload of the received second packet and the first TCP header information. Before receipt of an acknowledgement of the receipt of the first payload from the second device, the first device transmits the second TCP packet to the second device.

In one embodiment, the method of the present invention establishes the TCP connection with a port number associated with the unreliable transport protocol. In another embodiment, the method includes dynamically determining, by the first device, the first TCP packet and second TCP packet comprise an unreliable transport protocol. In some embodiments, the unreliable transport protocol is UDP.

In an additional embodiment, the method includes receiving the first TCP packet and second TCP packet on the first device by intercepting the first TCP packet and second TCP packet using a packet capturing mechanism. In some embodiments, the method establishes by the first device, the TCP connection with a VPN gateway device. In other embodiments, the method includes establishing peer-to-peer communications between the first device and the second device via the TCP connection. In another embodiment of the present invention, the method includes encrypting, by the first device, the first and second TCP packets, and decrypting, by the second device, the encrypted first and second TCP packets.

In another aspect, the present invention relates to a method for transmitting packets from an application using an unreliable transport protocol over a TCP connection. The method includes intercepting, at a second device, a first TCP packet created on a first device and received on the second device. The first TCP packet includes a first payload of a first packet generated by an application using an unreliable protocol and a first TCP header of information associated with a TCP connection established between the first device and the second device. The intercepting of the method occurs before the first TCP packet is provided to a TCP stack on the second device. The method includes identifying, responsive to the TCP header of information, that the first payload is a packet generated by an application using an unreliable transport protocol, stripping the TCP header of information from the first TCP packet, and forwarding the first payload to an application using the unreliable data protocol.

In one embodiment, the unreliable protocol is UDP. In another embodiment, the step of identifying comprises identifying that the TCP header information includes a port number associated with the unreliable transport protocol. In some embodiments, the method includes intercepting, by the second device, the first TCP packet using a packet capture driver.

In some embodiments, the first device is a client device and the second device is a VPN gateway. Additionally, the method of the present invention includes performing Network Address Translation (NAT) on the second device prior to forwarding the first payload to the application.

In a further aspect, the present invention relates to a system for transmitting packets from an application using an unreliable transport protocol over a TCP connection. The system includes a first device and a second device. The first device has an application that generates a first and second packet. The first and second packet are intended to be transmitted using an unreliable transport protocol. The first device also has a filter process and a tunneling process. The filter process intercepts the first and second packets from the application and forwards the intercepted packets to the tunnel process. The tunnel process requests the opening of a TCP connection between the first device and a second device. The request to open the TCP connection indicates to the first and second device that the TCP connection will transport packets intended to be transmitted with an unreliable transport protocol. The tunnel process forwards the first and second packets as payloads in a first and second TCP packet to the second device. The tunnel process sends the second TCP packet after sending the first TCP packet and prior to receiving an acknowledgement for the first TCP packet.

The second device of the system of the present invention is in communication with the first device. The second device has second filter process and tunneling process. The second tunnel process opens the TCP connection requested by the first device, and identifies and forwards the source address of the TCP connection to the second filter process. The second filter process intercepts packets from the application received at the second device with the TCP connection source address in a header. The second filter process strips the TCP header from the received packets and forwards the stripped packets to an intended destination, and circumventing the TCP/IP stack on the second device.

In one embodiment of the system of the present invention, the filter process on the first device and/or the second filter process of the second device is a packet capture driver. In some embodiments, the first device is a client device and the second device is a VPN gateway device. In one embodiment, the unreliable data protocol is UDP.

In another embodiment, the system also includes a third device to which the stripped packets are transmitted. Additionally, the second device may further include a Network Address Translation (NAT) table used to perform network address translation prior to transmitting the stripped packets to the third device.

In a further aspect, the present invention is related to a method for adjusting the maximum transmission unit of a secure network communication to reduce network fragmentation. The method may be performed in one or more electronic devices, such as in a system, and by any suitable means and mechanisms. The method includes establishing a session between a first computing device and a second computing device. The session may established by an agent of the first computing device. The first computing device has a first network stack. The method detects, by the first computing device, a network packet having an encrypted payload, and determines a setting for a maximum transmission unit parameter of the first network stack to reduce the maximum transmission unit size by at least a size associated with the encrypted portion of the payload. The method alters the maximum transmission unit (MTU) parameter of the first network stack to the determined setting. As such, the reported MTU parameter is reduced to account for the encryption.

In one embodiment, the method of the present invention includes communicating the network packet via a secure socket layer or a transport layer security tunnel to the second computing device. The second computing device may be a gateway, such as an SSL VPN gateway. In another embodiment, the payload comprises a real-time protocol.

Additionally, in one embodiment, the method may further comprise altering the maximum transmission unit parameter via a network driver interface specification (NDIS) level mechanism of the first network stack In another embodiment, the method determines the setting of the maximum transmission unit parameter dynamically per session between the first computing device and the second computing device. In one embodiment, the agent of the first computing device communicates via an IOCTL application programming interface to the first network stack to alter the maximum transmission unit parameter to the determined setting.

In some embodiments, the method of the present invention establishes the session between the first computing device and the second computing device via a gateway. In other embodiments, the method communicates by the first computing device real-time voice, audio, or data to the second computing device via the payload of the network packet. In yet another embodiment, the method may include communicating a false acknowledgement of receipt of the network packet to the first computing device and/or the second computing device before communicating the network packet. In one embodiment, the network packet comprises a lossless protocol packet, such as a transport control protocol. In another embodiment, the payload comprises a lossy protocol packet, such as a user datagram protocol.

In an additional aspect, the present invention is related to a method for a client to prioritize network communications of the client associated with an application of the client. The method includes intercepting, by the client, one or more network packets associated with one or more applications of the client, and storing the one or more network packets to a queue. The client determines the queued one or more network packets is associated with a first application of the client. The client indicates a priority for the determined one or more network packets to place the determined one or more network packets ahead of at least one network packet in the queue associated with a second application of the client. The client provides the prioritized one or more network packets for communications via a network stack of the client.

In one embodiment, the method of the present invention includes determining, by the client, the queued one or more networks packets of the first application comprises real-time data. The real-time data may include one of the following: 1) a real-time protocol, 2) a user datagram protocol, and 3) a representation of voice or audio.

In another embodiment, the method includes preventing, by the client, at least one network packet of the second application from being communicated via the network stack ahead of the one or more network packets of the first application. In a further embodiment, the method includes holding, by the client, in the queue a network packet associated with the second application, and releasing the held network packet upon communication of the one or more network packets associated with the first application prioritized ahead of the held network packet.

In yet another embodiment of the present invention, the method includes intercepting, by the client, the one or more network packets transparently to the one or more applications on the client. In some embodiments, the first application is running in the foreground, and the second application is running in the background.

In one embodiment of the present invention, the method includes associating a priority with the first application higher than a priority associated with the second application. In another embodiment, a user may specify the priority of the first application or the second application. In a further embodiment, the client receives the one or more network packets from a computing device. Also, the one or more applications may provide the one or more network packets for communicating from the client to a computing device.

In another aspect, the present invention is related to a client for prioritizing network communications of the client associated with an application of the client. The client includes a mechanism for intercepting one or more network packets of the client associated with one or more applications of the client. The client also includes a network driver for storing the one or more networks packets to a queue and communicating the one or more network packets via a network stack of the client. The client further includes an agent for determining the one or more network packets is associated with a first application of the client, and indicating to the network driver a priority of the one or more network packets to place the determined one or more network packets ahead of at least one network packet in the queue associated with a second application of the client.

In one embodiment, the agent of the present invention determines the one or more networks packets of the first application comprises real-time data. The real-time data comprises one of the following: 1) a real-time protocol, 2) a user datagram protocol, and a 3) representation of voice or audio.

In a further embodiment, the agent or the network driver of the present invention prevents at least one network packet of the second application from being communicated via the network stack ahead of the one or more network packets of the first application. In one embodiment, the network driver holds in the queue a network packet associated with the second application, and releases the held network packet upon communication of the one or more network packets associated with the first application prioritized ahead of the held network packet.

In another embodiment, the present invention, via the mechanism, intercepts the one or more network packets transparently to the one or more applications on the client. In some embodiments, the first application is running in the foreground, and the second application is running in the background. Also, the first application may have a priority higher than the second application of the client. Furthermore, the client may include a configuration mechanism for a user to specify the priority. In some embodiments, the client receives the one or more network packets from a computing device. In other embodiments, the one or more applications provides the one or more network packets for communicating from the client to a computing device.

In an additional embodiment, the network driver includes a Network Driver Interface Specification (NDIS) driver. Also, the network driver may operate in kernel-mode of an operating system of the client. In some cases, the agent operates in user-mode of an operating system of the client. Furthermore, the agent or the network driver includes the mechanism for intercepting one or more network packets of the client.

In yet another aspect, the present invention is related to a method for shielding from a network disruption a session established via a first protocol. The method includes the steps of establishing, via an agent of a client, a session via a first protocol over a network connection between the client and a device. The network connection is associated with a network stack. A first portion of the network stack has one or more layers of the network stack below the layer of the first protocol, and a second portion of the network stack includes a layer for the first protocol and one or more layers of the network stack above the first protocol. The method includes detecting a disruption in the network connection causing the second portion of the network stack to be disestablished, and maintaining, by the agent, the session and the second portion of the network stack during the disruption. The method further includes re-establishing the first portion of the network stack and the network connection while maintaining the session and the second portion of the network stack.

In one embodiment, the method includes continuing the session with the maintained second portion of the network stack and the re-established first portion of the network stack. In some embodiments, the method also includes dropping, by the first and/or second portion of the network stack, any network packets received during the disruption.

In another embodiment, the device comprises a remote access gateway or another computing device. In some cases, the method includes establishing the session via the first protocol of one of the following: 1) secure socket layer (SSL) protocol, 2) a transport layer security (TLS) protocol, and 3) a tunneling protocol. Additionally, the method of the present invention may include communicating, by the agent, real-time data via the session between the client and the device. The real-time data may include a real-time protocol or the real-time data may represent voice or audio.

In some embodiments, the agent operates in user-mode of an operating system of the client. In one embodiment, the first portion of the network comprises one of a transport control protocol or an internet protocol. In another embodiment, the second portion of the network stack comprises one of 1) an internet protocol, 2) a user datagram protocol, or 3) a voice over internet protocol. Additionally, the client may communicate with the device via a remote display protocol. The remote display protocol may be an Independent Computing Architecture (ICA) protocol or a Remote Desktop Protocol (RDP).

In another embodiment, the method of the present invention is performed transparently to an application of the client communicating via the network connection. In one embodiment, the method includes intercepting, by the agent, transparently to an application of the client one or more network packets associated with the application. In one embodiment, the method includes intercepting, by a network driver associated with the first portion of the stack, transparently to the application on the client one or more network packets associated with the application.

In an additional aspect, the present invention is related to a system for shielding from a network disruption a session established via a first protocol. The system has an agent of a client establishing a session between the client and a device over a network connection via a first protocol. The system includes a network stack having a first portion and a second portion, such as the network stack of the client. The second portion of the network stack comprises a layer for the first protocol and one or more layers of the network stack above the first protocol, and a first portion of the network stack comprises one or more layers of the network stack below the layer of the first protocol. The system includes a detector for detecting a disruption in the network connection causing the first portion of the network stack to be disestablished. In operation of the system and upon detection of the disruption by the detector, the agent maintains the session and the second portion of the network stack during the disruption. The client re-establishes the first portion of the network stack and the network connection while the agent maintains the session and the second portion of the network stack.

In one embodiment of the system of the present invention, the agent continues the session with the maintained second portion of the network stack and the re-established first portion of the network stack. In some embodiments, the first and/or second portion of the network stack drops any network packets received during the disruption.

In one embodiment, the device of the system is a remote access gateway or another computing device The first protocol used by the system of the present invention may include one of the following: 1) secure socket layer (SSL) protocol, 2) a transport layer security (TLS) protocol, and 3) a tunneling protocol. In another embodiment, the agent of the present invention communicates real-time data via the session between the client and the device. The real-time data may include a real-time protocol, or a representation of voice or audio.

In some embodiments of the system, the agent operates in user-mode of an operating system of the client. In one system embodiment, the first portion of the network comprises a transport control protocol and/or or an internet protocol. In another embodiment, the second portion of the network stack includes one of 1) an internet protocol, 2) a user datagram protocol, or 3) a voice over internet protocol. Additionally, the client may communicate with the device via a remote display protocol, which may be an Independent Computing Architecture (ICA) protocol or a Remote Desktop Protocol (RDP).

In another embodiment, the system of the present invention maintains the second portion of the network stack and re-establishes the first portion of the network stack transparently to an application of the client communicating via the network connection. In one embodiment, the agent intercepts network packets transparently to an application of the client one or more network packets associated with the application. In one embodiment, the system also includes intercepting, by a network driver associated with the second portion of the stack, transparently to the application on the client one or more network packets associated with the application.

The details of various embodiments of the invention are set forth in the accompanying drawings and the description below.

BRIEF DESCRIPTION OF THE DRAWINGS

The foregoing and other objects, aspects, features, and advantages of the invention will become more apparent and may be better understood by referring to the following description taken in conjunction with the accompanying drawings, in which.

DESCRIPTION

Figure 1A:
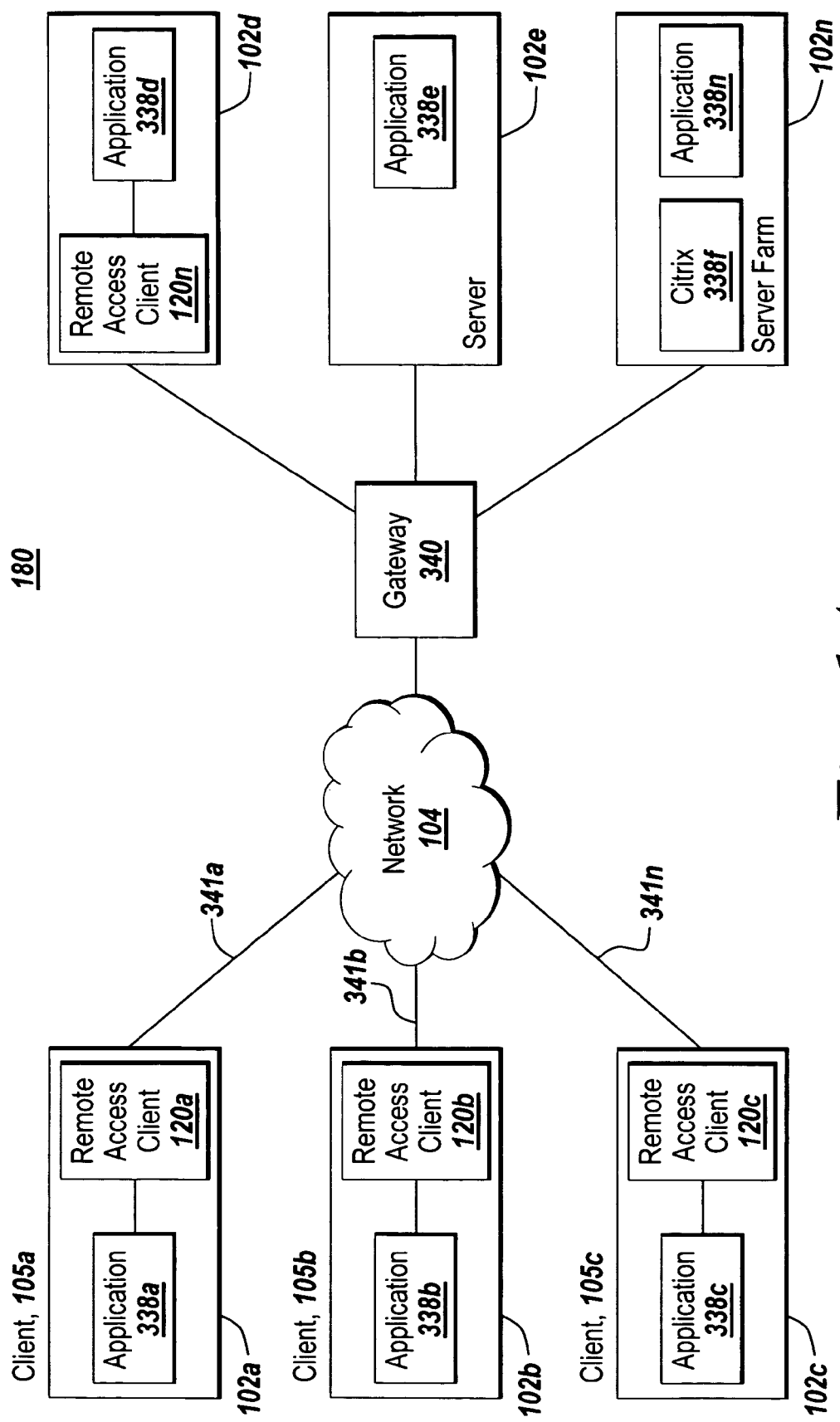
FIG. 1A is a block diagram depicting an embodiment for practicing the operations of the present invention via a gateway in a network environment.

Certain illustrative embodiments of the present invention are described below. It is, however, expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not expressly made herein, without departing from the spirit and scope of the invention.

The illustrative embodiments of the present invention are generally directed towards a remote access architecture for providing peer-to-peer communications and remote access connectivity. In one illustrative embodiment, the remote access architecture of the present provides a method for establishing a direct connection between peer computing devices via a third computing device, such as a gateway. The present invention also provides various techniques for optimizing the peer-to-peer communications established with or without the gateway. The peer-to-peer communications may include real-time communications such as voice over internet protocol (VoIP) signaling and media, video, and other real-time data applications such as web collaboration, screen or desktop sharing, and instant messaging. In addition to establishing a peer-to-peer connection via gateway, the present invention also provides the following techniques to optimize peer-to-peer communications: 1) false acknowledgement of receipt of network packets allowing communications via a lossless protocol packets constructed for transmission via a lossy protocol, 2) payload shifting of network packets allowing communications via a lossless protocol of packets constructed for transmission via a lossy protocol, 3) reduction of packet fragmentation by adjusting the maximum transmission unit (MTU) parameter, accounting for overhead due to encryption, 4) application-aware prioritization of client-side network communications, and 5) network disruption shielding for reliable and persistent network connectivity and access, such as for mobile clients. These techniques may be practiced in peer-to-peer communications between two clients in some embodiments, or in other embodiments, in communications between a client and a gateway or between one computing device via a gateway to another computing device, such as via an SSL VPN gateway of an illustrative embodiment of the present invention.

In the illustrative embodiments of the present invention, the peer-to-peer route optimization technique determines a more optimal route to a resource a client may be trying to access via a gateway. The client and the resource accessed by the client, such as a server or a peer computer, may have a more direct route than via the gateway. For example, the client and the server may be located near each other but distant from the gateway, and thus, are closer to each other than via the gateway. Furthermore, using a gateway causes at least one additional hop in the end-to-end network communications between the client and the server. Instead of the client and server communicating via the gateway using their virtual private network (VPN) assigned internet protocol (IP) network addresses, the gateway and remote access architecture of the present invention facilitates the client and server communicating to each other via a direct route in a peer-to-peer fashion without using the gateway. In some cases, however, the client and server may not have a direct path between each other as either the client and/or server may be behind a firewall, such as a Network Address Translation (NAT) firewall. The peer-to-peer route optimization techniques and remote access architecture of the present invention also provide techniques for the client and server to communicate directly via traversal of the firewall. As such, the peer-to-peer route optimization techniques of the present invention provides a shorter more optimal route between peer computers than via the gateway.

In the illustrative embodiments of the present invention, the false acknowledgement technique of an embodiment of the present invention enables a packet constructed to be transmitted via a lossy protocol to be communicated via lossless protocol. For example, a real time protocol (RTP) may be implemented over a user datagram protocol (UDP) for voice over IP (VoIP) communications. A lossy or unreliable protocol, such as UDP, may be used for voice communications because, in some real-time voice applications, it may be more important to get network packets to a recipient on time rather than getting the network packets in order or guaranteeing the delivery of network packets. However, by way of virtual private network and remote access solutions using a secure communication and/or tunneling protocol, such as Secure Socket Layer (SSL) or Transport Layer Security (TLS), a real-time application data constructed to be transmitted via a lossy protocol, such as UDP, may be communicated via a lossless or reliable protocol such as a transport control protocol (TCP). The techniques of the present invention allow a lossy protocol, such as RTP over UDP, to be communicated via a lossless protocol such as TCP, while avoiding one or more of the lossless characteristics of the lossless protocol from being applied to the communication. In the illustrative embodiment of the present invention, this technique communicates a false acknowledgement of receipt of the lossless protocol network packet to the corresponding network stacks to prevent the lossless protocol from executing algorithms that provide for reliability of the protocol. Using this technique, the lossy protocol can be communicated over a lossless protocol, such as via TCP, SSL or via a tunneling protocol of a gateway, for example, to make the communication secure, and have the lossy protocol network packets get to the recipient on time rather than getting to the recipient reliably. In one embodiment, this technique can be used to securely communicate real-time data communications such as VoIP over SSL or TLS between peers or via a gateway.

The illustrative embodiments of the present invention also provide another technique of payload shifting that enables a packet constructed to be transmitted via a lossy protocol to be communicated via lossless protocol. A first computing device receives a first packet to be transmitted using an unreliable transport protocol, and creates a first TCP packet including a first payload of the received first packet. The first TCP packet is created with a TCP header having information associated with a TCP connection established between the first and a second computing device. The first TCP packet is transmitted to the second computing device. A second packet to be transmitted using an unreliable transport protocol is received by the first computing, which in turn creates a second TCP packet including the payload of the received second packet but with the TCP header information of the first TCP packet. The second TCP packet is transmitted to the second computing device before receiving an acknowledgement of the receipt of the first TCP packet from the second device. As such, the payload shifting technique communicates multiple unreliable transport protocol payloads under a TCP header until an acknowledgement of receipt is received.

In the illustrative embodiments of the present invention, the maximum transmission unit adjustment technique reduces the reported size of the maximum transmission unit (MTU) parameter of a network stack of a client to take into consideration the effect of the network packet size due to encryption of a payload. Encryption of the payload of a network packet increases the size of the network packet communicated to or by the client, and may cause a network packet to be fragmented. For example, a server may communicate to the client a network packet via an SSL gateway to the client. Although the server sends a network packet that should meet the MTU size the network stack of the client can handle, the encryption provided by the gateway increases the size of the network packet before it reaches the client. This may cause the network packet communicated from the server to the client via the gateway to be fragmented as the increased packet size from encryption may be too large for the MTU size of the client. The technique of the present invention adjusts the client's reported MTU size to report a smaller size to take in account for the overhead of the encryption. This technique reduces network fragmentation or otherwise prevents non-optimal fragmentation.

In the illustrative embodiments of the present invention, the prioritization technique provides for client-side and application-aware prioritization of network communications. That is, the remote access client of the present invention manages and controls network communication prioritizations on the client. The prioritizations are based on priorities of the application on the client. The remote access client transparently intercepts network communications associated with applications executing on the client, detects the network communication is associated with an application, and determines priorities for the network communications based on a priority for the application. For example, an application on the client may be communicating real-time data communications, such as VoIP, to a peer client or via a gateway. The remote access client may intercept a network packet, and detect, for example, the network packet contains real-time data or is from a VoIP application. The remote access client may indicate a priority for this network packet such that the network packet may be communicated ahead of non-real-time data communications or ahead of network communications from other applications. As such, the prioritization techniques of the present invention may improve or increase the performance, operational characteristics, and user experience on the client based on the applications running on the client.

In the illustrative embodiments of the present invention, the network disruption shielding technique provides a persistent and reliable connection of a client to a network, such as a peer-to-peer communication session or a connection to a gateway. For example, a mobile client, such as a laptop with a software based IP telephone, may connect to a network for VoIP communications. A temporary disruption in a network connection may occur when the mobile client roams between different access points in the same network, or when the client switches between networks (e.g., from a wired network to a wireless network). This disrupts the network service to the client and may drop the VoIP telephone call. Additionally, as the mobile client moves between access points, the mobile client may obtain a different IP network address, such as from a new Dynamic Host Configuration Protocol (DHCP) lease. This can also cause network connectivity and VoIP telephone communication disruption. The techniques of the present invention detects a disruption in the network and shields a portion of the network stack from the network disruption. The shielded portion of the network stack is maintained while the other portion of the network stack is reestablished and reconnected to the network. Once the network is available, the present invention continues with the client's network communications. In some embodiments, the network communications are queued during the network disruption and transmitted once the network is available. In other embodiments, such as for real-time data communications, network packets are dropped during the disruption to prevent the queuing of network packets that may cause latency in the real-time communication, such as VoIP telephone call.

Although the illustrative embodiments of the present invention may be generally described in connection with an internet protocol (IP) based protocol, such as a transport control protocol (TCP) or user datagram protocol (UDP), the techniques of the present invention may be used in any other types of networking environments with other networking protocols, such as any Internetwork Packet Exchange (IPX) protocol based networks using a Sequenced Packet Exchange (SPX) protocol. Also, although a lossy or unreliable protocol such as UDP and a lossless or reliable protocol such as TCP may be used for illustrating an embodiment of the present invention, any lossless/reliable and lossy/unreliable protocol as known to those ordinarily skilled in the art may be used in practicing the operations of the present invention described herein. Furthermore, although some of the illustrative embodiments of the present invention may be described below in relation to real-time data communications, such as VoIP, the techniques of the present invention may be applied for non-real-time data communications as one ordinarily skilled in the art will also recognize and appreciate.

Additionally, at times, the illustrative embodiments of the present invention may be described in regards to peer-to-peer communications. In one aspect, a peer-to-peer model comprises a type of network in which any computer can act as both a server by providing access to its resources to other computers, and can act as a client by accessing shared resources from other computers. Although in another aspect, a peer-to-peer model may not comprise a notion of a client and a server, a client and a server may provide peer-to-peer communications as well as client to client, server to server, or a client/server to a computing device such as a gateway. In an additional aspect, peer-to-peer communications comprises a process whereby computers can exchange information between each other directly without the assistance of a third party network or a device, such as a gateway. Although peer-to-peer communications may be generally described as direct communication between computers, there may be other network elements between the computing devices to facilitate the transmission and/or communication, such as for example, a network hub.

Furthermore, although the illustrative embodiments of the present invention may be described peer-to-peer, point-to-point, client to server, or otherwise, one ordinarily skilled in the art will recognize and appreciate that the present invention may be practiced between computing devices in any manner via any network topology, and that any reference to peer-to-peer, client/server, or otherwise is not intended to limit the present invention in any way.

In one aspect, the present invention is related to a remote access architecture having a remote access client for communicating to a network via a gateway or peer-to-peer to another remote access client or another computing device. The remote access architecture of the present invention provides systems and methods for securely communicating network traffic transmitted between a private network behind a gateway to a client on an external network, such as public network. The remote access architecture of the present invention enables separation of the client from the private network by providing network address translation (NAT) functionality on the gateway. A VPN gateway that uses Network Address Translation (NAT) provides masquerading of IP addresses of a client to shield the private network from direct layer-2 access by the client.

Referring now to FIG. 1A, the environment 180 depicts a system for deploying the remote access architecture in an illustrative embodiment of the present invention. In brief overview, the environment 180 includes multiple computing devices 102a-102c (herein also referred to as clients 105a-105c) connected to a network 104 via one or more network connections 341a-341n. One or more of the clients 105a-105n may connect to a server 102a, a server farm 102e, or a peer computing devices 102d via a gateway 350.

Each client 105a-105n includes a remote access client 120a-120c, which will be described in more details in connection with FIG. 1C, and one or more applications 338a-338n. Each of the clients 105a-105n communicate over the network 104 to the gateway 340 via a tunneling or gateway connections 341a-341n using any type and/or form of suitable tunneling or gateway protocols. In some embodiments, the gateway connections 341a-341n may be used for communicating securely, such as via encapsulating and encryption, or otherwise may use any other protocols, such as any real-time, lossless, or lossy protocol. In other embodiments, the gateway 340 provides a virtual private network connection between one or more of the clients 105a-105n and any of the computing devices 102d-102n.

The client 105 can be any type and/or form of computing device 102 that can run one or more applications 338 that access a network, such as network 104. The application 338 can be any type and/or form of application such as any type and/or form of web browser, web-based client, client-server application, a thin-client computing client, an ActiveX control, or a Java applet, or any other type and/or form of executable instructions capable of executing on client 105 or communicating via a network 104. The application 338 can use any type of protocol and it can be, for example, an HTTP client, an FTP client, an Oscar client, or a Telnet client. In some embodiments, the application 338 uses a remote display or presentation level protocol. In one embodiment, the application 338 is an ICA client, developed by Citrix Systems, Inc. of Fort Lauderdale, Fla. In other embodiments, the application 338 includes a Remote Desktop (RDP) client, developed by Microsoft Corporation of Redmond, Wash. In other embodiments, the application 338 comprises any type of software related to VoIP communications, such as a soft IP telephone. In further embodiments, the application 338 comprises any application related to real-time data communications, such as applications for streaming video and/or audio.

The clients 105a-105n may access any of the resources provided via computing devices 102d-102n which may be on the same network 104, or which may be on a separate network, such as a private network. In some embodiments, computing devices 102a-102n may be on a network disconnected and not routable from the network 104 of the clients 105a-105n. In one embodiment, any of the clients 105a-105n may communicate with a peer computing device 102d having a remote access client 102n and application 338d. For example, the application 338d may comprise a portion of a client/server or distributed application corresponding to any of the applications 338a-338c on clients 105a-105n. In some embodiments, any of the remote access clients 120a-120n may communicate with the remote access client 120n via the gateway 340.

In another embodiment, any of the clients 105a may communicate via the gateway 340 to a server 102e running an application 338e, which for example, may be an application server providing email services such as Microsoft Exchange manufactured by the Microsoft Corporation of Redmond, Wash., a web or Internet server, or a desktop sharing server, or a collaboration server. In some embodiments, any of the application 338e may comprise any type of hosted service, such as GoToMeeting.com provided by Citrix Systems, Inc. of Ft. Lauderdale, Fla., WebEx.com provided by WebEx, Inc. of Santa Clara, Calif., or LiveMeeting.com provided by Microsoft Corporation of Redmond, Wash.

In another embodiment, any of the clients 105a may communicate via the gateway 340 to a server farm 102n or server network, which is a logical group of one or more servers that are administered as a single entity. The server farm 102n may be running one or more applications 338N, such as an application 338f providing a thin-client computing or remote display presentation application. In one embodiment, the server 102e or server farm 102n executes as an application 338e-338n, any portion of the Citrix Access Suite™ by Citrix Systems, Inc., such as the MetaFrame or Citrix Presentation Server™, and/or any of the Microsoft Windows Terminal Services manufactured by the Microsoft Corporation.

Still referring to FIG. 1A, the gateway 340 may comprise any type and/or form of gateway, such as a remote access server, that may be used to connect one or more computing devices on one network to other networks. In another aspect, the gateway 340 may be used to provide a virtual private network connection to give a client 105a-105c access to a private network. In a further aspect, the gateway 340 may be a hardware or software set-up that translates between two dissimilar protocols or disjoint or disconnected networks or systems. The gateway 340 may comprise a specialized hardware or networking device, or may be a computing device configured to act as a gateway. As such, the gateway 340 may comprise software, hardware, or any combination of software and hardware. In one embodiment, the client 105 and the gateway 340 communicate via any type and/or form of gateway or tunneling protocol 341a-341n, such as SSL or TLS, or the Citrix Gateway Protocol manufactured by Citrix Systems, Inc. of Ft. Lauderdale, Fla.

In some embodiments, the gateway 340 may decrypt encrypted packets received from a client 105a-105c, and may encrypt packets communicated to a client 105a-105n. The gateway 340 may be used to protect a private network, such as network 104. In some embodiments, the gateway 340 associates a client 105a-105c with a private IP address or an IP address of the private network. In one of these embodiments, when the gateway 340 receives a packet from the client 105a-105c, the gateway 340 transforms the IP address of the packet to the IP address associated with the client 105a-105c for the private network. In some embodiments, the gateway 340 may apply access control policies to network traffic to and/or from a client 105a-105c. For example, access controls policies may be applied to a packet received from the client prior to routing the packet to a final destination.

In one embodiment of the gateway 340, once a frame enters the gateway 340 via an SSL tunnel, the packet and its payload are dispatched via callbacks into a handlers executing in user mode, which provide functionality for SSL decryption. In another embodiment, openSSL may be used. In other embodiments, a hardware accelerator is used. In a further embodiment, the gateway 340 comprises one or more blades for providing remote access. Once the packet is decrypted, it is injected into an HTTP network stack where headers are assembled and passed on to the remote access blade. In a remote access blade, a packet is classified by the type of data contained within the packet. In one embodiment, the packet contains an HTTP header requesting login and registration. In another embodiment, the packet seeks TCP/UDP/RAW/OTHER connection establishment. In still another embodiment, the packet contains connection-specific data. In yet another embodiment, the packet contains a special feature request such as collaboration with other users, fetching of user directory and presence or requesting telephony functionality such as conferencing and web cast. The remote access module dispatches the packet appropriately to the corresponding sub handler. For example, the client 105 may request that a connection be set up to a specific machine on the private network behind the gateway 340. The remote access module may consult with the access control module and if a positive response is returned, the remote access module may grant the request. In some embodiments, the remote access module 120 may grant the request by injecting subsequent frames on the private network using a frame forwarding module utilizing NAT/PAT to correlate incoming frames to corresponding SSL tunnels 341a-341n to a client 105a-105c.

The network 104 as illustrated in FIG. 1A can be any type of network. The network 104 can be a local-area network (LAN), such as a company Intranet, a metropolitan area network (MAN), or a wide area network (WAN), such as the Internet or the World Wide Web. The topology of the network 104 may be a bus, star, or ring network topology. The network 104 and network topology may be of any such network or network topology capable of supporting the operations of the present invention described herein. The client 108 and gateway 340 can connect to one or more networks 104 through a variety of connections including standard telephone lines, LAN or WAN links (e.g., T1, T3, 56 kb, X.25, SNA, DECNET), broadband connections (ISDN, Frame Relay, ATM, Gigabit Ethernet, Ethernet-over-SONET), and wireless connections or any combination thereof. Connections can be established using a variety of communication protocols (e.g., TCP/IP, IPX, SPX, NetBIOS, Ethernet, ARCNET, Fiber Distributed Data Interface (FDDI), RS232, IEEE 802.11, IEEE 802.11a, IEEE 802.11b, IEEE 802.11g, and direct asynchronous connections).

In one embodiment of the present invention, the gateway 340 illustrated in FIG. 1A is used to facilitate a direct peer-to-peer connection between computing devices 102a-102n. For example, client 105a may establish a tunneling session with the gateway 340 to access the peer computing device 102d. The gateway 340 negotiates with the remote access client 120a of client 105a and the remote access client 120n of computing device 102d to enable the client 105a to directly connect to the computing device 102d without traversing the gateway 340. Once the network connection between the client 105a and computing device 102d is established, the client 105a can communicate in a peer-to-peer manner with computing device 102d. The gateway 340 of the present invention can facilitate a direct peer-to-peer connection between any of the computing devices 102a-102n illustrated in the environment 180. In one embodiment, the gateway 340 can facilitate a peer-to-peer connection between any of the clients 105a-105n, for example between client 105a and client 105b or between client 105b and client 105c. In another embodiment, the gateway 340 facilitates a peer-to-peer connection between computing devices 102d-120n, for example, between computing device 102d and server 102e or server farm 102n. In other embodiments, the gateway 340 facilitates a peer-to-peer connection between one of the clients 105a-105n and one of the computing devices 102d-102n. The techniques of facilitating a peer-to-peer connection via the gateway 340 will be discussed in more detail below in conjunction with FIGS. 2A and 2B Referring now to FIG. 1B, the remote access client 120 of the present invention may be used in an illustrative embodiment of a peer-to-peer connection without a gateway 304. For example, the gateway 340 may facilitate a peer-to-peer connection between any of the computing device 102a-102n illustrated in FIG. 1, and thereafter the computing devices 102a-102n communicate directly to each other in a peer-to-peer manner. In other embodiments, any computing device 102a may communicate directly to another computing device 102b or 102c via a network 104 without a gateway 340 facilitating the connection.

Figure 1B:
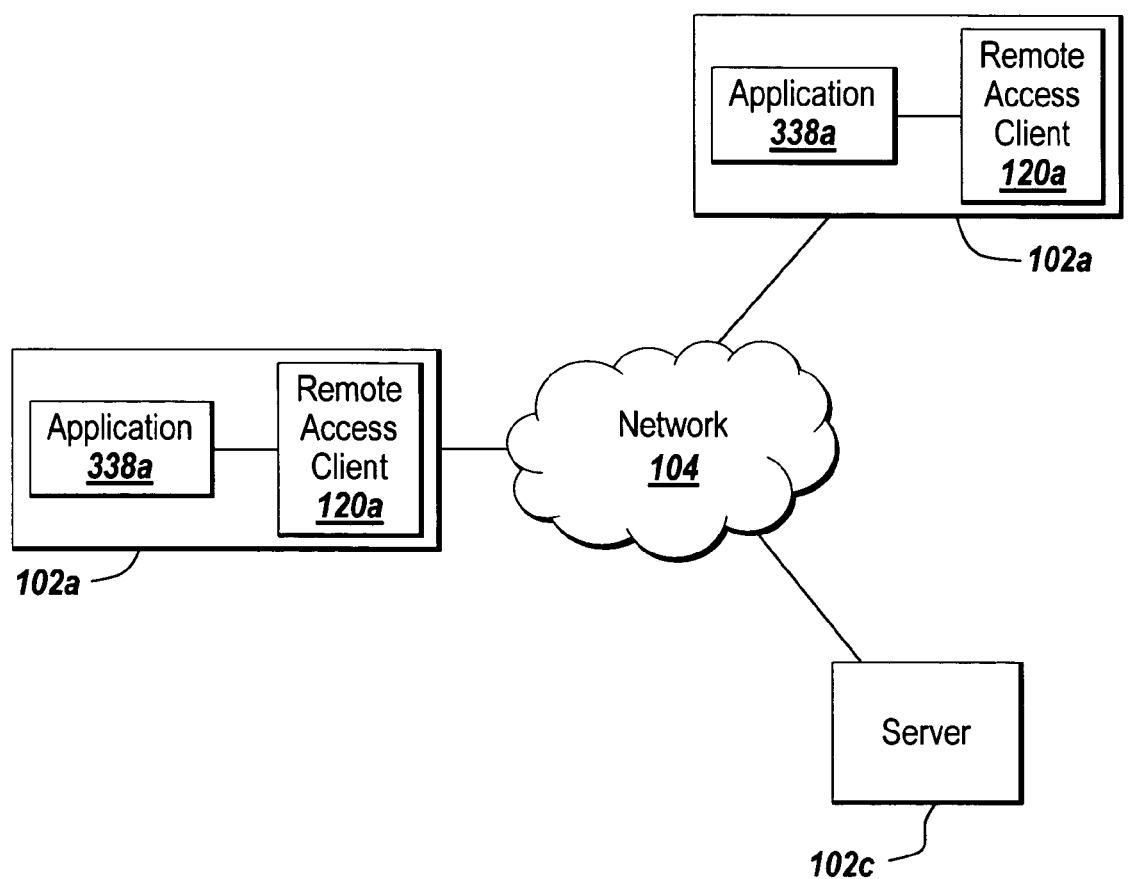
FIG. 1B is a block diagram depicting another embodiment for practicing the operations of the present invention in a peer-to-peer network environment.

In brief overview of FIG. 1B, the remote access client 120a may be deployed on a client 102a running one or more application 338a. The computing device 102a may connect over the network 104 to computing device 102b and/or computing device 102c. Computing device 102b may be a peer or client computing device also comprising a remote access client 120b. In some embodiments, remote access client 120a and 120b may communicate with each other via network 104, and may work in conjunction with each other for application 338a to communicate to application 338b, such as for a web-based or client/server application. In other embodiments, the remote access client 120a may communicate with computing device 120c which may be a server that does not execute a remote access client 120.

Figure 1C:
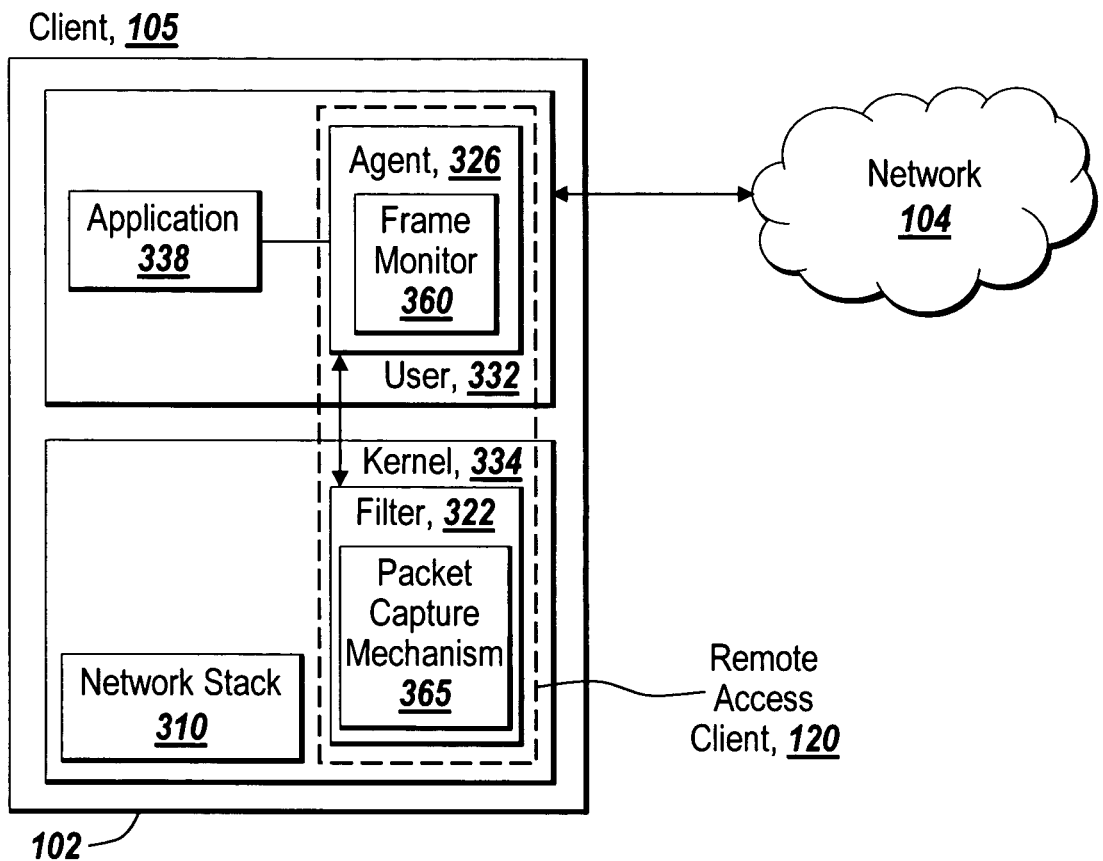
FIG. 1C is a block diagram depicting an embodiment of a remote access client of the present invention for network communications.

FIG. 1C depicts a block diagram illustrating a system having a remote access client 120 for routing network packets from a client 105 to a network 104. In brief overview, the system includes a computing device 102 (herein also referred to as a client 105) having an operating system that includes a user mode 332, also referred to as an application or user space, and a kernel-mode 334, which may be also referred to as the kernel or system level space. The client 105 runs an agent 326 that in one embodiment, may run in user-mode 332. The client 105 also runs a filter 322, which may, in one embodiment, execute in kernel-mode or the kernel space 334. In one embodiment, the filter 322 and the agent 326 form the remote access client 120 for routing packets via a network, or for otherwise providing remote access connectivity in accordance with the operations of the present invention described herein. The remote access client 120, or any portion thereof, such as the agent 326 or the filter 322, may execute in user-mode 332 or kernel-mode 334.

The client 105 may also have a network stack 310, which may comprise one or more network layers, such as any networks layers of the Open Systems Interconnection (OSI) communications model as those skilled in the art will recognize and appreciate. The network stack 310 may comprise one or more protocols, such as the TCP/IP protocol over Ethernet or a wireless protocol, such as IEEE 802.11, as those skilled in the art will recognize and appreciate. Furthermore, the network stack 310 may include one or more network drivers supporting the one or more layers, such as a TCP driver or a network layer driver. The network drivers may be included as part of the operating system of the computing device 102 or as part of any network interface cards or other network access components of the computing device 102. Additionally, any of the network drivers of the network stack 310 may be customized, modified or adapted to provide a custom or modified portion of the network stack 310 in support of any of the techniques of the present invention described herein. Additionally, some portions of the network stack 310 may operate in kernel-mode 334 while other portions run in user-mode 332, such as an application layer of the network stack 310.

The filter 322 may include a packet capturing mechanism 365, and the filter 322 and/or packet capturing mechanism 365 may comprise a network driver, such as a network driver operating at any layer, or portion thereof, of a network stack 310 of the client 105. The filter 322 and/or the packet capture mechanism 365 may comprise a driver complying with the Network Driver Interface Specification (NDIS), or a NDIS driver. In another embodiment, the filter 322 and/or the packet capture mechanism 365 may comprise a min-filter or a miniport driver. The packet capture mechanism 365 may also in some embodiments operate in kernel mode 334. Although the packet capture mechanism 365 is illustrated as part of the filter 322, the packet capture mechanism 365 may be separate from the filter 322. Additionally, the filter 322 and the packet capture mechanism 365 may operate at different layers, or portions thereof, of a network stack of the client 105.

The filter 322 may use a filter table for filtering packets. The filtering table is used to determine what action to take against packets, such as packets intercepted by the packet capture mechanism 365. The filter 322 can inspect the contents of the packets, such as routing information, to determine the action to take based on the filtering table. In some embodiments, the filter 322 may drop or accept the network packets depending on their content. In other embodiments, the filter 322 may route the network packets to the agent 326 based on the packets content and/or the filtering table. The filter table may also be used to ensure that unwanted packets are discarded. The filter 322 may be used to deny access to particular protocols or to prevent unauthorized access from remote computers by discarding packets to specified destination addresses.

In some embodiments, the filtering table includes information about a private network. In other embodiments, a filter 322 on a client computing device 102 receives the filtering table. In one of these embodiments, the filter 322 receives the filtering table from an application 338 or an agent 326 on the computing device 102. In another of these embodiments, the filter 322 receives configuration settings from the agent 326 and stores the configuration settings in a filtering table.

The packet capture mechanism 365 may intercept any of the network traffic of the client 105, such as network packets associated with the application 338. In some embodiments, the packet capture mechanism 365 intercepts network traffic transparently to the application 338, the agent 326, the gateway 340, or to any portion of the network stack 310 of the client 105, such as any other driver or layer operating at a layer above or below the layer the packet capture mechanism 365 operates. In this manner, the present invention can be used with and support any of the techniques described herein and for any application and any protocol used by the application. In one embodiment, the packet capture mechanism 365 intercepts outbound packet traffic, such as any network traffic communicated via network 104 and/or gateway 340. The packet capture mechanism 365 may forward the packets to the agent 325 or a frame monitor mechanism 360 of the agent 326. In some embodiments, the filter 322 communicates with the agent 326 via asynchronous I/O control messages. In one of these embodiments, the packet capture mechanism 365 may forward packets addressed to a private network behind a gateway 340 via asynchronous I/O control messages. In other embodiments, the filter 322 communicates with the agent 326 running in the user space 334 via UDP packets. In one embodiment, the filter 322 receives configuration settings from the agent 326 driver via asynchronous I/O control messages. The configuration settings may include information regarding which networks, protocols, or types of packets to filter. In one embodiment, the filter 322 stores the configuration settings in a filtering table. In another embodiment, the filter 322 receives a filtering table including the configuration settings.

In one embodiment, the filter 322 intercepts all outbound packets of the client 105 for inspection. For example, in some embodiments, the filter intercepts a packet generated by an application 338 executing in user-mode 332 for transmission by the client 105. If the packet satisfies a condition listed in the filtering table, the filter 322 may transmit the packet to the agent 326 and not to the original destination of the packet. The filter 322 may use an asynchronous I/O control message to forward the packet to the agent 326. The filter 322 may transmit the packet to the agent 326 in accordance with or responsive to a routing table.

In some embodiments, the agent 326 and the filter 322 communicate via an IOCTL application programming interface (API), such as any IOCTL libraries and function calls provided by the Microsoft Windows family of operating systems. In other embodiments, the IOCTL based interface between the agent 326 and the filter 322 may be provided by any portion of the operating system running on the client 105. Although discussed in terms of I/O control message and the IOCTL interface, the agent 326 and the filter 322 may communicate via any suitable mechanism and/or means.

The kernel 334 of client 105 may include an NDIS interface. In some embodiments, the NDIS interface includes a plurality of intermediate filters. In one embodiment, a packet passes through the NDIS interface and may be inspected by the plurality of intermediate filters. Although the filter 322 may be provided as an NDIS driver, the filter 322 may also be a process or other set or type of executable instructions executing in the kernel 334.

The agent 326 of the present invention may execute in the application space 332 or user-mode on the client 105. In other embodiments, the agent 326 operates in kernel-mode 334. In some embodiments, the agent 326 provides functionality for receiving packets from the filter 322. In other embodiments, the agent 326 provides functionality for applying a policy to a received packet. In still other embodiments, the agent 326 provides functionality for managing an SSL tunnel to the gateway 340. In yet other embodiments, the agent 326 provides functionality for encrypting and transmitting a packet to the gateway 340. The agent 326 may include frame monitor mechanism 360. The frame monitor 360 may include policies and logic for applying a policy to a received packet. The agent 326 may transmit a packet to a gateway 340 responsive to a policy-based determination made by the frame monitor 360.

In some embodiments, the frame monitor 360 may apply a policy to determine a condition of the client 105, or endpoint, at the time of transmission of the packet. In other embodiments, the frame monitor 360 may identify an application 338 that generated the packet. In some of these embodiments, the frame monitor 360 may make a policy-based determination to transmit the packet to the gateway 340 responsive to the identified application 338. In another embodiment, the frame monitor 360 may perform a checksum on the packet to verify that the identified application actually generated the packet.

In other embodiments, the packet capture mechanism 365 may be included in the agent 326 instead of or in addition to the filter 322. As such, the agent 326 may intercept network traffic. The packet capture mechanism 365 may use any hooking application programming interface (API) to intercept, hook, or otherwise obtain inbound and/or outbound packets of the client 105, such as the network traffic associated with application 338.

In one embodiment, a TCP connection is initiated by an application 338 executing on the client 105 for transmission of IP packets to a target computing device, such as computing device 102c of FIG. 1B or the gateway 340 in FIG. 1A. The remote access client 120 may intercept or capture the IP packets generated by the application 338. The remote access client 120 may send a TCP acknowledgement packet to the application 338 and terminate the TCP connection initiated by the application 338. Then, the remote access client 120 creates a second TCP connection to the second computing device 102c or the gateway 340 and transmits the captured IP packets via the second TCP connection. In some embodiments, the remote access client 120 may store a captured IP packet in a buffer. In these embodiments, the remote access client 120 may transmit the buffered IP packets via the second TCP connection to the second computing device 102c. Storing the captured IP packets in a buffer enables preservation of the packets in the event of a disruption in the network connection.

In one embodiment, upon receipt of the captured IP packets, the gateway 340 may create a third TCP connection between the gateway 340 and the targeted computing device 102d, such as in FIG. 1A. The gateway 340 may maintain a port-mapped Network Address Translation (NAT) table, enabling the gateway 340 to transmit response packets from the target computing device 102d to the port monitored by the application 338 that originally generated the IP packet on the client 105. Because the client 105 communicates only with a public network address of the gateway 3400, the client 105 is unaware of the network address of the target computing device 102d, increasing security to the network on which the target computing device 102d resides. Similarly, since the gateway 340 originates the TCP connection to the target computing device 102d, the target computing device 102d does not receive the address information of the client 105, protecting the client 105 and the network on which it resides. Additionally, since the gateway 340 receives the IP packets, the gateway 340 may make a determination responsive to a policy or security check as to whether or not to transmit the IP packets to the target computing device 102d, further increasing protection to the network on which the target computing device 102d resides.

In one embodiment, the present invention provides a method for securing a packet transmitted from a private, secured network behind a gateway 340 to a client 105 on an external network 104. The invention enables separation of the client 105 from the private network by providing network address translation (NAT) functionality on the gateway 340. A VPN gateway that uses NAT provides masquerading of IP addresses of a client 105 to shield the private network from direct layer-2 access by the client 105.

In one aspect, any portion of the remote access client 120, such as the agent 326, frame monitor 360, the filter 322, and packet capture mechanism 365, or any portion thereof may comprise software, hardware, such as an ASIC or an FPGA, or any combination of software and/or hardware. In some embodiments, portions of the remote access client 120 may be provided via one or more blades on the client 105.

Although the remote access client 120 is illustrated with multiple components, such as an agent 326 and a filter 322, one ordinarily skilled in the art will recognize and appreciate that the operations and functionality of the remote access client 120 described herein may be practiced in a single mechanism or single component. For example, in some embodiments, the operations and functionality of the remote access client 120 may be included within an application 338. In one embodiment for example, the functionality and operations of the remote access client 120 may be provided just as an agent 326, and in another embodiment, just as a network driver, such as the filter 322.

In some embodiments, the remote access client 120, or any portion thereof, such as the agent 326, frame monitor 360, the filter 322, and packet capture mechanism 365 may comprise an application, module, service, computer program, software component, web service, web component, library, function, process, task, thread, or any other type and/or form of executable instruction which is designed to and capable of executing the functionality of the present invention as described herein, and which may operate in any portion or combination of user-mode 332 and/or kernel-mode 334.

As illustrated in FIGS. 1A-1C, the remote access client 120 of the present invention may be deployed and used in a variety of ways to communicate and provided remote access over a network to other computing devices, such as via a gateway 340 or directly between peer computing devices. In these variety of environments, the remote access client 120 may be used to practice one or more of the optimization techniques of the present invention as described in more detail below. For example, the remote access client 120 may be used for optimizing any real-time data communications, such as VoIP, desktop sharing, or web conferencing in any of the illustrative environments of FIGS. 1A-1C.

Figure 1D:
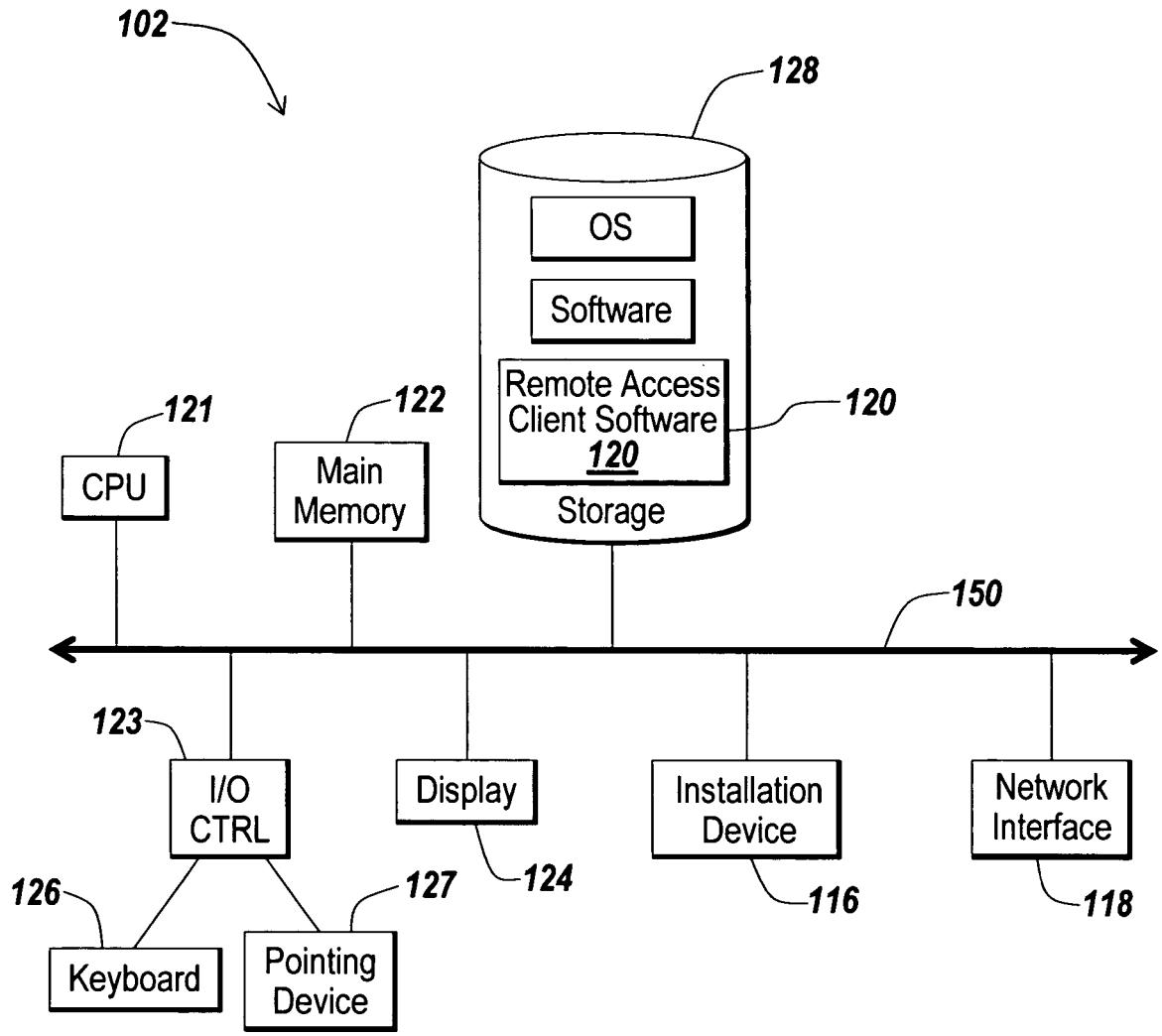
FIGS. 1D and 1E are block diagrams depicting embodiments of a computing device useful in practicing an embodiment of the present invention.
Figure 1E:
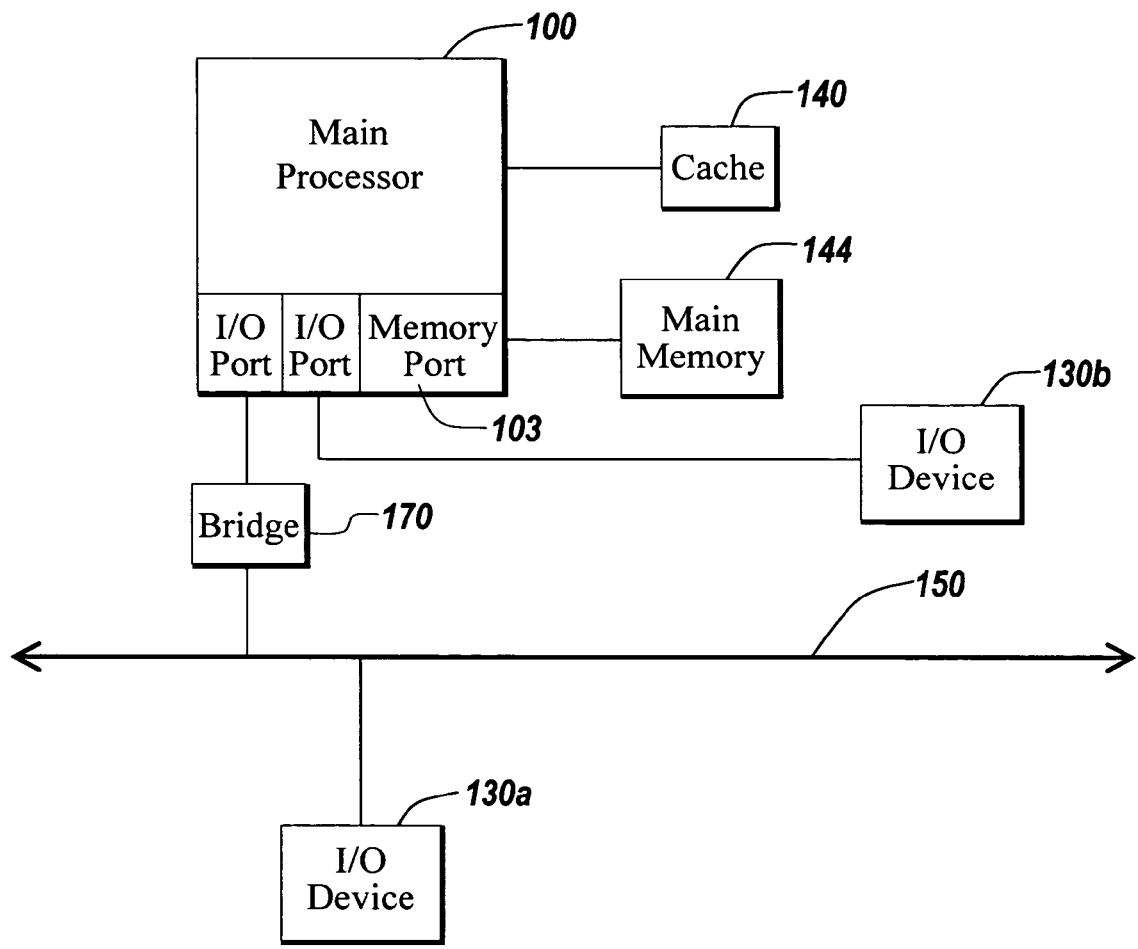

In the illustrative embodiments of FIGS. 1A-1C, the computing devices 102a-120n, such as for any of the clients 105, server, or the gateway 340, may be provided as any type and/or form of computing device such as a personal computer or computer server of the sort manufactured by the Hewlett-Packard Corporation of Palo Alto, Calif. or the Dell Corporation of Round Rock, Tex. FIGS. 1D and 1E depict block diagrams of a computing device 102 useful for practicing an embodiment of the present invention. As shown in FIGS. 1D and 1E, each computing device 102 includes a central processing unit 102, and a main memory unit 104. As shown in FIG. 1D, a typical computing device 102 may include a visual display device 124, a keyboard 126 and/or a pointing device 127, such as a mouse. Each computing device 102 may also include additional optional elements, such as one or more input/output devices 130a-130b (generally referred to using reference numeral 130), and a cache memory 140 in communication with the central processing unit 102.

The central processing unit 102 is any logic circuitry that responds to and processes instructions fetched from the main memory unit 104. In many embodiments, the central processing unit is provided by a microprocessor unit, such as: the 8088, the 80286, the 80386, the 80486, the Pentium, Pentium Pro, the Pentium II, the Celeron, or the Xeon processor, all of which are manufactured by Intel Corporation of Mountain View, Calif.; the 68000, the 68010, the 68020, the 68030, the 68040, the PowerPC 601, the PowerPC604, the PowerPC604e, the MPC603e, the MPC603ei, the MPC603ev, the MPC603r, the MPC603p, the MPC740, the MPC745, the MPC750, the MPC755, the MPC7400, the MPC7410, the MPC7441, the MPC7445, the MPC7447, the MPC7450, the MPC7451, the MPC7455, or the MPC7457 processor, all of which are manufactured by Motorola Corporation of Schaumburg, Ill.; the Crusoe™5800, the Crusoe™5600, the Crusoe™5500, the Crusoe™5400, the Efficeon™8600, the Efficeon™8300, or the Efficeon™8620 processor, manufactured by Transmeta Corporation of Santa Clara, Calif.; the RS/6000 processor, the RS64, the RS 64 II, the P2SC, the POWER3, the RS64 III, the POWER3-II, the RS 64 IV, the POWER4, the POWER4+, the POWER5, or the POWER6 processor, all of which are manufactured by International Business Machines of White Plains, N.Y.; or the AMD Opteron, the AMD Athlon 64 FX, the AMD Athlon, or the AMD Duron processor, manufactured by Advanced Micro Devices of Sunnyvale, Calif. The computing device 102 may be based on any of the above described processors, or any other processor capable of operating as described herein.

Main memory unit 104 may be one or more memory chips capable of storing data and allowing any storage location to be directly accessed by the microprocessor 100, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 104 may be based on any of the above described memory chips, or any other available memory chips capable of operating as described herein. In the embodiment shown in FIG. 1E, the processor 100 communicates with main memory 104 via a system bus 150 (described in more detail below). FIG. 1E depicts an embodiment of a computing device 102 in which the processor communicates directly with main memory 104 via a memory port 103. For example, in FIG. 1E the main memory 104 may be DRDRAM.

FIGS. 1D and 1E depict embodiments in which the main processor 100 communicates directly with cache memory 140 via a secondary bus, sometimes referred to as a backside bus. In other embodiments, the main processor 100 communicates with cache memory 140 using the system bus 150. Cache memory 140 typically has a faster response time than main memory 104 and is typically provided by SRAM, BSRAM, or EDRAM.

In the embodiment shown in FIG. 1D, the processor 100 communicates with various I/O devices 130 via a local system bus 150. Various busses may be used to connect the central processing unit 102 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 100 may use an Advanced Graphics Port (AGP) to communicate with the display 124. FIG. 1E depicts an embodiment of a computer 102 in which the main processor 100 communicates directly with I/O device 130b via HyperTransport, Rapid I/O, or InfiniBand. FIG. 1E also depicts an embodiment in which local busses and direct communication are mixed: the processor 100 communicates with I/O device 130a using a local interconnect bus while communicating with I/O device 130b directly.

The computing device 102 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as the remote access client software 120 related to the present invention.

The computing device 102 may further comprise a storage device 128, such as one or more hard disk drives or redundant arrays of independent disks, for storing an operating system and other related software, and for storing application software programs such as any program related to the remote access client 120 of the present invention. Optionally, any of the installation devices 118 could also be used as the storage device 128. Additionally, the operating system and the proxy software 120 can be run from a bootable medium, for example, a bootable CD, such as KNOPPIX®, a bootable CD for GNU/Linux that is available as a GNU/Linux distribution from knoppix.net.

Furthermore, the computing device 102 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 102 to any type of network capable of communication and performing the operations described herein.

A wide variety of I/O devices 130a-130n may be present in the computing device 102. Input devices include keyboards, mice, trackpads, trackballs, microphones, and drawing tablets. Output devices include video displays, speakers, inkjet printers, laser printers, and dye-sublimation printers. The I/O devices may be controlled by an I/O controller 123 as shown in FIG. 1D. The I/O controller may control one or more I/O devices such as a keyboard 126 and a pointing device 127, e.g., a mouse or optical pen. Furthermore, an I/O device may also provide storage 128 and/or an installation medium 118 for the computing device 102. In still other embodiments, the computing device 102 may provide USB connections to receive handheld USB storage devices such as the USB Flash Drive line of devices manufactured by Twintech Industry, Inc. of Los Alamitos, Calif.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 102 of the sort depicted in FIGS. 1D and 1E typically operate under the control of operating systems, which control scheduling of tasks and access to system resources. The computing device 102 can be running any operating system such as any of the versions of the Microsoft® Windows operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, Java or Unix, among others.

In other embodiments, the computing device 102 may have different processors, operating systems, and input devices consistent with the device. For example, in one embodiment the computer 102 is a Zire 71 personal digital assistant manufactured by Palm, Inc. In this embodiment, the Zire 71 operated under the control of the PalmOS operating system and includes a stylus input device as well as a five-way navigator device.

Moreover, the computing device 102 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In one aspect, the present invention is related to providing various techniques for optimizing communications between computing devices, such as depicted in any of the illustrative environments FIGS. 1A-1C. The present invention provides the following techniques, which may be practiced stand-alone or in any combination: 1) peer-to-peer route optimization, 2) communications via a lossless protocol of packets constructed for transmission via a lossy protocol, 3) reducing network fragmentation by adjusting maximum transmission unit (MTU) adjustment to account for encryption, 4) client-side application-aware network communication prioritization, and 5) shielding a device from network disruption. The peer-to-peer route optimization technique will be discussed in conjunction with FIGS. 2A and 2B, techniques for communications via a lossless protocol of packets constructed for transmission via a lossy protocol are discussed in conjunction with FIGS. 3A and 3B, the MTU adjustment technique in conjunction with FIG. 4, the client-side application-aware prioritization technique in conjunction with FIGS. 5A and 5B, and the network disruption shielding in conjunction with FIGS. 6A and 6B.

In one aspect, the present invention is related to providing a peer-to-peer route optimization technique between a first computing device accessing a second computing device via a gateway, such as the gateway 340 illustrated in FIG. 1A. The peer-to-peer routing techniques provides a more optimal and direct communication between computing devices establishing or attempting to establish a communication session via a gateway. The illustrative method 260 of an embodiment of the present invention will be discussed in view of the illustrative environment 200 of FIG. 2A. In brief overview, the environment 200 includes a gateway 340 providing remote access connectivity to a private network, such as a network with IP address ranges 10.10.10.XXX. The gateway 340 in association with the private network may have assigned an IP address of 10.10.10.2 for communications on the private network. This private network may include a server 102c. Also, the private network comprises a telecommunication device 210c, such as any type and/or form of VoIP telephone. The telecommunication device 210c is assigned IP address 10.10.10.100 on the private network.

In one embodiment, the server 102 comprises a signaling server, which may provide any type and/or form of signaling services for establishing a communication session between computing devices, such as a first computing device 102a and a second computing device 102b. In one embodiment, the server 102c supports a Session Initiation Protocol, SIP, which is an Internet Engineering Task Force (IETF) standard protocol for initiating an interactive user session that involves multimedia elements such as video, voice, chat, gaming, and virtual reality. In one embodiment, SIP works in the application layer of the Open Systems Interconnection (OSI) communications model. In some embodiments, the first computing device 102a initiates a session via signaling, such as via the SIP protocol, to the signaling server 102c via signaling path 220. In one embodiment, the signaling server 102c in conjunction with the gateway 340 is used for establishing a media path 225 between the first computing device 102a and the second computing device 102b, such as for a VoIP telecommunication session between telephones 210a and 210b.

The first computing device 102a of environment 200 may be part of a network, private or public, accessing the gateway 340 via network 104 over the connection 341a and traversing the firewall 205a. The firewall 205a provides access to and traversal of a public network, and has assigned the IP address of 24.24.24.100. The first computing device 102a may be in communication with, or interfaced or coupled to a telecommunication device 210a, such as a VoIP communication device, or any other real-time data communication device. The second computing device 102b may be part of a private network and have assigned the IP address of 192.168.20.20. Additionally, the second computing device 102b may include a software based telecommunication device 210b, such as software-based VoIP telecommunication device or program. The second computing device 102b may access the gateway 340 via network 104 over connection 341b and traversing firewall 205b having a public network IP address of 216.216.10.10. The firewalls 205a and 205b may be any type and/or form of firewall as known to those ordinarily skilled in the art, such as a NAT firewall.

Figure 2A:
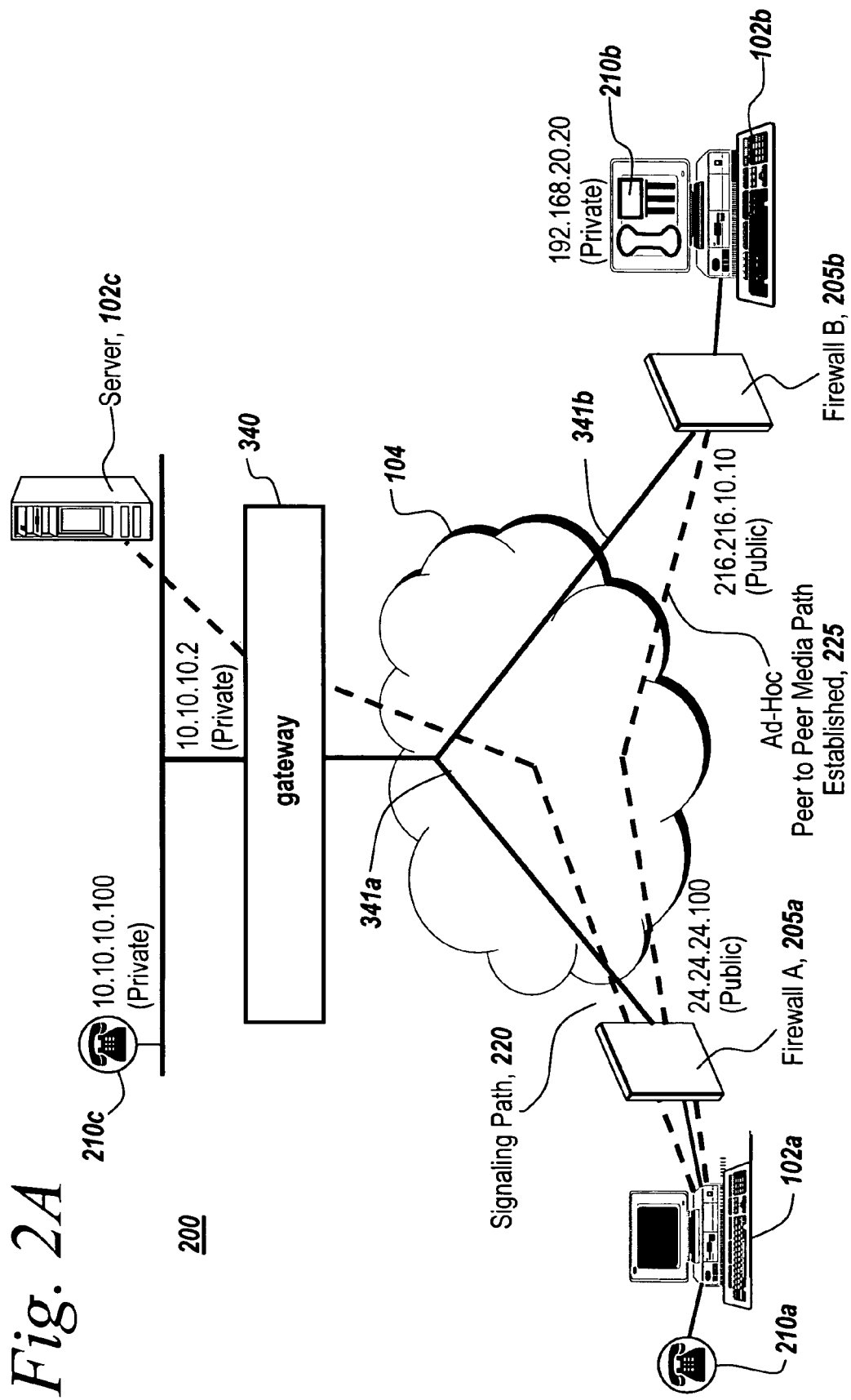
FIG. 2A is a block diagram depicting an embodiment of a peer-to-peer network environment for practicing an embodiment of the technique of the present invention for establishing a peer-to-peer communication route.
Figure 2B:
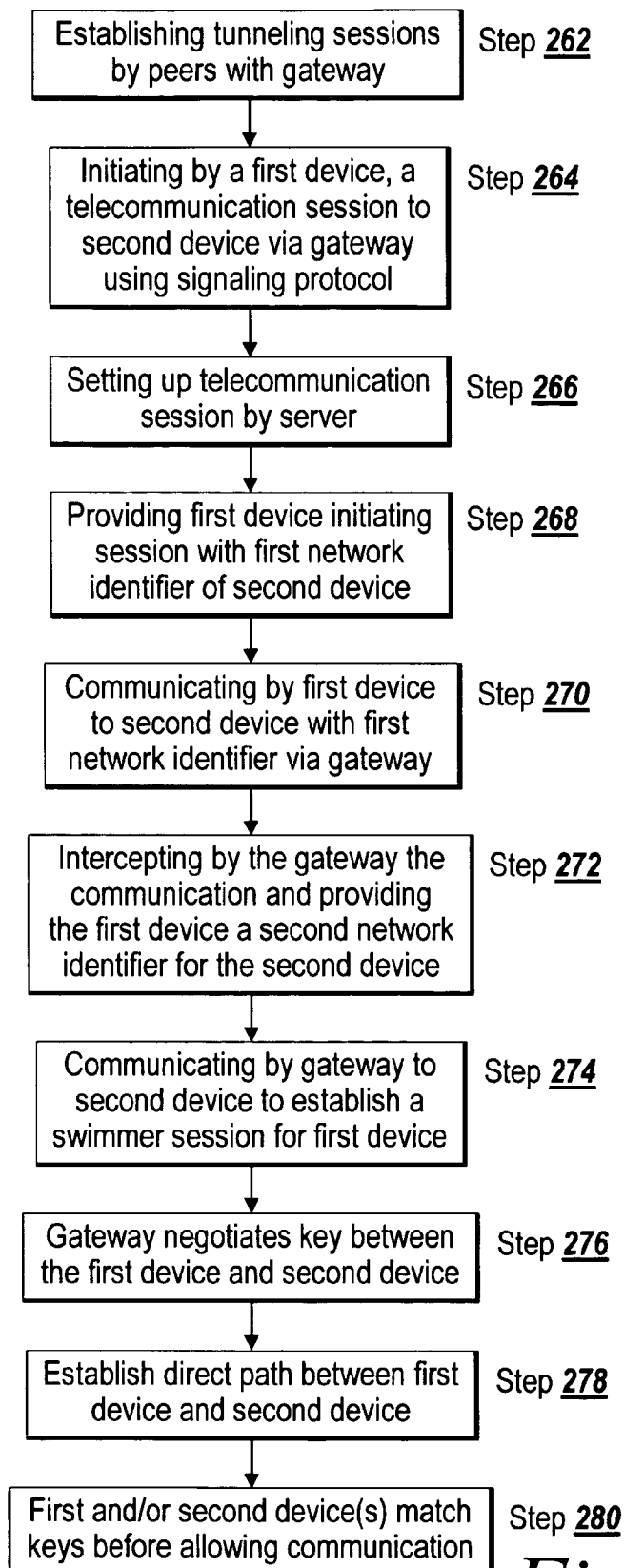
FIG. 2B is a flow diagram depicting an embodiment of the steps performed to optimize peer-to-peer route optimization technique of the present invention.

The first computing device 102a and second computing device 102b of FIG. 2A includes and uses the remote access client 120 of the present invention to provide an ad-hoc peer-to-peer virtual network connectivity in the environment 200. In addition to maintaining a tunnel and virtual private connection, such as an SSL VPN connection, to the gateway 340, the remote access client 120 of the present invention also has logic, functionality, and operations to establish a direct ad-hoc connection, such as an SSL VPN connection, to a peer it is trying to reach. In view of FIG. 2A, the illustrative method 260 of FIG. 2B will be used to discuss how a peer-to-peer secure communication session is established for the media path 225 in one illustrative embodiment of the present invention. The peer-to-peer routing technique of the present invention as illustrated by method 260 provides better voice quality and reduces latency related to VoIP communications as well as other real-time data communications.

In brief overview of illustrative method 260, at step 262, the computing devices 102a and 102b establish tunneling sessions with the gateway 340. At step 264, the first computing device 102a initiates a session to second computing device 102b via gateway 340 using signaling protocol via the signaling path 220 to signaling server 102b. The session may be initiated by the telecommunication device 102a in communication with the first computing device 102a. At step 266, a signaling server 102c sets up the telecommunication session, and at step 268, provides the first computing device 102a with a first network identifier of the second computing device 102b. The first network identifier comprises the network address, such as a host name or IP address, of the second computing device 102b based on its IP address established via the tunnel 341b with the gateway 340. At step 270, the first computing device 102a communicates to the second computing device 102b using the first network identifier to establish a connection or communication session.

In further overview, at step 272, the gateway 340 intercepts the communications by the first computing device 102a and provides the first computing device 102a a second network identifier for the second computing device 102b. The second network identifier comprises an IP address or host name of the second computing device 102a directly or publicly accessible by the first computing device 102a, such as the last known public IP address of the second computing device 102b. At step 274, in one embodiment, the gateway 340 communicates to the second computing device 102b to request the second computing device 102b establish a swimmer session for first computing device 102a to connect to the second computing device 102b via firewall 205b. In some embodiments, the gateway 340, at step 276, may negotiate or otherwise provide encryptions keys for the first computing device 102a and second computing device 102b. At step 278, the first computing device 102a establishes a direct connection, communication session, or media path 225 to the second computing device 102b. In other embodiments, at step 280, the first computing device 102a and/or second computing device 102b match encryption keys received by the other computing device before allowing communications.

In some embodiments of illustrative step 262, the computing device 102a and 102b may establish a connection with the gateway 340 by any suitable means and/or mechanisms, such as by any type and/or form of tunneling or gateway protocol. In some embodiments, the connections 341a and 341b to the gateway 340 may form a virtual private network connection, and in other embodiments, may use SSL or TLS to provide secure communications to the private network, such as the private network identified by the IP range 10.10.10.XXX in illustrative FIG. 2A. In one embodiment, the computing devices 102a and 102b connect to the gateway 340 by traversing a firewall 205a-205b via a public network, while, in other embodiments, the computing devices 102a and 102b may connect to the gateway 340 via a private network, and may not traverse a firewall 205a-205b. One ordinarily skilled in the art will recognize and appreciate the variety of ways the computing devices 102a-102b may connect to and communicate with the gateway 340.

At illustrative step 264, in one embodiment, the telecommunication device 210a, such as a hard IP phone, initiates a telecommunication session, such as a telephone call, to the telecommunication device 210b, such as a soft IP phone. In some embodiments, the telecommunication device 210a initiates the telephone call by indicating the extension of the telecommunication device 210b. When the telecommunication device 210a initiates the telecommunication session, this initiation, indication, or request to establish a telecommunication session or media session may be sent to the signaling server 102a via SIP protocol, a proprietary signaling protocol, or any other type of protocol suitable for signaling. The signals are communicated via signaling path 220 via the tunneling session 341a to the gateway 230 and reach the signaling server 102c via the intranet routes of the private network behind the gateway 340.

Although the illustrative embodiment of method 260 is discussed in view of VoIP or telecommunication signaling and sessions, one ordinarily skilled in the art will recognize and appreciate that the present invention may be used for initiating any type and/or form of communication session, real-time or otherwise, such as an interactive user session that involves multimedia elements such as video, voice, chat, gaming, and virtual reality. As such, the telecommunication devices 210a-210b, signaling/signal path 220, and signaling server 120a may accordingly and suitably comprise the type and/or form of device, signaling, protocols, and communications corresponding to the type and/or form of communication session.

In some embodiments of illustrative step 266, the signal server 102c may set up, negotiate, or establish any type and/or form of communication session, and in one embodiment the signaling server 102c sets up a telecommunication session, such as the VoIP telephone call initiated by the telecommunication device 210a. When setting up the telecommunication or other media session, the signaling server 102c, at step 270, instructs, requests, signals or otherwise communicates to the initiating telecommunication device 210a and/or first computing device 102a to contact, signal, connect, or otherwise communicate to the peer telecommunication device 210b via a certain network address. In some embodiments, the network address provided by the signaling server 102c to the initiating telecommunication device 210a comprises the network address for the computing device 102b on the private network, i.e., 10.10.10.XXX, behind the gateway 340. In one embodiment, the network address for the peer telecommunication device 210b may comprise an enterprise private network address.

At this point, instead of contacting the peer telecommunication device 210b via its VPN private IP address, the illustrative method of 260, via the remote access client 120 facilities the telecommunication device 210a and/or the first computing device 102a to directly contact the peer or target telecommunication device 210b or the second computing device 102b. The techniques of the present invention is not specific to any VoIP protocol, and may be applied to any other protocols, such as any peer-to-peer protocol between computing devices. The techniques of the present invention makes decisions by way of the IP address of the resource a client is trying to connect with.

At step 270, when the telecommunication device 210a initiates a data connection to the telecommunication device 210b with the first network address provided by the signaling server 120c at step 268, such as the VPN private IP address of the soft IP phone, the gateway 340 intercepts the communication to provide the telecommunication device 210 and/or first computing device 102b with a second network address for contacting the telecommunication device 210b. In one embodiment, the gateway 340 intervenes and sends an out of band signal over the same established VPN tunnel 341a to the first computing device 102a that is facilitating traffic for the hard IP phone 210a. One ordinarily skilled in the art will recognize and appreciate that the gateway 340 may communicate to the telecommunication device 210 and/or computing device 102a that network address for contacting the computing device 102b and/or telecommunication device 210b directly by any suitable means and/or mechanisms. For example, the gateway 340 may communicate the second network address to the first computing device 102a via a second tunneling session.

In some embodiments, the gateway indicates to the first computing device 102a of the last known public IP address that the second computing device 102b which is running the soft IP phone 210b used to contact the gateway 340. In other embodiments, this public IP may not be the actual IP address of the second computing device but may be the IP address of the firewall 205b that the second computing device 102b is behind. If the computing device 210a contacts the public IP address of the firewall 205b directly, packets may be rejected by the firewall 205b. In these embodiments, the gateway 340 instructs the computing device 102b to establish what is known to those skilled in art as a swimmer session to the first computing device 102a. A forward hole is punched in the firewall 205b via which the first computing device 102a can traverse or get back in. In other embodiments, any suitable means and/or mechanism may be used to allow the first computing device 102a to traverse the firewall 205b to connect and communicate with the second computing device 102b.

Although illustrative method 260 is discussed in conjunction with environment 200 of FIG. 2A having the second computing device 102n behind a firewall 205a, as one ordinarily skilled in the art will recognize and appreciate, the illustrative method 260 can be used in environments where the second computing device 102b is directly accessible without traversing a firewall 205a. As such, the illustrative method 260 may not need to at step 274 instruct the second computing device 102b to provide a swimmer session or other mechanism for the first computing device 102a to connect to the second computing device 102b.

In some embodiments, the gateway 340, at step 276, may negotiate a secret key between the computing devices 102a-103b for secure communications. The remote access client 120 on the computing devices 102a-102b may use this key for secure and encrypted communicates, and/or to authenticate or authorize the other computing device. In other embodiments, to ensure that malicious computing devices do not take advantage of this open hole, the gateway 340 at step 276 negotiates a secret key between the two computing devices 102a and 102b and the respective remote access clients 120 ensure that the keys match before allowing data communication. For example, in the embodiment of establishing a swimmer session, this key ensures that the packets coming in the open hole are from the computing device that the swimmer session was meant for.

In other embodiments, the gateway 340 does not perform step 276 to provide a secure mechanism of peer-to-peer communication sessions between the computing devices 102a-102b. For example, the computing devices 102a-102b may be in the same private enterprise network and therefore, may be trusted. In further embodiments, instead of the gateway 340 negotiating a secret key, the computing devices 102a-102b use any suitable means and/or mechanism for authenticating and/or authorizing the other computing device for peer-to-peer communications. In some embodiments, the computing devices 102a-102b may authenticate and/or authorize via the gateway tunneling sessions, such as via path 341a, or at step 280, via the media path 225 established at step 278. For example, the remote access clients 120 of each computing device 102a-102b may check for matching keys over established media path 225 before allowing any data to be communication over the connection 225.

At step 278, the direct media path 224 for any type and/or form of communications is established between the computing devices 102a-102b without traversing the gateway 340, and, in some embodiments, not using the respective VPN assigned IP addresses of the computing devices 102a-102b but instead their public IP address or the IP address assigned to them by their resident network. Using the techniques of the present invention, the respective remote access client 120 of computing devices 102a-102b act as temporary peer-to-peer SSL gateways to each other, decrypting each other's SSL session directly without communicating via the gateway 340. The direct peer-to-peer communication session via path 225 avoids the extra-hop via the gateway 340. This will reduce any latency due to taking a longer route via the gateway 340, and will improve the quality, performance, and experience of real-time data communications, such as the VoIP communications illustrated in FIG. 2A.

In some embodiments, the gateway 340 may be configured to automatically perform the techniques of illustrative method 260 every time a computing device 102 is trying to establish a peer-to-peer communication session or otherwise access a resource via the gateway 340. In other embodiments, the gateway 340 may be configured to automatically perform the techniques of the illustrative method 260 only for a certain IP address range either for a source IP address, a destination IP address, or any combinations thereof. In further embodiments, the gateway 340 may perform this technique based on the type of application and/or resource being accessed via the gateway 340. For example, in one embodiment, the gateway 340 may automatically perform this technique for any type of desktop or screen sharing application sharing screen data via the gateway 340. In other embodiments, the gateway 340 may determine to perform this technique based on any type and/or form of business rules, access control policies, or other configuration, algorithm, and statistics. For example, the gateway 340 may perform this technique based on ping-based timing statistics between peer computing devices. If the peer computing devices are closer to each other than the gateway 340, the gateway performs the peer-to-peer routing technique. One ordinarily skilled in the art will recognize and appreciate the various ways the gateway of the present invention may be adapted or otherwise configured to perform the peer-to-peer routing technique of the present invention.

In one aspect, the present invention is related to allowing communications via a lossless protocol packets constructed for transmission via a lossy protocol. In one technique illustrated in FIG. 3B, the present invention use a false acknowledgement technique when communicating a lossy or unreliable protocol via a lossless or reliable protocol, such as, for example, communicating RTP over UDP via a TCP or SSL/TCP connection. In another technique illustrated in FIG. 3C, the present invention uses payload shifting to communicate via a lossless protocol packets constructed for transmission via a lossy protocol. In some embodiments, these techniques of the present invention helps achieve Transport Layer Security (TLS) at a UDP level as one ordinarily skilled in the art will recognize and appreciate in view of the description below.

The illustrative method 360 of the embodiment of the present invention for practicing the false acknowledgement technique will be discussed in view of the illustrative environment 300 of FIG. 3A and additionally in view of FIGS. 1A-1E. In brief overview, the environment 300 comprises a client 105a of computing device 102a in communications with a peer client 105b of computing device 102b or alternatively, the gateway 340 via network 104. In some embodiments, the client 105a may traverse IP routers 305a-305b or the network 104 may have IP routers 305a-305b. Although, in other embodiments, the computing devices 102a-102b and gateway 340 may be on the same network 104. Additionally, a telecommunication device 210a may be associated with client 105a and a second telecommunication device 210b may be associated with the peer client 105b or the gateway 340.

Client 105a may comprise a first network stack 310a, and the client 105 or gateway 340 may comprise a second network stack 310b. The network stacks 3201a-310a may comprise one or more network layers, such as any networks layers of Open Systems Interconnection (OSI) communications model. For example, as illustrated in FIG. 3A, the network stacks 310a-310b comprises a TCP/IP 343a-343 communication layer communication on top of the frame layer that is suitable as known to those skilled in art for a TCP/IP based network 104. The TCP layer 343a-343b comprises an illustrative embodiments of a reliable or lossless protocol. For example, in TCP 343a-343b as known to those ordinarily skilled in the art, the network stack 310a-310b or any drivers or mechanisms thereof, such as a TCP driver, may perform algorithms and operations, and comprise logic or functionality to provide one or more of the lossless or reliable characteristics of the protocol. For example, to support TCP 343a-343b, the network stack 310a-320b may perform packet ordering, packet retransmission, acknowledgements of receipt of packet, a flow control algorithm, a sliding window algorithm, and/or a nagle's algorithm, and any other reliability related operations and algorithms as one ordinarily skilled in the art will recognize and appreciate in view of TCP 343a-343b or any other lossless protocol.

Additionally, the networks stacks 310a-310b may comprise an SSL 341a-341b layer for supporting SSL or SSL VPN communications. For example, the SSL layer 341a-341b may be used for a gateway or tunneling session between remote access clients 120 or between a remote access client 120 and a gateway 340. As illustrated in FIG. 3A, the network stacks 310a-310b may also provides a layer for a lossy protocol 342a-342b, such as UDP, to be communicated over the lossless protocol 343a-343b, such as TCP. In some embodiments, the lossy or unreliable protocol 342a-342b may comprises Real Time Protocol (RTP) over UDP, and may comprise a payload have any type and/or form of real-time data, such any representation of voice or audio. In other embodiments, the lossy protocol 342a-342b may carry the VoIP over communications to and from the client 105a in an established VoIP session, such as a session established via illustrative method 260 discussed above in connection with FIGS. 2A and 2B. A lossless protocol, such as UDP 342a-342b may be chosen for real-time applications like voice, because it may be more important to get packets to the recipient, such as peer client 105b, on time rather than getting the packets in a reliable manner, such as via a lossless protocol.

The network stacks 310a-310b also include a shim 322a-322b of the remote access client 120 of the present invention. The shim 322a-322b may comprise any portion of the remote access client 120, and in some embodiments, comprises a network driver, network driver interface, or other network layer related mechanism for providing the false acknowledgement technique of the present invention as described herein. The shim 322a-322b may comprise software, hardware, or any combination of software and hardware. In one embodiment, the shim 322a-322b may operate at the IP layer of the network stack prior to a network packet reaching the TCP layer 343a. In other embodiments, the shim 322a-322b may operate at the TCP layer 343a-343b. One ordinarily skilled in the art will recognize and appreciate that the shim 322a-322b may operate in any manner associated with the layer of operations of the lossless protocol in the network stack 310a-310b, including in or adjacent to the layer of the lossless protocol.

Figure 3A:
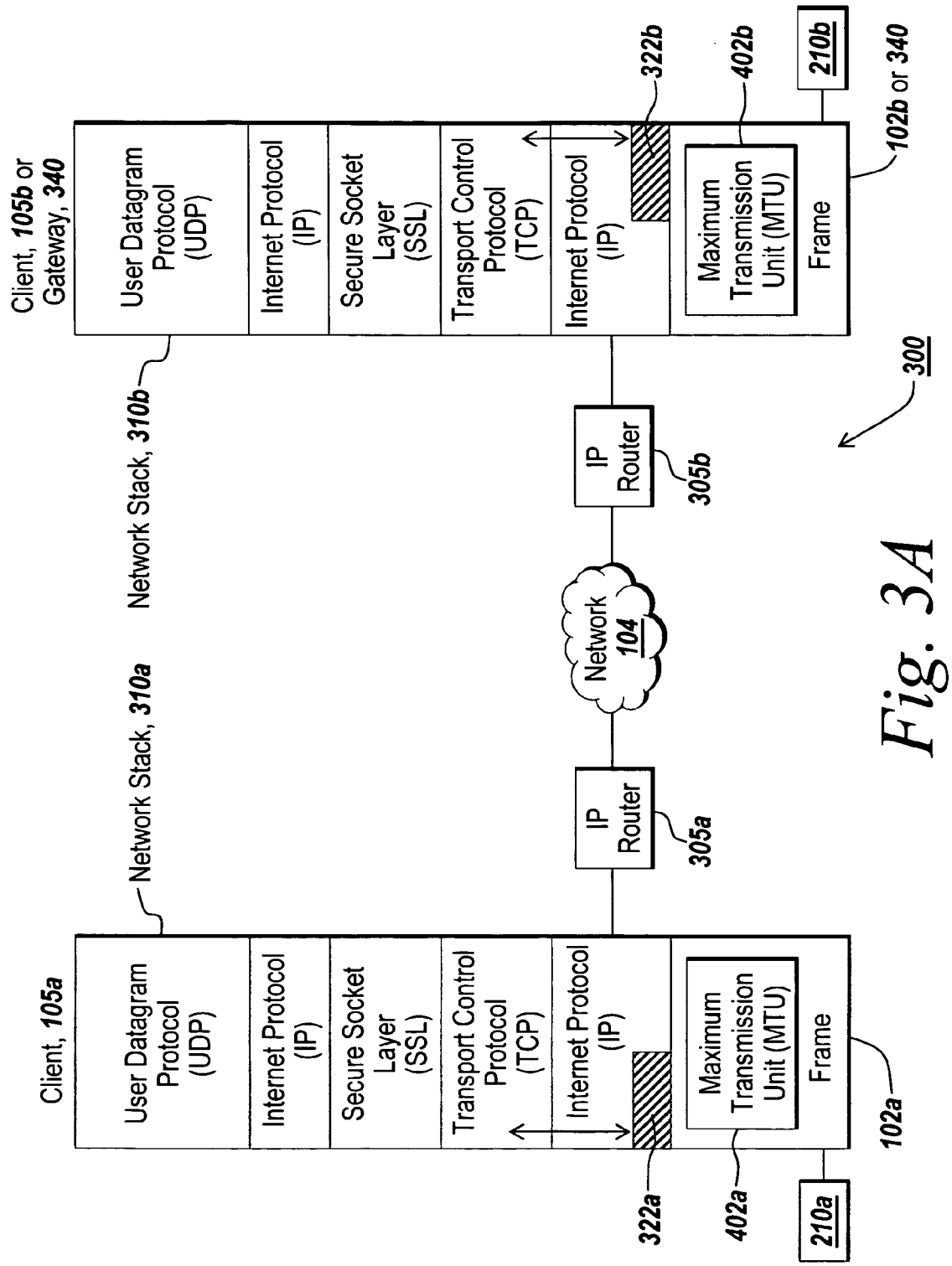
FIG. 3A is a block diagram depicting an embodiment of network stacks of any of the computing devices of illustrative environments depicted in FIGS. 1A-1C.
Figure 3B:
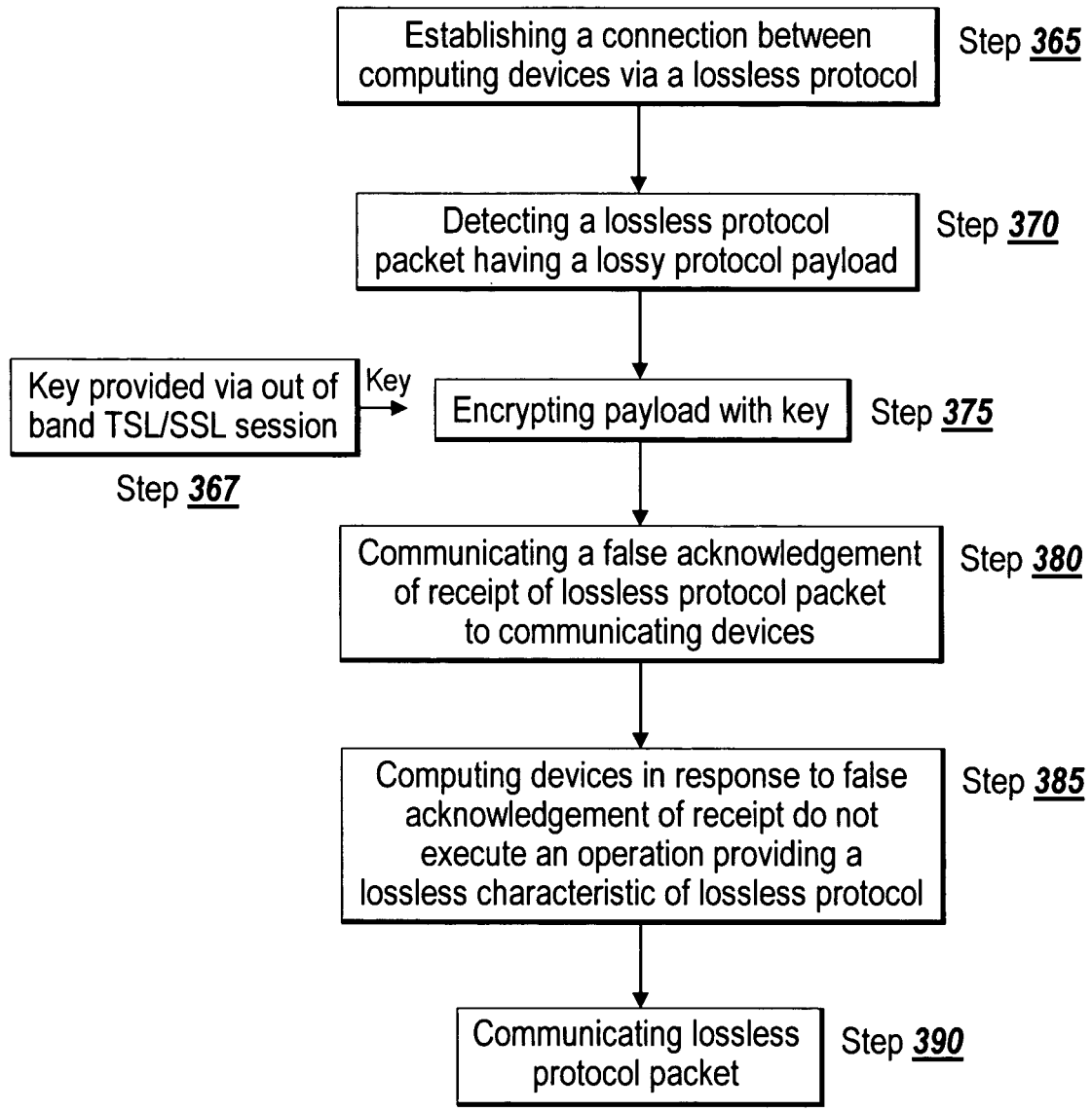
FIG. 3B is a flow diagram depicting an embodiment of the steps performed to use a false acknowledgement of receipt of network packets to communicate via a lossless protocol packets constructed for transmission via a lossy protocol.

The false acknowledgement technique of the present invention as illustrated by method 360 of FIG. 3B allows a lossy protocol, such as UDP 342a-343b, to be communicated via a lossless protocol, such as TCP 343a-343b. By the shim 322a-322b issuing a false acknowledgement of receipt of a TCP packet, the technique of the present inventions prevents or avoid the reliability mechanisms, operations and algorithms of the lossless protocol, such as in the example of TCP 343a-343b, any of the packet ordering, packet retransmission, a flow control algorithm, a sliding window algorithm, and/or a nagle's algorithm. As such, the lossy protocol 342a-342b can be communicated over a lossless protocol 343a-343b but maintain its lossy or unreliable characteristics which may be desired such as in real-time data communications. This technique also enables the lossy protocol to be communicated securely, or traverse a gateway via a tunneling protocol, or simply via TCP/IP while not applying the lossless characteristics of the lossless protocol to the lossy protocol communications.

In brief overview of illustrative method 360, at step 365, the computing devices 102a and 102b or the gateway 340 establish a lossless protocol based connection, such as a TCP connection, by which lossless protocol packets are communicated. At step 370, the remote access client 120 of the present invention may detect that the payload of a lossless protocol packet comprises a lossy protocol, such as RTP or UDP, or otherwise comprises real-time data. In one embodiment, at step 375, the illustrative method 360 may encrypt the payload with a key, such as a key provided via an out of band TLS or SSL session of step 367. At step 380, a false acknowledgement of receipt of the lossless protocol packet may be communicated or otherwise provided to the network stacks 310a-310b, such as by the shim 322a-322b. In response to the receipt of the false acknowledgement of receipt of the lossless protocol packet, at step 385, the respective network stacks 310a-310b do not execute one or more, or all of the algorithms and operations that provide the reliable or lossless characteristics of the lossless protocol. At step 390, the lossless protocol packet with the lossy protocol payload is communicated between the network stacks 310a-310b.

At step 365 of illustrative method 360, the lossless protocol connection may be established via any suitable means and/or mechanisms using an type and/or form of lossless protocol. In one embodiment, the network stack 310a of a client 105a establishes a lossless protocol connection, such as TCP, to a peer client 105a having network stack 310b. In another embodiment, the network stack 310a of client 105a establishes a lossless protocol connection to a gateway 340 having network stack 310b. Additionally, the lossless protocol connection of step 365 may be established in a secured manner, such as SSL, or as a virtual private connection. Although the network stacks 310a-310b are illustrated as having the same network layers, one ordinarily skilled in the art will recognize and appreciate that the network stacks may have corresponding layers, which may be of different versions or associated with different operating systems and/or drivers, and that each network stack 310a-310b may have additional layers, less layers or different layers.

At illustrative step 360, in one embodiment, the remote access client 120 intercepts a network packet, such as via the packet capture mechanism 365, and inspects the network packet by any suitable means and/or mechanisms to determine the type of the protocol used in the payload of the network packet, or the type of contents in the payload of the network packet. In some embodiments, the shim 322a-322b of the remote access client 120 may be used for intercepting and inspecting the network packet. In one embodiment, the remote access client 120 may intercept a network packet and determine if the network packet comprises any lossless protocol or a specific lossless protocol, such as TCP. If the network packet is a lossless protocol, the remote access client 120 checks the payload to determine the type of protocol and/or the type of data. In one embodiment, the remote access client 120 may determine by any suitable fields of the payload of the network packet, such as any portion of header of the lossy protocol representing the payload, that the payload has a lossy protocol content. In another embodiment, the remote access client 120 may determine by any data of the payload, if the payload comprises a lossy protocol or comprises real-time data.

In one embodiment, the remote access client 120 determines that a TCP packet comprises a payload of RTP or UDP, and applies an encryption of the payload. The remote access client 120 may encrypt the payload of the network packet using any type and/or form of encryption with a key provided in any suitable manner. In some embodiments, the key or cipher is negotiated via an out of band TLS session between the clients 105a-105b or the client 105a and gateway as shown in FIG. 3A as opposed to, in other embodiments, a traditional TLS session where the session is first negotiated and the same socket is used for data communication. In some embodiments, the encryption at step 375 is performed on a packet by packet basis. In another embodiment, encryption is performed on multiple packets at a time.

At step 380 of illustrative method 360 of the present invention, a false acknowledgment of receipt of the network packet, e.g., the lossless protocol packet, is issued, communicated, or otherwise provided to the network stacks 310a-310b comprising the respective sending and receiving computing devices 102a-120b, or gateway 340. The shim 322a-322b, any portion of the remote access client 120, or any portion of the network stack 310a-310b may issue the false acknowledgment of receipt of the network packet. In one aspect, the false acknowledgement of receipt of the network packet is false in the sense that it is communicated not to acknowledge the actual receipt of a network packet but in order to prevent the lossless and reliable mechanisms of the lossless protocol associated with the network stacks 310a-310b. As such, the false acknowledgement of receipt of the network packet may comprise the same form and/or type as an actual acknowledgement of receipt of the network packet.

In some embodiments, the false acknowledgement of receipt is issued to the network stacks 310a-310b prior to communicating the network packet or packets. In other embodiments, the false acknowledgement of receipt is issued after communicating the network packet(s) but at a time or in a manner such as to prevent the lossless protocol mechanisms of the receiving network stack 310a-310b from being applied to the transmitted network packet. In one embodiment, the false acknowledgment of receipt of the network packet is issued for each network packet, and in another embodiment, may be issued once per communication session or lossless protocol connection. Furthermore, one ordinarily skilled in the art will recognize and appreciate the false acknowledgement of receipt may be performed in different places in the network stack 310a-310b for different operating systems. For example, in one embodiment, the acknowledgement of receipt may be issued at the Network Driver Interface Specification (NDIS) driver level in the Microsoft Family of Windows Operating Systems.

At step 385 of illustrative method 360, the network stack 310a-310b receiving the false acknowledgment of receipt of the network packet from step 380 may in response to such receipt, may not execute, stop executing, or prevent from executing any one or more algorithms and operations providing one or more lossless characteristics of the lossless protocol. For example, in the embodiment of TCP as the lossless protocol, the network stack 310a-310b may not execute any one or more of the following with respect to the network packet, or the TCP connection: packet ordering, packet retransmission, a flow control algorithm, a sliding window algorithm, and/or a nagle's algorithm. In some embodiments, the false acknowledgment of receipt must be received on a packet by packet basis to prevent the lossless layer of the network stack 310a-310b from employing reliability algorithms. As such, the sending network stack 310a-310b can determine on a packet by packet basis which packets to apply the false acknowledgment techniques of the present invention to. There may be some lossless protocol network packets comprising the lossy protocol for which the reliability algorithms of the lossless protocol should be applied. In other embodiments, the false acknowledgment of receipt of the network packet may be received once for the lossless protocol connection to prevent employing reliability algorithms for any subsequent packets received during the lossless protocol session or connection.

At step 390, the illustrative method 360 communicates the lossless protocol packet having the lossless protocol payload via the network stacks 310a-310b. In one embodiment, the lossless protocol packet is communicated after step 385, or in other embodiments, before step 385. So, although the lossless protocol packet becomes lost in the network, no attempt is made to reclaim the packet as one would expect for a lossy protocol packet.

Although the illustrative embodiment of method 360 is discussed using a false acknowledgment of receipt of the network packet such as in TCP, any type and/or form of indication, request, or instruction may be communicated to the network stacks 310a-310b to prevent employing any reliability or lossless algorithms of the lossless protocol. In some embodiments, the lossless protocol layer of the network stack 310a-310b may be adapted or configured to have a configuration, flag, or instruction to not use the reliability algorithms either on a packet by packet basis, or a session or connection basis. For example, the lossless protocol may have fields, such in a header of a lossless protocol packet, that indicates whether reliability should be discarded or avoided for the packet.

Figure 3C:
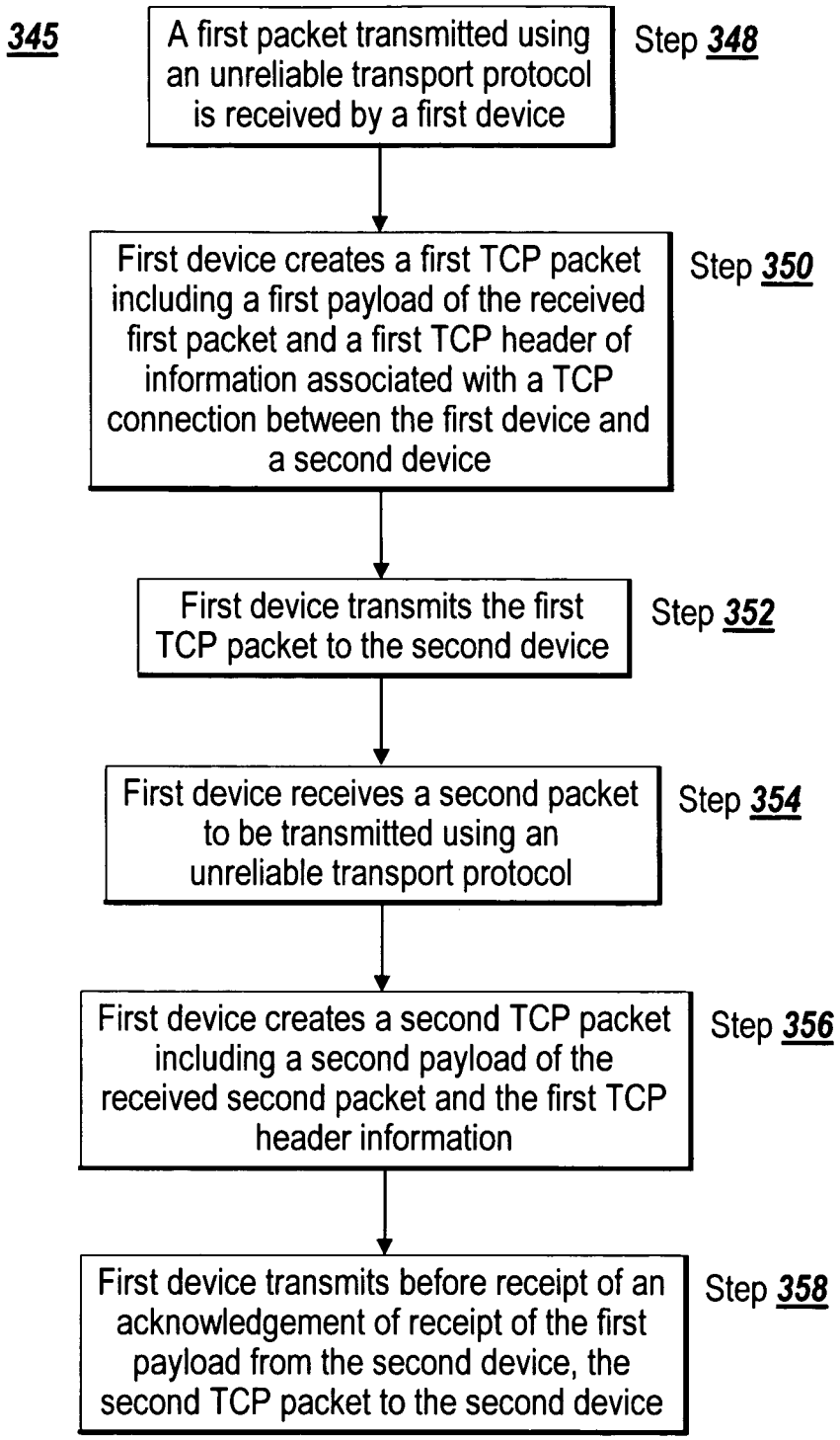
FIG. 3C is a flow diagram depicting an embodiment of the steps performed to communicate via a lossless protocol packets constructed for transmission via a lossy protocol.

Referring now to FIG. 3C, another embodiment of steps taken to transmit packets constructed according to a lossy protocol via a lossless protocol is shown by illustrative method 345, which may also be referred to as a payload shifting technique. In brief overview of illustrative method 345, at step 348, a first packet to be transmitted using an unreliable transport protocol is received by a first device, such as client 105. At step 350, the first device 105 creates a first TCP packet including a first payload of the received first packet and a first TCP header of information associated with a TCP connection established between the first device 105 and a second device. The first device 105 transmits the first TCP packet to the second device at step 352. At step 354, the first device 105 receives a second packet to be transmitted using an unreliable transport protocol, and at step 356, creates a second TCP packet including a second payload of the received second packet and the first TCP header information. At step 358, the first device transmits, before receipt of an acknowledgement of the receipt of the first payload from the second device, the second TCP packet to the second device.

Still referring to FIG. 3C, and now in more detail, at step 348, a first packet to be transmitted using an unreliable transport protocol is received by a first device 105. In some embodiments, the packet is intended to be transmitted using a lossy protocol of UDP. In further embodiments, the packet comprises RDP over UDP. In other embodiments, the first packet is generated by an application program 338 executing in user mode 332. In some embodiments, the packet is generated by an application 338 executing in kernel mode 334. In other embodiments, the first packet is received by the first device 105 for retransmission. In still other embodiments, the first packet is intercepted by a filter process 322 before it reaches the network stack 310a-310b. The filter process 322 may execute in user mode 332 or in kernel mode 334. In some embodiments, the filter 322 is a mini-driver. In other embodiments, the filter 322 is an NDIS driver. In other embodiments, the filter 322 process uses application hooking to intercept the first packet. In further embodiments, the application hooking is implemented via an application programming interface (API). In one embodiment, the hooking of network packets occurs at the network layer of the network stack 310a-310n.

At step 350, the first device 105 creates a first TCP packet including a first payload of the received first packet and a first TCP header of information associated with a TCP connection established between the first device 105 and a second device. For example, the TCP connection may be established between the client 105 and a peer computing device 102b in one embodiment, and between the client 105 and the gateway 340 in another embodiment. In some embodiments, the first device 105 indicates that the TCP packet contains a payload of packets constructed to be transmitted via a lossy protocol by opening a specific TCP port. In other embodiments, the first device 105 indicates that the TCP packet contains a payload of packets constructed to be transmitted via a lossy protocol by setting a flag in the TCP header. The TCP header may include information regarding the source node, information regarding the destination node, or a sequence number particularly identifying the TCP packet.

At step 352, the first device 105 transmits the first TCP packet to the second device. In some embodiments, the second device may be a gateway 340. In other embodiments, the second device is a "peer" computing device 102b. The first TCP packet may be encrypted before transmission to the second device using, for example, SSL or TLS.

At step 354, the first device 105 receives a second packet to be transmitted using an unreliable transport protocol, such as UDP. The second packet may be received from the same application 338 that generated the first packet. At step 356, the first device 105 creates a second TCP packet including a second payload of the received second packet and the first TCP header information, as described above. At step 358, the first device 105 then transmits, before receipt of an acknowledgement of the receipt of the first payload from the second device, the second TCP packet to the second device. In some embodiments, when an acknowledgment is received from the second device, the first device 105 updates the TCP header information before transmitting the packet. In other embodiments, the first device 105 creates a third TCP packet with updated TCP header information and having the second payload. The first device then transmits the third TCP packet.

Upon receipt of the TCP packet, the second device decrypts it, if necessary, and determines that the payload is one or more packets constructed to be transmitted using a lossy protocol. The second device may determine this based on the port on which the packet was received or by a flag in the TCP header information. Once determined, the second device strips the TCP header from the payload and delivers the payload.

In another aspect, the present invention is related to adjusting the reported maximum transmission unit (MTU) parameter to optimize network communications by reducing packet fragmentation for encrypted network packets. This technique may be applied on one or both network stacks 310a-310b of illustrative environment 300 of FIG. 3A. Encrypting a payload of a network packet, such as any network packet processed according to the illustrative method 360 described above, may increase the size of the payload. That is, the size of the network packet may increase to account for the change in size of the unencrypted original payload to the encrypted payload.

Still referring to FIG. 3A, the network stacks 310a-310b may comprise a maximum transmission unit 402a-402b (MTU) parameter to indicate the size of the largest unit of data that can be sent over a type of physical medium in a network, such as an Ethernet based network. In the embodiment of TCP/IP, the MTU 402a-402b indicates the largest datagram or packet than can be transmitted by an Internet Protocol (IP) layer interface, without the interface needing to br4eak down or fragment the datagram into smaller units. An MTU parameter 402a-402b may be associated with a communications interface such as a network interface card. The default MTU size for Ethernet is 1,500 bytes, and IEEE 802.3 is 1,492 bytes. As one ordinarily skilled in the art will recognize and appreciate, the default MTU size will be based on the networking technologies such as Token Ring, FDDI, X.25, etc.

Figure 4:
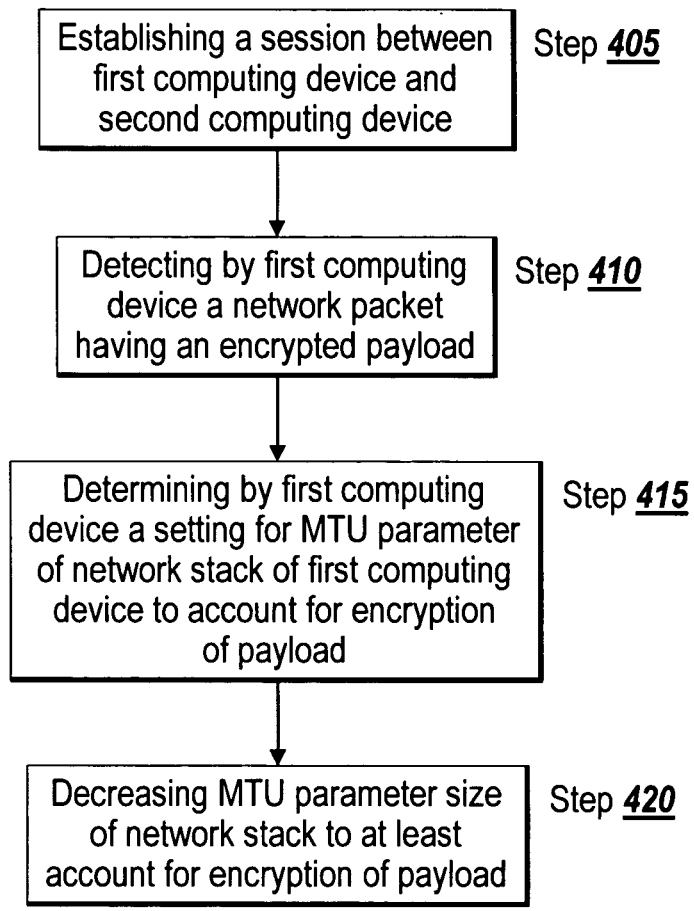
FIG. 4 is a flow diagram depicting one embodiment of steps performed for adjusting the maximum transmission unit parameter.

Referring now to FIG. 4, a flow diagram depicts an illustrative embodiment of the MTU adjustment method 400 of the present invention. In brief overview, at step 405, a session between computing devices is established, such as between a first computing device 102a and a second computing device 102b. At step 410, one of the computing devices 102, such as the first computing device 102a, detects a network packet having an encrypted payload. At step 415, the computing device 102a-120b determines a setting for the MTU 402a-402b parameter of the network stack 310a-310b to account for the size of the encrypted portion of the payload. At step 420, the MTU 402a-402b parameter is decreased to account for the encrypted portion. If the MTU 402a-402b is requested or reported, the MTU 402a-402b will indicate a size smaller than the MTU size associated with the physical layer, such as 1,500 for Ethernet.

Using this technique, any device on the network 104 may communicate network packets to the network stack 310a-310b according to the decreased MTU size that can be encrypted along the route to the network stack 310a-310b and not be fragmented. If the network packet is encrypted it should still fit in the actual MTU size of the physical network layer medium, such as Ethernet. For example, the MTU parameter 402a-402b may be set to the default MTU size of 1,500 for Ethernet and in accordance with the illustrative method 400 decreased by a determined number of bytes, for example 100, to account for encryption overhead. A network packet may be transmitted from a server resource to the client comprising a size equal to the reported MTU 402a-402b size of 1,400. The network packet may traverse the gateway 340 and get encrypted via the SSL tunnel, which in turns increases the network packet size to 1,475. Since this size fits into the MTU size of the Ethernet physical medium, the network packet will not be fragmented.

At step 405 of illustrative method 400, any type and/or form of communication session between a first computing device 102a and a second computing device 102b, such as client 105b or gateway 340 of FIG. 2A, may be established. In some embodiments, the session is established using the remote access client 120 on a first computing device. In one embodiment, the remote access client 120 establishes a session with the gateway 340, such as an SSL VPN session, or to another remote access client 120 on a peer computing device 102b.

In some embodiments of step 410, the remote access client 120 detects a network packet having an encrypted payload. In one embodiment, the packet capture mechanism 365 intercepts network packets and the agent 326 determines if the packet is encrypted. However, any other portion of the remote access client 120, such as the filter 322 or frame monitor 360 may determine if the packet is encrypted. In one embodiment, the entire payload of the network packet is encrypted, while in other embodiments, a portion of the payload is encrypted. The present invention may use any type and/or form of means or mechanism for determining if a packet has encryption. For example, in some cases, the remote access client 120 may check for a flag or field of the network packet indicating the payload is encrypted. In other embodiments, the remote access client 120 may check whether any portion of the payload is unintelligible, because it contains random data or noise from encryption. Additionally, the encrypted payload may be encrypted in association with any layer of the network stack 310a-310b, such as layer 2, 3, 6 or 7 encryption.

In some embodiments of step 415, the illustrative method 400 of the present invention determines the adjustment to the reported MTU 402a-402b size on a packet by packet basis, or in other embodiments, on a connection or session basis, and at step 420 adjusts the MTU 402a-402b accordingly. In one embodiment, the MTU 402a-402b is decreased exactly by the amount of encryption overhead for the network packet. In some cases, the illustrative method 400 determines the MTU 402a-402b size adjustment once for the entire session or connection and decreases the size of the MTU 402a-402b to a value to account for encryption overhead for the entire session. For example, although network packets may have varying encryption overhead, the adjustment accounts for the largest encryption overhead. In further embodiments, the MTU 402a-402b may be adjusted to take into consideration encryption that may occur when the network packet leaves the network stack 310a-310b, such as encryption by a gateway 340 that may occur in the end-to-end network traversal of the network packet Additionally, the MTU 402a-402b size may be adjusted for other network performance factors in addition to the encryption overhead. In some embodiments, although the MTU 402a-402b is decreased due to encryption overhead, it may be further decreased to account for other overhead and factors related to network communication, as well as increased in other cases. For example, the MTU 402a-402b may have been previously adjusted for a factor not related to encryption and after using the techniques of the present invention the MTU 402a-402b is decreased to take into account encryption overhead. One ordinarily skilled in the art will recognize and appreciate that there may be other factors and considerations for adjusting the MTU besides or in addition to adjusting for encryption overhead in accordance with the techniques of the present invention.

Figure 5A:
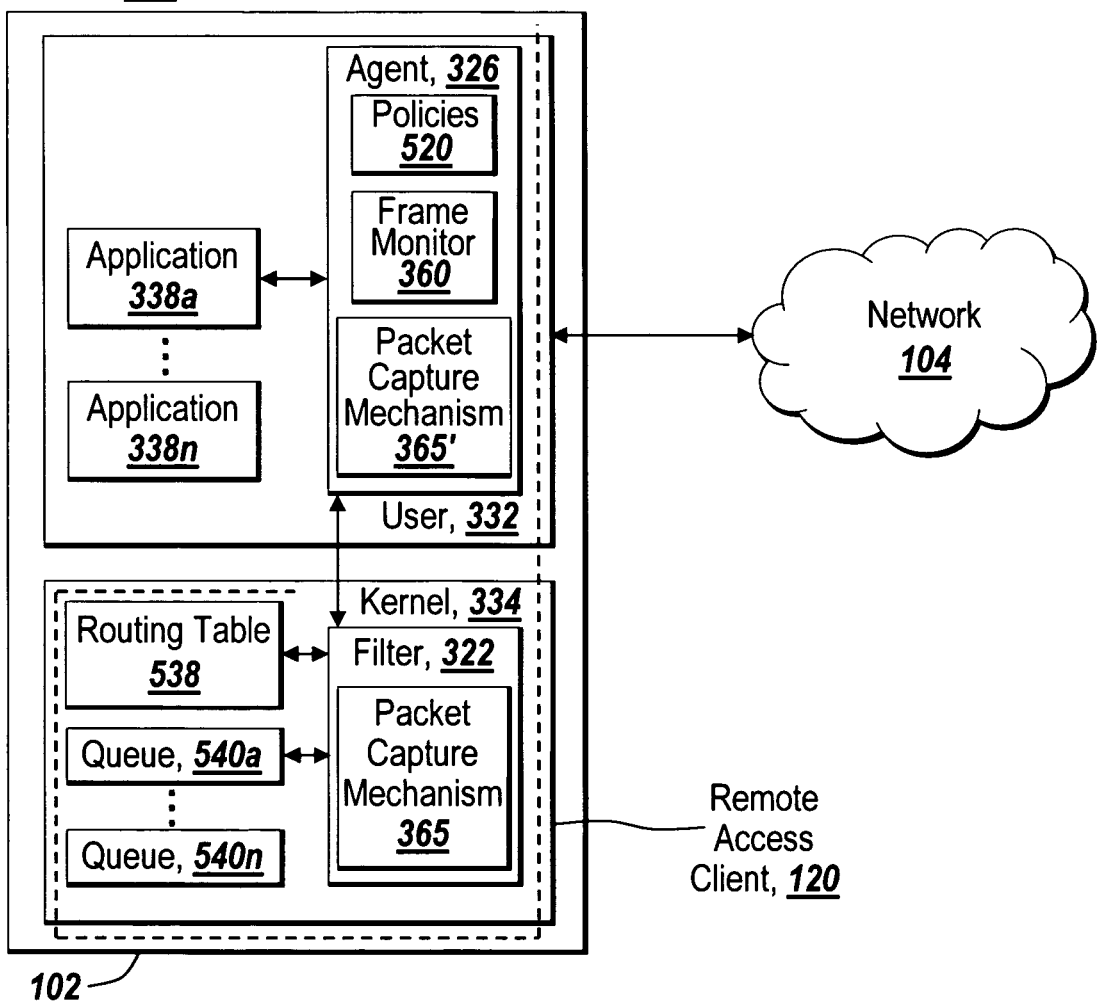
FIG. 5A is a block diagram depicting an environment of a client for providing client-side application-aware prioritization techniques.
Figure 5B:
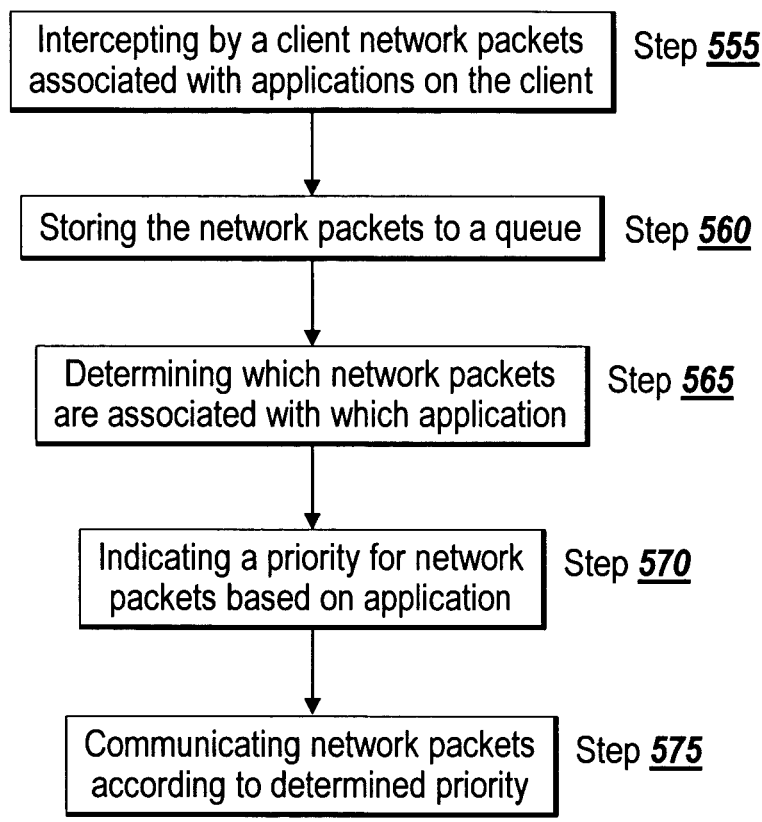
FIG. 5B is a flow diagram depicting one embodiment of the steps performed to provide client-side application-aware prioritization.

Referring now to FIGS. 5A and 5B, the present invention, in an additional aspect, is related to client-side application-aware network communication prioritization techniques. The remote access client 120 of the present invention provides for the intelligent and client centric prioritization of application network communications on a client based on the type and/or priority of an application. As depicted in the system 500 of FIG. 5A, the remote access client 105 of computing device 102 is connected to network 104. The client 105 may execute one or more applications 338a-338n, which access the network 104 via the agent 326 and filter 322 of the remote access client 120. In some embodiments, the applications 338a-338n provide one or more real-time data communications, such as VoIP. In other embodiments, one or more of the applications 338a-338 may provide email, collaboration, online meeting, and/or desktop sharing related services or functionality.

As illustrated in FIG. 5A, the packet capture mechanism 365, 365' may be included in the filter 322 or the agent 326 of the remote access client 120, for intercepting network traffic of any of the applications 338a-338n of the client 105. The remote access client 120 may comprise any queues 540a-540n for queuing and prioritizing network communications of the client 105. In one embodiment, the queues 540a-540n may be included in a network driver, such as an NDIS driver for the filter 322, and in other embodiments, may be included with or accessible by the agent 326. The queues 540a-540n may comprise any type and/or form of suitable means and/or mechanisms for storing and/or arranging network packets, such as network packets intercepted by the packet capture mechanism 365. In some embodiments, the queues 540a-540n may be associated with or assigned to network packets related to applications 338a-338n of the client 105. In other embodiments, the queues 540a-540n may be organized by levels of priority, such as high, medium, low, or numerically such as priority 1 . . . 10. One ordinarily skilled in the art will recognize and appreciate that number of queues 540a-540n may be based on any desired granularity of prioritization, such as 3, 5 or 10 levels of priority. Additionally, some of the queues 540a-540n may be used for receiving and/or transmitting network packets prior to being placed into and/or taken out of a priority based queue 540a-540n.

The remote access client 120 may also have, access, or use a routing table 538 for determining how to route network packets of the client via the agent 326, such as onto the network 104 via a gateway 340. In one embodiment, the agent 326 establishes and maintains an SSL VPN connection to the gateway 340, such as illustrated in FIG. 1A for example. In one embodiment, the routing table 538 comprise information about a source computing device and a destination computing device to identify a communication path or connection between a source and destination communication points. The routing table 538 may include a source IP address and source port, and an destination IP address and destination port to identify a communication path on the network 104. For example, the source IP address and source port may represent the IP address of the client 105 and the port by which an application 338a-338n on the client 105 communicates on the network 105. The destination IP address may represent the IP address of a peer computing device to which the application 338a-338n communicates with via the destination port used by the peer device.

Additionally, the remote access client 120 may have one or more policies 520 for specifying client-side prioritization of network communications related to applications 338a-338n running on application. These policies 520 may be specified by any suitable means and/or mechanisms. In some embodiments, the policies 520 may be specified by the name of the application 338a-338n and/or the type of application 338a-338n. In other embodiments, the policies 520 may be specified in accordance to the type of one or more protocols used by the applications 338a-338n and/or the size of the payload of the network packet. In another embodiment, the policies 520 define prioritization based on whether an application is running in the foreground or the background of the client 105. In yet another embodiment, policies 520 may indicate prioritization based on the destination network address, such as host name or IP address, and/or destination port number. Additionally, the policies 520 may be specified hierarchically to account for multiple applications 338a-338n and/or multiple protocols that may be executed on the client 105 at any point. Furthermore, the policies 520 may be specified conditionally, such as if one application 338a is running, a second application 338b may have a higher or lower priority. One ordinarily skilled in the art will recognize and appreciate the multitude of ways to define client-side application priorities.

The policies 520 may be accessible by the agent 326, configured into the agent 326, or loaded by the agent 326. For example, the policies 520 may be provided by or downloaded via the gateway 340. The policies 520 may comprise any type and format of syntax and/or language for specifying a policy, and may be provided via any type and/or form of medium, such as electronically by one or more network packets or via a file, such as an XML file. The policies 520 may be configurable by a user by any suitable means and/or mechanism. For example, the agent 326 may provide a configuration mechanism such as a user interface, graphical or otherwise, design and constructed for configuring or specifying the policies 520.

In view of the system 500 of FIG. 5A and FIGS. 1A-1C, the prioritization technique of the present invention illustrated by method 550 in FIG. 5B will be described. In brief overview, at step 555 of the illustrative method 550, the client 105 intercepts one or more networks packets associated with an application 338a-338n on the client 105, and, at step 560, the network packets are stored to a queue 540a-540n. At step 565, a priority for the intercepted and queued network packet is determined based on the type and/or priority of the application 338a-338n. At step 570, the determined priority is indicated for the network packets, and, at step 575, the network packets are communicated according to the determined priority. As such, the outbound network packets generated by an application 338a-338n on the client 105 are prioritized by the client 105 prior to transmission based on the type and/or priority of the application 338a-338n. For example, the application 338a may generate real-time data of VoIP communications, such as RTP over UDP via a TCP/IP session of an SSL connection to the gateway 340. The client 105, using the techniques of the present invention, may prioritize the real-time data communications of application 338a ahead of other applications, such as non-real-time data communication applications. This technique may compliment Quality of Service (QOS) networks where network traffic prioritization occurs in intermediary network devices, such as switches and routers.

At step 555 of illustrative method 500, the client 105 may intercept network packets of one or more applications 338a-338n transparently to the application 338a-338n, the gateway 340, a peer computing device, and any of the network layers of a network stack. In this manner, the techniques of the present invention support any type of application 338a-338n on the client 105. In some embodiments, the network packets are intercepted by the packet capture mechanism 360 via agent 326 or filter 322. Any inbound and/or outbound network packets of an application 338a-338n may be intercepted by the remote access client 120 of the present invention.

At step 560, the network packets intercepted at step 555 may be stored in a queue 540a-540n. In one embodiment, the network packet is stored to a temporary queue 540a-540n prior to prioritizing the network packet at steps 565 and 570. In other embodiments, the network packet is stored to a determined priority queue 540a-540n or a queue 540a-540n associated with an application 338a-338n after the network packet is prioritized at steps 565 and/or step 570.

At step 565, the remote access client 120 of the present determines the association of network packets with applications 338a-338n in order to determine priorities and apply any priority based policies 520. The client 105, such as via agent 326, can associate network traffic with applications 338a-338n by any suitable means and/or mechanisms. In some embodiments, the agent 326 identifies the network packet as generated from an application 338a-338n by any of the content of the network packet, such as any headers, fields, or the type and content of data in the payload of the network packet. In other embodiments, a network packet is associated with an application 338a-338n by matching information from the routing table 538, such as source and destination IP addresses and ports numbers with the IP addresses and ports numbers of the network packet. In some embodiments, the agent 326, such as via the frame monitor 360, may perform a checksum on the packet to verify that the identified application actually generated the packet.

Additionally, the remote access client 120 may determine whether the application 338a-338n associated with the network packet is running in the foreground or the background of the client 105. Furthermore, the remote access client 120 may determine any priorities, such as process task priority, assigned to the application 338a-338n by the operating system of the client 105. In other embodiments, the remote access client 120 may determine any other characteristics or statistics of the application 338a-338n such as size, memory usage, total execution time, and/or frequency of use. One ordinarily skilled in the art will recognize and appreciate the various characteristics of an application the present technique may use for providing client-side application-aware network communication prioritization.

At step 570, the remote access client 120 of the present invention indicates a priority for intercepted and queued network packets based on the application 338a-338n associated with the packet at step 565. In one embodiment, the agent 326 uses the policies 520 to apply a priority to network packets of applications 338a-338n in accordance with the prioritization rules specified or indicated by the policies 520. In some embodiments, the agent 326 may use characteristics of the application 338a-338n, such as running in the foreground or background, to indicate priority for a network packet of the application 338a-338n. In other embodiments, the agent 326 may use any combination of the policies 520 and characteristics of the application 338a-338n to indicate a priority for the network packets of the application 338a-338n.

In some embodiments, the agent 326 indicates the priority to the filter 322 for management of network packet queues 540a-540n to apply the indicated priorities. The agent 326 may communicate the priority of network packets to the filter 322 by any suitable means and/or mechanism such as via an application programming interface (API), such an IOCTL interface, or any other type and/or form of interface known to those ordinarily skilled in the art. In one embodiment, the filter 322 is not aware of the application 338a-338n by name but can associate priorities to network packets of applications 338a-338n via the routing table 538. An application 338a-338n corresponding to a network packet can be identified by any combination of source and destination identifiers, such as IP addresses and port numbers. As such, in some embodiments, the agent 326 indicates priorities to the filter 322 by routing information instead of application name. In other embodiments, the agent 326 provides to the filter 322 a mapping between applications 338a-338n, such as by application name or process id, to the routing information in a routing table 538.

Based on the indicated priorities for applications 338a-338n, in some embodiments, the filter 322 may place, arrange, or coordinate network packets into queues 540a-540n in support of the priorities. In one embodiment, the filter 322 may move network packets from temporary queues 540a-540n or from memory or other storage to a queue 540a-540n associated with the application 338a-338n, a queue 540a-540n associated with a priority, or a queue 540a-540n associated with both an application and a priority. For example, in one embodiment, all high priority network traffic may be placed in a high priority queue 540a and arranged in order based on an order of priority of the application 338a-338n, such as real-time data applications 338a-338n prior to other applications 338a-338n. In some embodiments, the network packets may be arranged in order in a priority queue 540a-540n based on the time the network packet was intercepted by the packet capture mechanism 365, such as in a FIFO manner. In yet a further embodiment, one queue 540a-540n may be used for prioritization by the filter 322. Each network packet may be placed and arranged in a priority order respective to all other intercepted network packets to provide a packet by packet prioritization across all applications 338a-338n and intercepted network packets. One ordinarily skilled in the art will recognize and appreciate that the network packets may be arranged in various priority queues 540a-540n, such as high, medium, low, or by any other granularity, and be placed or arranged in the queue in any suitable manner in practicing the operations of the present invention described herein.

In one embodiment, all network packets for an application 338a-338n are placed in a queue 540a-540n associated with the application 540a-540n. For example, intercepted network packets for an application communicating to a first destination IP address, and a first destination port may be placed in a first queue 540a. In another embodiment, all networks packets for a type of application 338a-338n, such as an email or voice application, or all network packets for a type of protocol used by the application 338a-338n, such as RTP or UDP, may be placed in a queue 540a-540n for prioritizing networks packets for one or more applications. For example, online collaboration related applications 338a-338n may be placed and prioritized in a first queue 540a for collaboration related applications. A second queue 540b may be used for email related applications 338a-338n. In another example, a queue 540a may be used for applications 338a-338n communicating real-time data or communicating using the RTP and/or UDP protocol. In a further example, a queue 540a may be used for applications 38a-338n communicating using a remote display protocol, such as ICA or RDP.

Within each application associated queue 540a-540n organized by specific application 338a-338n, type or category of application 338a-338n, or by protocol, the network packets may be further prioritized by the characteristic of the application 338a-338n generating them, e.g., a foreground application, the size of the network packet, or the time the network packet was intercepted. In some embodiments, one or more queues 540a-540n may be used for network packets intercepted but not prioritized because a policy 520 does not exist or apply to the network packet, or the policies 520 indicate to ignore or not process the network packet for prioritization. One ordinarily skilled in the art will recognize and appreciate the various ways network packets may be placed and arranged in a priority based manner in queues 540a-540n associated with the application 338a-338n, the type of application 338a-338n or the protocol used by the application 338a-338n, and that the priority may be based on the policies 520 specified for the client 105.

At step 575 of illustrative method 550, the network packets are communicated from the queues 540a-540n according to the determined priorities for the network packets. In some embodiments, the network packets are organized into priority queues 540a-540b so that the network packets of the highest priority queue 540a-540n are communicated first, and then the next highest priority queue 540a-540n second, and so on. In other embodiments, the queues 540a-540n are organized by application 338a-338n, and therefore, at step 575, the present invention communicates network packets from the queue 540a-540n based on the respective priorities of the applications 338a-338n. Regardless of the queue 540a-540n organization and management, one ordinarily skilled in the art will recognize and appreciate that the remote access client of the present invention will communicate the network packets from the queues in a manner according to or consistent with the determined priorities, which in turn, may be based or derived from the policies 520 of the client.

In some embodiments, the remote access client 120 of the present invention considers other network factors in determining what network packets to communicate from what queue. For example, the remote access client 120 may receive an indication of network congestion, such as receiving a window size of zero for a TCP connection related to an application 338a-338n. In another example, the remote access client 120 may recognize a high number of retransmits to a particular destination. As such, in some embodiments, the remote access client 120 may throttle back or not communicate network packets related to other networks factors, such as congestion, even though the network packets may have a higher priority than other network packets in a queue 540a-540n. Thus, the client 105 controls and manages the prioritization of network communications of the client 105 on an application 338a-338n basis and in accordance with any policies 520 for the client 105 and in further view of any network statistics and other factors occurring on the network.

Figure 6A:
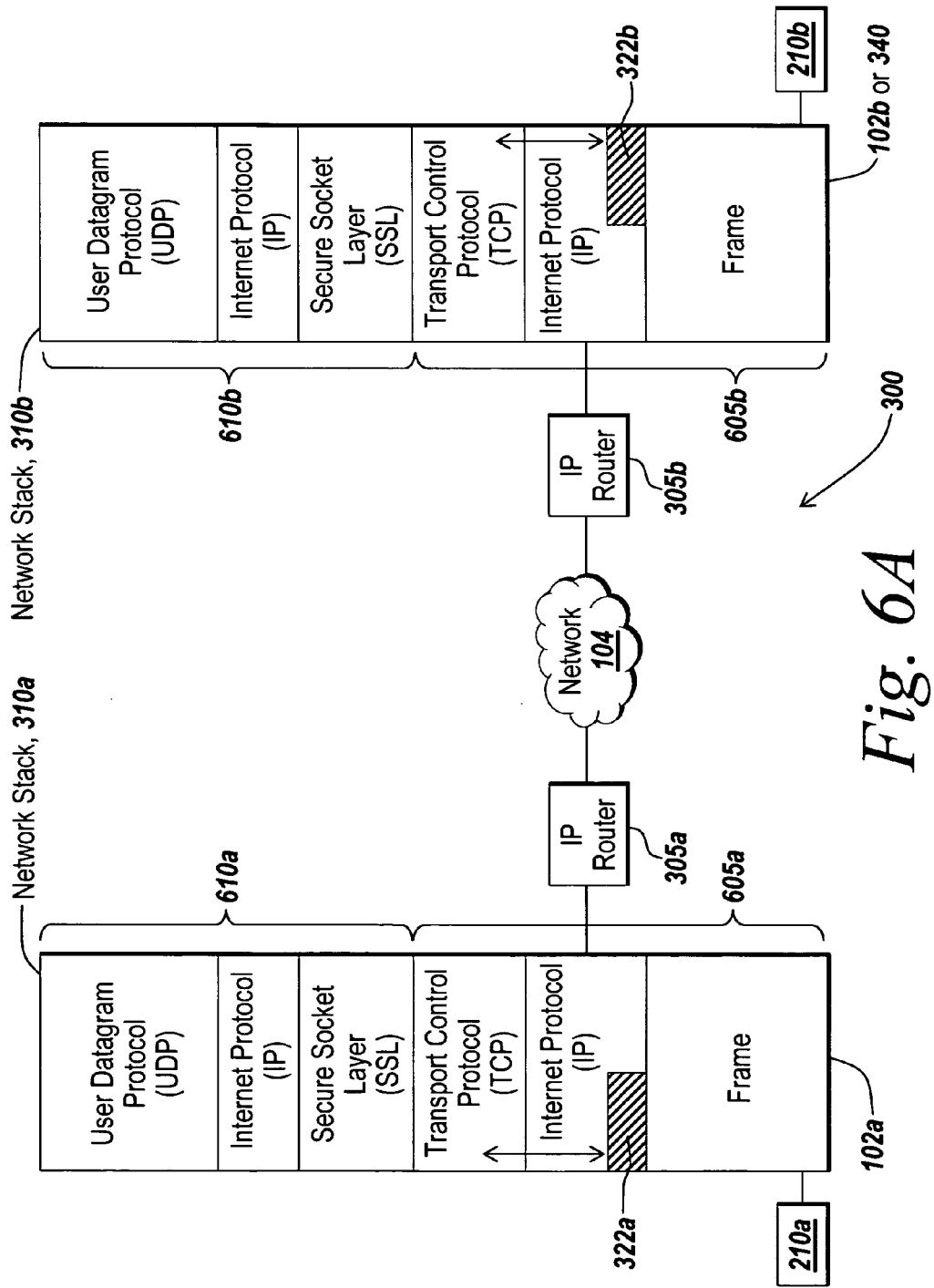
FIG. 6A is a block diagram depicting an environment of an apparatus for shielding a network disruption from a device.
Figure 6B:
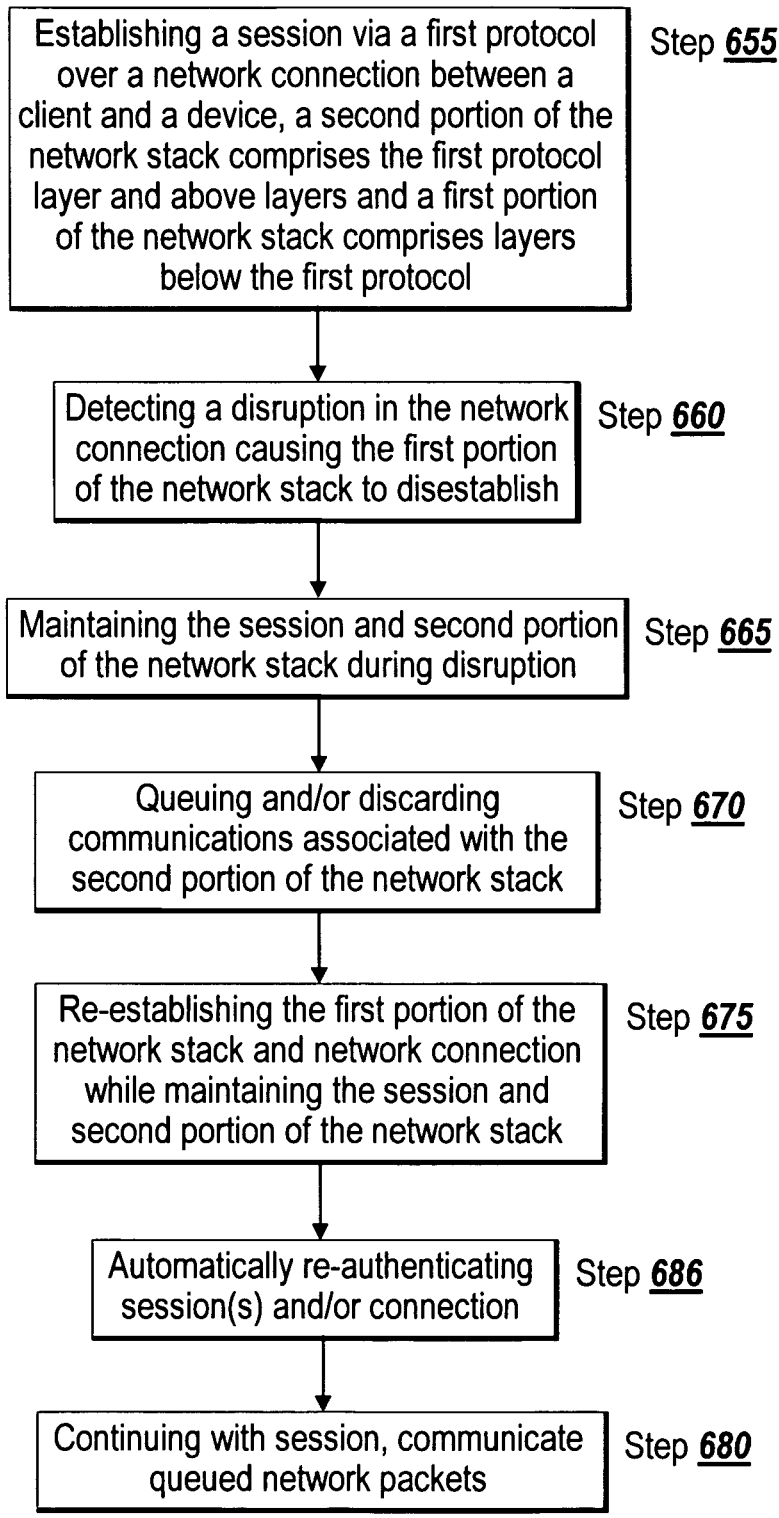
FIG. 6B is a flow diagram depicting one embodiment of the steps performed in to shield network disruption from a device.

In yet a further aspect and referring now to FIGS. 6A and 6B, the present invention is related to providing a network disruption shielding technique for persistent and reliable connectivity. FIG. 6A illustrates environment 300 as discussed above in conjunction with FIG. 3A. The environment 300 illustrates network stacks 310a and 310b, which may represent network stacks of computing devices 102a-120b or gateway 340, such as any of the computing devices 102 and the gateway 340 illustrated in FIG. 1A-1C, 2A, or 5A. Each network stack 310a-310b may comprise one or more networks layers, such as a TCP/IP network layer on top of the frame network layer as one ordinarily skilled in the art will recognize and appreciate. Although the network stacks 310a-310b are illustrated in environment 300 of FIG. 6A with a certain set of network layers, one ordinarily skilled in the art will recognize and appreciate that the network stacks 310a-310b may have any type and/or form of network layers, in any suitable combination, and each of the network stacks 310a-310b may have different forms of each layer in relation to the other network stack.

The network stacks 310a-310b may be considered to have a first portion 605a-605b of the network stack, and a second portion 610a-610b of the network stack. As illustrated in the example network stacks 310a-310b of FIG. 6A, the first portion 605a-605b of the network stack comprises the network layers at and below the TCP network layer. The second portion 610a-610b may comprise those network layers above the TCP network layer, such as a UDP over SSL protocol layer. Although the first portion 605a-605b and the second portion 610a-610b are shown as portioned, segmented, or otherwise divided at the TCP layer, the first portion and second portion may be formed at a higher or lower dividing layer in practicing the network disruption shielding technique of the present invention as one ordinarily skilled in the art will recognize and appreciate.

The network stacks 310a-310b illustrated in FIG. 6A may represent an application 338a-338n on client 105, such as the client depicted in FIG. 5A, establishing a peer-to-peer SSL VPN connection to a second computing device 102b or, alternatively, a gateway 340. The client 105 may be a mobile client, such as a notebook, personal digital assistant (PDA), a smart phone, or any type of mobile computing or telecommunication device. The client 105 may communicate real-time data such as VoIP communication via the UDP protocol or RTP over UDP via the SSL session established to the peer device 102b or gateway 340. In one embodiment, the agent 326 of the remote access client 120 establishes and maintains the SSL or SSL VPN session to the gateway 340 or to peer computing device 102b. The agent 326 may operate in user-mode 332, and may handle any network layer and protocol processing related to the second portion 610a-610b of the network stack 310a-310b, along with any application layer protocols. As a TCP/IP based network 104, the UDP over SSL session of the second portion 610a-610b of the network stack 310a-310b may be communicated over a TCP/IP stack forming the first portion 605a-605b of the network stack 310a-310b. In view of the remote access client 120 of the present invention, such as illustrated in FIG. 1A or 5A, the filter 322 may be a network driver operating in kernel-mode 332 within the first portion 605a-605b of the network stack 310a-310b.

The present invention uses a network disruption shielding technique as depicted by illustrative method 650 in FIG. 6B to maintain the second portion 610a-610b of the network stack 310a-310b through a network level connection interruption, such as any type and/or form of network disruption to the first portion 605a-605b of the network stack 310a-310b. The network disruption shielding technique of the present invention may be performed transparently to an application 338a-338n of the client 105, a user of the client 105, any one or more network layers above the first portion 605a-605b, and the gateway 340 or peer computing device 102b, and any portion of their respective network stacks 310a-310b. In one embodiment, the network disruption is shielded without notification to the user of the client that the network was disrupted or a session was interrupted.

In brief overview of illustrative method 650, at step 665, a client 105 establishes a session via at least a first protocol over a network connection between the client and another device, such as a peer computing device or gateway. As such, a network stack 310a-310b is established or used on the client 105. The network stack 310a-310b has a first portion 605a-605b and a second portion 610a-610b. At step 660, a disruption in the network connection is detected causing the first portion 605a-605b of the network stack 310a-310b to be disestablished, or otherwise disrupted from being used or continued to be used. At step 665, the present invention maintains the second portion 610a-610b of the network stack 310a-310b during the disruption and maintaining a session, or sessions, associated with the network layers of the second portion 610a-610b.

During the disruption, at step 670, any network packets related to the second portion 610a-610b of the network stack 310a-310b may be queued. At step 675, the first portion 605a-605b of the network stack 310a-301b is reestablished or otherwise received from the network disruption. While the first portion 605a-605b of the network stack 310a-301b is reestablished, the present invention maintains the second portion 610a-610b, and sessions thereof, allowing at step 680, to continue with the session by linking or re-associating the second portion 610a-610b with the first portion 605a-605b of the network stack 310a-310b. The network connection and/or the session may automatically be re-authenticated at step 680. At step 685, the illustrative method may communicate any queued network packets and continue with the session transparently as if the network disruption did not occur.

In an embodiment of illustrative step 655, a first computing device 102a may establish a network connection with a second device, such as a peer computing device 102b or a gateway 340, by any suitable means and/or mechanism and using any type and/or form of connection based protocol. For example, the network connection may be established via a TCP connection on a TCP/IP network or by an SPX connection on an IPX/SPX network. In some embodiments, the network connection may be initiated by any of the applications 338a-338n on the client, such as any application illustrated in FIG. 5A. For example, a remote display client, such as an ICA client of Citrix Systems, Inc. or a Remote Display Client of Microsoft Corporation may initiate or establish the network connection. In other embodiments, the network connection of illustrative step 665 may be initiated and/or established via the agent 326, filter 322, or any other portion of the remote access client 120. In one embodiment, the establishing of the network connection forms the first portion 605a-605b of the network stack 310a-310b. In other embodiments, the first portion 605a-605b of the network stack 310a-310b, or portion thereof, is established via connection to a network 104 upon startup of the client 105.

In some embodiments, the second portion 610a-610b of the network stack 310a-310b is formed by establishing one more sessions, such as an SSL session, via any type and/or form of protocol over the network connection, such as a remote display protocol of ICA or RDP. The session may be established via any application 338a-338n or the remote access client 120 of the client. In one embodiment, the session may correspond to a tunneling or gateway session with a peer computing device 102b or a gateway 340. In another embodiment, the session may be any type of interactive session such as a media session established via a signaling protocol, SIP for example. For example, the session of the second portion 610a-610b of the network stack 310a-310b may comprise a VoIP communication session, such as one established by illustrative method 260 of FIG. 2B. Additionally, there may be multiple sessions associated with the second portion 610a-610b of the network stack 310a-310b. For example, an SSL or SSL VPN session may form one session, while a second session, such as media session via RTP over UDP may form a second session. Additionally, at any application layer of the network stack 310a-310b one or more applications 338a-338n on the client 105 may establish an application level session with a peer computing device 102b. In one embodiment, the agent 326 of the remote access client 120 is responsible for establishing and maintaining the second portion 610a-610b of the network stack 310a-310b and one or more of the associated sessions.

At step 660 of the illustrative method 650 of the present invention, a disruption is network connection is detected. In one embodiment, the network disruption may be caused by a mobile client 105 roaming between networks and networks segments, which, in some embodiments, causes the client 105 to obtain a new network IP address and/or host name. In some embodiments, the disruption disrupts the first portion 605a-605b of the network stack 310a-310b, such as, for example, causing a TCP or SPX connection to be disconnected. In one aspect, the disruption causes the first portion 605a-605b, or any portion thereof, of the network stack 310a-310b to be disestablished, or otherwise needing to be re-established, reconnected, reconfigured or rebuilt. For example, in some embodiments, the IP layer of the network stack may maintain intact while the TCP layer is reestablished. In one embodiment, any TCP related drivers may need to be re-started. In other embodiments, the TCP/IP layer be intact even though the network connection is disrupted, and only a new TCP connection needs to be established. In other embodiments, the TCP/IP layer is intact but needs to reconfigure itself for a new network or network segment, such as changing the IP address of the client 105. One ordinarily skilled in the art will recognize and appreciate the various ways a network connection may be disrupted and impact or affect a first portion of the network stack.

In some embodiments, the agent 326, or any other portion of the remote access client 120 may detect the network disruption by any suitable means and/or mechanisms. In one embodiment, the agent 326 may determine a network disruption by receiving an error message or failure upon calling or executing an API call to the first portion 605a-605b of the network stack 310a-310b. For example, the SSL session maintained by the agent 326 for the second portion 610a-610b relies or depends on the TCP connection of the first portion 605a-605b of the network stack 310a-310b. As the agent 326 transacts via the SSL session, the agent 326 may receive an error or failure message indicating a problem with the TCP connection. In other embodiments, the agent 326 may receive an event or message from any network layer of the first portion 605a-605b of the network stack 310a-310b indicating a network disruption. One ordinarily skilled in the art will recognize and appreciate the various ways the network disruption may be detected.

At illustrative step 665, in some embodiments, upon detection of the network disruption, the agent 326 or any other portion of the remote access client 120 of the present invention maintains the second portion 610a-601b of the network stack 310a-310b during the disruption. For example, although the SSL based session maintained by the agent 326 depends on an underlying TCP connection, the agent 326 keeps the SSL session open or active through the disruption to the TCP connection. As there may multiple sessions associated with one or more layers of the second portion 610a-610b of the network stack, the agent 326, in some embodiments, keeps one or more, or all, of the multiple sessions open or active although the first portion 605a-605b of the network stack 310a-310b is disrupted.

At step 670 of illustrative method 650, the remote access client 120 of the present invention, in some embodiments, queues one or more network packets of any of the protocols related to the second portion 610a-610b of the network stack 310a-310b during the network disruption. The remote access client 120 may use any type and/or form of queuing mechanisms, such as any of the queues 540a-540n illustrated in FIG. 5A. In other embodiments, the remote access client 120 may discard network packets during the disruption, such any packets related to a lossy protocol, such as RTP over UDP for voice communications. In some cases, it may be desirable to discard packets, such as UDP packets, to reduce latency and quality issues, such as in voice communications. In further embodiments, the remote access client 120 may queue some network packets and discard other network packets. In an additional embodiment, the remote access client 120 may queue the network packets, and discard some or all of the network packets after a predetermined period of time. The remote access client 120 may use the policies 520 to determine which network packets to queue and/or discard. For example, a network packet of a first application 338a may be queued while a network packet of a second application 338n is discarded. In other embodiments, the remote access client 120 may use any network statistics or any network traffic inspection techniques, for example stateful inspection, as known to those skilled in the art to determine whether to queue and/or discard network packets during the disruption.

At step 675 of illustrative method 650, the first portion 605a-605b of the network stack 310a-310b is reestablished while the second portion 610a-610b of the network stack 310a-310b is maintained along with maintaining any desired session or sessions of the second portion 610a-610b of the network stack 310a-310b. The first portion 605a-605b of the network stack 310a-310b may be reestablished by any suitable means and/or mechanisms. For example, the client 105 may reestablish the TCP/IP connection to the network 104, such as by logging into a new network for a roaming mobile client 105. In other embodiments, the remote access client 120, such as via the agent 326 or the filter 322, reestablishes the first portion 605a-605b of the network stack 310a-310b. For example, the agent 326 may initiate and establish a new TCP connection. Upon reestablishing the first portion 605a-605b, the second portion 610a-610b of the network stack 310a-310b is linked with, re-associated with or starts to use or continue to use the first portion 605a-605b to reestablish the network stack 310a-310b. In some embodiments, the agent 326 may be notified by an event of any network layer that the first portion 605a-605b has been reestablished or in other embodiments, may poll by any predetermined frequency to determine the first portion 605a-605b is reestablished. For example, the agent 326 may check if the TCP connection is active or can be reconnected.

In some embodiments, at step 680, the remote access client 120, such as the agent 326, may automatically re-authenticate the client 105 or a user of the client 105 for the network connection, such as a TCP connection for the first portion 605a-605b of the network stack 610a-610b. For example, the remote access client 120 may automatically re-authenticate the client 105 to a network 104 using any network related credentials of a user of the client 105. Additionally, the remote access client 120 may automatically re-authenticate the client 105 or a user of the client 105 for any session associated with the second portion 610a-610b of the network stack 310a-310b. For example, the SSL session between the agent 326 and the gateway 340 or peer computing device 102c may be re-authenticated.

In another example, an application 338a may be accessing a host service, web server, or application server that uses authentication credentials for access. The agent 326 may automatically re-authenticate the application 338a to the corresponding service or server using application related authentication credentials. In some embodiments, the remote access client 120 may re-authenticate the client and/or user of the client 105 at multiple levels, such as for network access and/or TCP connection, SSL or SSL VPN session, and/or any application level sessions, such as a media interactive user session, for example, a VoIP telephone session. Furthermore, the remote access client 120 may re-authenticate at any time prior to step 685, during step 685, for example, after communicating queued network packets but before continuing other communications, or after step 865, in response to a request to authenticate from a peer computing device, such as a server or the gateway 340.

At step 685 of illustrative method 650, the remote access client 120 of the present invention continues to use the session or sessions of the second portion 610a-610b of the network stack. If any network packets have been queued or remain queued at step 670, the remote access client 120 communicates the queued network packets and continues communicating any network packets of the client 105, such as network packets generated by or sent to the one more applications 338a-338n of the client 105. As such, the network disruption shielding technique of the present invention provides a seamless and transparent solution to nomadic mobile computing solutions and for generally providing reliable and persistent network connectivity and access.

In the example of a VoIP communications, the illustrative method 650 of the present invention will reduce the number of telephone call drops due to network disruptions and improve the usage of and experience with VoIP. A VoIP user will not need to reconnect the telephone call due to temporary network disruptions in network availability as the remote access client 120 of the present invention will automatically maintain the session and reconnect to the network. Additionally, the remote access client 120 of the present invention will automatically re-authenticate the connection and sessions for providing security after the network disruption. Furthermore, the network shielding technique of the present invention is useful for 1) continuing transactions, commands, or operations automatically through the network disruption, 2) maintaining session related context and cache through the network disruption, and 3) automatically handling change in network address of the client due to changes in the network.

By providing a reliable and persistent connection, the present invention also avoids interruptions to transactions, commands or operations as part of the functionality exercised between the a first computing device 102a and a second computing device 102b, such as client 105a and 105b in FIG. 1C. For example, a file copy operation using Windows Explorer has not been designed to continue working after there is a disruption in a network connection. A user on the client 105 may use the file copy feature of Windows Explorer to copy a file from the client 105 to a server 102c. Because of the size of the file or files, this operation may take a relatively extended period of time to complete. If during the middle of the operation of the copy of the file to the server, there is an interruption in the network connection between the client 105 and the server, the file copy will fail. Once the network connection is re-established, the user will need to start another file copy operation from Windows Explorer to copy the file from the client 105 to the server. Under the present invention, the user would not need to start another file copy operation. The network connection would be re-established in accordance with the network disruption shielding technique of the present invention as illustrated in FIG. 6B. As such, the file copy of Windows Explorer would not get notified of the interruption in the network connection and therefore, would not fail. The remote access client 120 would re-establish any connections and transmits any queued data so that operation can continue without failure. The remote access client 120 would maintain a queue of the data related to the file copy operations that has not been transferred to the server because of the interruption in the network connection. Once the network connection is re-established, the remote access client 120 can transmit the queued data and then continue on with transferring the data related to the file copy operation in due course.

Although this aspect of the invention is described in terms of a file copy operation example, one ordinarily skilled in the art will recognize that any operation, transaction, command, function call, etc. transacted between a first computing device 102a and a second computing device 102b, can be maintained and continued without failure from the network connection disruption, and, furthermore, without the client 105 or user of the client 105 recognizing there was a disruption or having notice of the disruption. Additionally, the transaction or operation can be maintained and continued transparently to the application 338, the gateway 340, second computing device 102c, and any part of the second portion 610a-610b of the network stack 310a-310b.

By providing the client 105 with a reliable and persistent connection to a peer computing device 102b or gateway 340, the present invention avoids the process of opening a new user session with an application 338 on the peer, such as a host service on server, by maintaining the user session through network connection interruptions. For each user session between peer computing device, each computing device may maintain session specific context and caches, and other application specific mechanisms related to that instance of the user session. For each new user session established, these session specific context and caches need to be re-populated or re-established to reflect the new user session. For example, a user on the client 105 may have an http session with a server 102c having a web server or web application. The server 102c may keep context specific to providing this instance of the http session with the client 105. The context may be stored in the memory of the server, in files of the server, a database or other component related to providing the functionality of the server 102c. Also, the client 105 may have local context specific to the instance of the http session, such as a mechanism for keeping track of an outstanding request to the web server. This context may be stored in memory of the client 105, in files on the client 105, or other software component interfaced with the client 105. If the connection between the client 105 and the server 102c is not persistent, then a new user session needs to be established with new session specific context on the server 102c and the client 105. The present invention maintains the session so that a new session, and therefore new specific session context, does not need to be re-established.

The present invention maintains the user session through network level connection interruptions and without notification to the user of the client that the session was interrupted. In operation of this aspect of the invention, the client 105 establishes the connection to the peer computing devices. Via the connection, a session between the client 105 and the server is established. The remote access client 120 can store and maintain any session related information such as authentication credentials, and client 105 and host server 102c context for the established session. Upon detection of a disruption in network connection, the remote access client 120 can re-establish the first portion 605a-605b of the network stack 310a-301b while maintaining the second portion 610a-610b of the network stack. The network connection disruption may cause an interruption to the underlying TCP/IP connection used by the session between the client 105 and the server 102c. However, since the second portion 610a-610b of the network stack 310a-310b is maintained, the session can be re-established and/or continued after the network connection is re-established without the user on the client 105 having notification that the session was interrupted. Thus, the interruption of the session caused by the network connection disruption is effectively hidden from the user using the network disruption shielding techniques of the present invention.

Furthermore, by providing a reliable and persistent connection, the present invention also enables a client 105 to traverse through different network topologies without re-starting a session or an application 338 on the client 105. For example, the client 105 may be a computer notebook with a wireless network connection. As the client 105 moves from a first wireless network to a second wireless network, the client's network connection may be temporarily disrupted from the first wireless network as a network connection is established with the second wireless network. The second wireless network may assign a new network identifier, such as a host name or internet protocol address, to the client 105. This new network identifier may be different than the network identifier assigned to the client 105 by the first wireless network. In another example, the client 105 may be physically connected through an Ethernet cable to a port on the network. The physical connection may be unplugged and the client 105 moved to another location to plug into a different port on the network. This would cause a disruption into the network connection and possibly a change in the assigned network identifier. Without the present invention, any sessions between peer computing devices may need to be restarted due to the change in the network topology, the disruption to the network connection, and/or the change in the assigned network identifier. By the method and systems described herein, the remote access client 120 of the present invention maintains the network connection for the client and automatically re-established the client's 105 network connection including handling changes in the network topology and network identifier. The client 105, and any applications or sessions on the client 105, can continue to operate as if there was not a network connection disruption or a change in the network identifier. Furthermore, the user on the client 105 may not recognize there were any interruptions or changes, and the client 105 may not receive any notice of such interruptions.

In an additional aspect, any of the techniques of the present invention, such as the illustrative methods of FIGS. 2B, 3B, 3C, 4, 5B and 6B, can be practiced in one or more combinations with each other. In one embodiment, the peer-to-peer routing technique may be practiced with the false acknowledgement and/or MTU adjustment techniques. This would provide a client communicating real-time data, such as VoIP, to connect to the peer via a more optimal and direct route and to communicate the real-time data via UDP over a secure SSL/TCP/IP connection, while avoiding any latency due to any reliability mechanism of TCP and reduce fragmentation due to the encryption overhead. Additionally, this embodiment may be further combined with the client-side application-aware prioritization technique and/or the network disruption shielding technique. As such, the secure real-time data communications can be communicated from the client at higher priorities than other applications of the client to improve the quality of the real-time experience, such as VoIP. The network disruption technique would allow a mobile VoIP phone, such as a soft phone of a notebook, roam between network access points and automatically continue with the session.

The techniques of the present invention are complimentary to each other for network communication optimizations, such as for example in VoIP communications over a SSL VPN gateway. As such, each of the 1) peer-to-peer routing technique, 2) the false acknowledgement technique, 3) payload shifting technique, 4) the MTU adjustment technique, 5) the client-side application-aware technique, and 5) the network disruption shielding technique of the present invention may be practiced with one or more of the following techniques and optimization of the present invention: 1) the peer-to-peer routing technique, 2) the false acknowledgement technique, 3) payload shifting technique, 4) the MTU adjustment technique, 5) the client-side application-aware technique, and/or 5) the network disruption shielding technique.

In one further illustrative example of the present invention, an online meeting, collaboration and/or desktop sharing service, such as the hosted service of GoToMeeting.com, WebEx.com, or LiveMeeting.com may use the techniques of the present invention in one or more combinations. The host service may use a gateway 340, and the techniques of illustrative method 260 to facilitate a peer-to-peer connection between a first computing device of a meeting presenter and a second computing device of a meeting attendee. The computing devices of the meeting presenter and attendees may download via the host service the remote access client 120, or any portions thereof. Once the meeting presenter and the meeting attendee establish a peer-to-peer connection, the peer computing devices may use any of the optimization techniques of the present invention to optimize their communications, such as the MTU adjustment technique, client-side application aware technique, or the network disruption shielding technique. Along with the peer-to-peer routing, the optimization techniques of the present invention, will improve the performance, efficiency and user experience of the online meeting, collaboration, or desktop sharing.

In yet a further aspect and in view of FIG. 2A, for example, the remote access client 120 of the present invention can distribute Dynamic Host Configuration Protocol (DHCP) IP addresses of the client 105 or the publicly visible IP addresses to the telecommunication device 210a-210b, such as either a hardware or software based VoIP telephone. The gateway 340 of the present invention facilitates the discovery of the public IP addresses of the client, such as client 105b illustrated in FIG. 2A. As such, the techniques of the present invention enables protocols that communicate their IP address over the protocol to continue to function.

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

We claim:

1. A method for a client to prioritize network communications of the client associated with an application of the client, the method comprising the steps of:
intercepting, by the client, a plurality of network packets associated with a first application and second application of the client;
storing, by the client, the plurality of network packets to a queue, with at least one packet associated with the second application placed ahead of at least one packet associated with the first application in the queue;
determining, by the client, that the first application is running in the foreground on the client;
setting, by the client, a priority for the at least one packet associated with the first application to a value higher than a priority for the at least one packet associated with the second application, responsive to the determination that the first application is running in the foreground on the client;
placing, by the client, the at least one network packet associated with the first application ahead of the at least one network packet associated with the second application in the queue, responsive to the set priorities for the at least one packet associated with the first application
providing the at least one network packet associated with the first application of the client for communications via a network stack of the client before providing the at least one network packet associated with the second application of the client for communications via the network stack, responsive to the placement of the network packets in the queue; and
holding, by the client, in the queue the at least one network packet associated with the second application, and releasing the held at least one network packet upon communication of the at least one network packet associated with the first application prioritized ahead of the held at least one network packet.

2. The method of claim 1, wherein the step of determining, by the client, further comprises determining the queued one or more networks packets of the first application comprises real-time data.

3. The method of claim 2, wherein the real-time data comprises one of the following: a real-time protocol, a user datagram protocol, and a representation of one of voice or audio.

4. The method of claim 1, comprising preventing, by the client, at least one network packet of the second application from being communicated via the network stack ahead of the one or more network packets of the first application.

5. The method of claim 1, comprising intercepting, by the client, the one or more network packets transparently to the one or more applications on the client.

6. The method of claim 1, comprising specifying, by a user, the priority of one of the first application or the second application.

7. The method of claim 1, comprising receiving, by the client, the one or more network packets from a computing device.

8. The method of claim 1, comprising providing, by the one or more applications, the one or more network packets for communicating from the client to a computing device.

9. A client for prioritizing network communications of the client associated with an application of the client, the client comprising:
a processor, a network interface, and a memory, the processor configured to execute a plurality of applications, a network driver, a packet capture mechanism, and an agent;
wherein the packet capture mechanism is configured to intercept a plurality of network packets associated with a first application and second application of the client;
wherein the network driver is configured to store the plurality of network packets to a queue stored in the memory, with at least one packet associated with the second application placed ahead of at least one packet associated with the first application in the queue, and communicating the plurality of network packets via a network stack of the client;
wherein the agent is configured to determine that the first application running in the foreground on the client, set a priority for the at least one packet associated with the first application to a value higher than a priority for the at least one packet associated with the second application, responsive to the determination that the first application is running in the foreground on the client, and place the at least one packet associated with the first application ahead of the at least one network packet associated with the second application in the queue, based on the set priority; and
wherein the network driver is further configured to:
hold in the queue the at least one network packet associated with the second application,
communicate, from the queue, the at least one network packet associated with the first application of the client before the at least one network packet associated with the second application of the client, based on the placement of the network packets in the queue, and
release the held at least one network packet upon communication of the at least one network packet associated with the first application prioritized ahead of the held at least one network packet.

10. The client of claim 9, wherein the agent is further configured to determine the one or more networks packets of the first application comprises real-time data.

11. The client of claim 9, wherein the real-time data comprises one of the following: a real-time protocol, a user datagram protocol, and a representation of one of voice or audio.

12. The client of claim 9, wherein one of the agent or the network driver are configured to prevent at least one network packet of the second application from being communicated via the network stack ahead of the one or more network packets of the first application.

13. The client of claim 9, wherein the mechanism intercepts the one or more network packets transparently to the one or more applications on the client.

14. The client of claim 9, wherein the processor is further configured to execute a configuration mechanism configured to allow a user to specify the priority of the one or more network packets.

15. The client of claim 9, wherein the client receives the one or more network packets from a computing device.

16. The client of claim 9, wherein the one or more applications provides the one or more network packets for communicating from the client to a computing device.

17. The client of claim 9, wherein the network driver comprises a Network Driver Interface Specification (NDIS) driver.

18. The client of claim 9, wherein the network driver operates in kernel-mode of an operating system of the client.

19. The client of claim 9, wherein the agent operates in user-mode of an operating system of the client.

20. The client of claim 9, wherein one of the agent or the network driver comprises the mechanism for intercepting one or more network packets of the client.

\* \* \* \* \*